US010580409B2

(12) United States Patent
Walker, II et al.

(10) Patent No.: US 10,580,409 B2
(45) Date of Patent: Mar. 3, 2020

(54) APPLICATION INTEGRATION WITH A DIGITAL ASSISTANT

(71) Applicant: Apple Inc., Cupertino, CA (US)

(72) Inventors: Robert A. Walker, II, San Francisco, CA (US); Brandon J. Newendorp, San Francisco, CA (US); Rohit Dasari, San Francisco, CA (US); Richard D. Giuli, Arroyo Grande, CA (US); Thomas R. Gruber, Cupertino, CA (US); Carey E. Radebaugh, Los Gatos, CA (US); Ashish Garg, Bellevue, WA (US); Vineet Khosla, Cupertino, CA (US); Jonathan H. Russell, San Francisco, CA (US); Corey Peterson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/207,901

(22) Filed: Dec. 3, 2018

(65) Prior Publication Data

US 2019/0103112 A1     Apr. 4, 2019

Related U.S. Application Data

(63) Continuation of application No. 15/269,728, filed on Sep. 19, 2016, now Pat. No. 10,297,253.

(Continued)

(51) Int. Cl.
*G10L 15/22*     (2006.01)
*G10L 15/18*     (2013.01)
(Continued)

(52) U.S. Cl.
CPC .............. *G10L 15/22* (2013.01); *G10L 13/02* (2013.01); *G10L 15/1815* (2013.01);
(Continued)

(58) Field of Classification Search
CPC ..................................................... G10L 15/22
See application file for complete search history.

(56) References Cited

U.S. PATENT DOCUMENTS

| 5,946,647 A | 8/1999 | Miller et al. |
| 7,110,998 B1 | 9/2006 | Bhandari et al. |

(Continued)

FOREIGN PATENT DOCUMENTS

| AU | 2015203483 A1 | 7/2015 |
| CA | 2694314 A1 | 8/2010 |

(Continued)

OTHER PUBLICATIONS

Office Action received for Chinese Patent Application No. 201710386931.3, dated Apr. 16, 2019, 11 pages (5 pages of English Translation and 6 pages of Official Copy).

(Continued)

*Primary Examiner* — Douglas Godbold
(74) *Attorney, Agent, or Firm* — Dentons US LLP

(57) ABSTRACT

Systems and processes for application integration with a digital assistant are provided. In accordance with one example, a method includes, at an electronic device having one or more processors and memory, receiving a natural-language user input; identifying, with the one or more processors, an intent object of a set of intent objects and a parameter associated with the intent, where the intent object and the parameter are derived from the natural-language user input. The method further includes identifying a software application associated with the intent object of the set of intent objects; and providing the intent object and the parameter to the software application.

15 Claims, 21 Drawing Sheets

Related U.S. Application Data

(60) Provisional application No. 62/348,929, filed on Jun. 11, 2016.

(51) Int. Cl.
  *G10L 13/02* (2013.01)
  *G10L 15/30* (2013.01)
  *G06F 17/27* (2006.01)
  *G10L 15/06* (2013.01)

(52) U.S. Cl.
  CPC .......... *G06F 17/279* (2013.01); *G10L 15/063* (2013.01); *G10L 15/30* (2013.01); *G10L 2015/223* (2013.01); *G10L 2015/228* (2013.01)

(56) References Cited

U.S. PATENT DOCUMENTS

| | | | |
|---|---|---|---|
| 7,315,809 B2 | 1/2008 | Xun | |
| 7,315,818 B2 | 1/2008 | Stevens et al. | |
| 7,318,020 B1 | 1/2008 | Kim | |
| 7,319,957 B2 | 1/2008 | Robinson et al. | |
| 7,321,783 B2 | 1/2008 | Kim | |
| 7,322,023 B2 | 1/2008 | Shulman et al. | |
| 7,324,833 B2 | 1/2008 | White et al. | |
| 7,324,947 B2 | 1/2008 | Jordan et al. | |
| 7,328,155 B2 | 2/2008 | Endo et al. | |
| 7,328,250 B2 | 2/2008 | Wang et al. | |
| 7,333,998 B2 | 2/2008 | Heckerman et al. | |
| 7,337,108 B2 | 2/2008 | Florencio et al. | |
| 7,345,670 B2 | 3/2008 | Armstrong | |
| 7,345,671 B2 | 3/2008 | Robbin et al. | |
| 7,349,953 B2 | 3/2008 | Lisitsa et al. | |
| 7,353,139 B1 | 4/2008 | Burrell et al. | |
| 7,356,748 B2 | 4/2008 | Taleb | |
| 7,359,493 B1 | 4/2008 | Wang et al. | |
| 7,359,671 B2 | 4/2008 | Richenstein et al. | |
| 7,359,851 B2 | 4/2008 | Tong et al. | |
| 7,360,158 B1 | 4/2008 | Beeman | |
| 7,362,738 B2 | 4/2008 | Taube et al. | |
| 7,363,227 B2 | 4/2008 | Mapes-Riordan et al. | |
| 7,363,586 B1 | 4/2008 | Briggs et al. | |
| 7,365,260 B2 | 4/2008 | Kawashima | |
| 7,366,461 B1 | 4/2008 | Brown | |
| 7,369,984 B2 | 5/2008 | Fairweather | |
| 7,369,993 B1 | 5/2008 | Atal | |
| 7,373,291 B2 | 5/2008 | Garst | |
| 7,373,612 B2 | 5/2008 | Risch et al. | |
| 7,376,556 B2 | 5/2008 | Bennett | |
| 7,376,632 B1 | 5/2008 | Sadek et al. | |
| 7,376,645 B2 | 5/2008 | Bernard | |
| 7,378,963 B1 | 5/2008 | Begault et al. | |
| 7,379,874 B2 | 5/2008 | Schmid et al. | |
| 7,380,203 B2 | 5/2008 | Keely et al. | |
| 7,383,170 B2 | 6/2008 | Mills et al. | |
| 7,386,110 B2 | 6/2008 | Petrunka et al. | |
| 7,386,438 B1 | 6/2008 | Franz et al. | |
| 7,386,449 B2 | 6/2008 | Sun et al. | |
| 7,386,799 B1 | 6/2008 | Clanton et al. | |
| 7,389,224 B1 | 6/2008 | Elworthy | |
| 7,389,225 B1 | 6/2008 | Jensen et al. | |
| 7,392,185 B2 | 6/2008 | Bennett | |
| 7,394,947 B2 | 7/2008 | Li et al. | |
| 7,398,209 B2 | 7/2008 | Kennewick et al. | |
| 7,401,300 B2 | 7/2008 | Nurmi | |
| 7,403,938 B2 | 7/2008 | Harrison et al. | |
| 7,403,941 B2 | 7/2008 | Bedworth et al. | |
| 7,404,143 B2 | 7/2008 | Freelander et al. | |
| 7,409,337 B1 | 8/2008 | Potter et al. | |
| 7,409,347 B1 | 8/2008 | Bellegarda | |
| 7,412,389 B2 | 8/2008 | Yang | |
| 7,412,470 B2 | 8/2008 | Masuno et al. | |
| 7,415,100 B2 | 8/2008 | Cooper et al. | |
| 7,415,469 B2 | 8/2008 | Singh et al. | |
| 7,418,382 B1 | 8/2008 | Maes | |
| 7,418,389 B2 | 8/2008 | Chu et al. | |
| 7,418,392 B1 | 8/2008 | Mozer et al. | |
| 7,426,467 B2 | 9/2008 | Nashida et al. | |
| 7,426,468 B2 | 9/2008 | Coifman et al. | |
| 7,427,024 B1 | 9/2008 | Gazdzinski et al. | |
| 7,428,541 B2 | 9/2008 | Houle | |
| 7,430,508 B2 | 9/2008 | Williamson et al. | |
| 7,433,869 B2 | 10/2008 | Gollapudi | |
| 7,433,921 B2 | 10/2008 | Ludwig et al. | |
| 7,436,947 B2 | 10/2008 | Wadler et al. | |
| 7,441,184 B2 | 10/2008 | Frerebeau et al. | |
| 7,443,316 B2 | 10/2008 | Lim | |
| 7,444,589 B2 | 10/2008 | Zellner | |
| 7,447,360 B2 | 11/2008 | Li et al. | |
| 7,447,624 B2 | 11/2008 | Fuhrmann et al. | |
| 7,447,635 B1 | 11/2008 | Konopka et al. | |
| 7,447,637 B1 | 11/2008 | Grant et al. | |
| 7,451,081 B1 | 11/2008 | Gajic et al. | |
| 7,454,351 B2 | 11/2008 | Jeschke et al. | |
| 7,460,652 B2 | 12/2008 | Chang | |
| 7,461,043 B2 | 12/2008 | Hess | |
| 7,467,087 B1 | 12/2008 | Gillick et al. | |
| 7,467,164 B2 | 12/2008 | Marsh | |
| 7,472,061 B1 | 12/2008 | Alewine et al. | |
| 7,472,065 B2 | 12/2008 | Aaron et al. | |
| 7,475,010 B2 | 1/2009 | Chao | |
| 7,475,015 B2 | 1/2009 | Epstein et al. | |
| 7,475,063 B2 | 1/2009 | Datta et al. | |
| 7,477,238 B2 | 1/2009 | Fux et al. | |
| 7,477,240 B2 | 1/2009 | Yanagisawa | |
| 7,478,037 B2 | 1/2009 | Strong | |
| 7,478,091 B2 | 1/2009 | Mojsilovic et al. | |
| 7,478,129 B1 | 1/2009 | Chemtob | |
| 7,479,948 B2 | 1/2009 | Kim et al. | |
| 7,479,949 B2 | 1/2009 | Jobs et al. | |
| 7,483,832 B2 | 1/2009 | Tischer | |
| 7,483,894 B2 | 1/2009 | Cao | |
| 7,487,089 B2 | 2/2009 | Mozer | |
| 7,487,093 B2 | 2/2009 | Mutsuno et al. | |
| 7,490,034 B2 | 2/2009 | Finnigan et al. | |
| 7,490,039 B1 | 2/2009 | Shaffer et al. | |
| 7,493,251 B2 | 2/2009 | Gao et al. | |
| 7,493,560 B1 | 2/2009 | Kipnes et al. | |
| 7,496,498 B2 | 2/2009 | Chu et al. | |
| 7,496,512 B2 | 2/2009 | Zhao et al. | |
| 7,499,923 B2 | 3/2009 | Kawatani | |
| 7,502,738 B2 | 3/2009 | Kennewick et al. | |
| 7,505,795 B1 | 3/2009 | Lim et al. | |
| 7,508,324 B2 | 3/2009 | Suraqui | |
| 7,508,373 B2 | 3/2009 | Lin et al. | |
| 7,516,123 B2 | 4/2009 | Betz et al. | |
| 7,519,327 B2 | 4/2009 | White | |
| 7,519,398 B2 | 4/2009 | Hirose | |
| 7,522,927 B2 | 4/2009 | Fitch et al. | |
| 7,523,036 B2 | 4/2009 | Akabane et al. | |
| 7,523,108 B2 | 4/2009 | Cao | |
| 7,526,466 B2 | 4/2009 | Au | |
| 7,526,738 B2 | 4/2009 | Ording et al. | |
| 7,528,713 B2 | 5/2009 | Singh et al. | |
| 7,529,671 B2 | 5/2009 | Rockenbeck et al. | |
| 7,529,676 B2 | 5/2009 | Koyama | |
| 7,535,997 B1 | 5/2009 | McQuaide, Jr. et al. | |
| 7,536,029 B2 | 5/2009 | Choi et al. | |
| 7,536,565 B2 | 5/2009 | Girish et al. | |
| 7,538,685 B1 | 5/2009 | Cooper et al. | |
| 7,539,619 B1 | 5/2009 | Seligman et al. | |
| 7,539,656 B2 | 5/2009 | Fratkina et al. | |
| 7,541,940 B2 | 6/2009 | Upton | |
| 7,542,967 B2 | 6/2009 | Hurst-Hiller et al. | |
| 7,542,971 B2 | 6/2009 | Thione et al. | |
| 7,543,232 B2 | 6/2009 | Easton, Jr. et al. | |
| 7,546,382 B2 | 6/2009 | Healey et al. | |
| 7,546,529 B2 | 6/2009 | Reynar et al. | |
| 7,548,895 B2 | 6/2009 | Pulsipher | |
| 7,552,045 B2 | 6/2009 | Barliga et al. | |
| 7,552,055 B2 | 6/2009 | Lecoeuche | |
| 7,555,431 B2 | 6/2009 | Bennett | |
| 7,555,496 B1 | 6/2009 | Lantrip et al. | |
| 7,558,381 B1 | 7/2009 | Ali et al. | |

(56) References Cited

U.S. PATENT DOCUMENTS

| | | |
|---|---|---|
| 7,558,730 B2 | 7/2009 | Davis et al. |
| 7,559,026 B2 | 7/2009 | Girish et al. |
| 7,561,069 B2 | 7/2009 | Horstemeyer |
| 7,562,007 B2 | 7/2009 | Hwang |
| 7,562,032 B2 | 7/2009 | Abbosh et al. |
| 7,565,104 B1 | 7/2009 | Brown et al. |
| 7,565,380 B1 | 7/2009 | Venkatachary |
| 7,568,151 B2 | 7/2009 | Bergeron et al. |
| 7,571,092 B1 | 8/2009 | Nieh |
| 7,571,106 B2 | 8/2009 | Cao et al. |
| 7,577,522 B2 | 8/2009 | Rosenberg |
| 7,580,551 B1 | 8/2009 | Srihari et al. |
| 7,580,576 B2 | 8/2009 | Wang et al. |
| 7,580,839 B2 | 8/2009 | Tamura et al. |
| 7,584,092 B2 | 9/2009 | Brockett et al. |
| 7,584,093 B2 | 9/2009 | Potter et al. |
| 7,584,278 B2 | 9/2009 | Rajarajan et al. |
| 7,584,429 B2 | 9/2009 | Fabritius |
| 7,593,868 B2 | 9/2009 | Margiloff et al. |
| 7,596,269 B2 | 9/2009 | King et al. |
| 7,596,499 B2 | 9/2009 | Anguera et al. |
| 7,596,606 B2 | 9/2009 | Codignotto |
| 7,596,765 B2 | 9/2009 | Almas |
| 7,599,918 B2 | 10/2009 | Shen et al. |
| 7,603,349 B1 | 10/2009 | Kraft et al. |
| 7,603,381 B2 | 10/2009 | Burke et al. |
| 7,606,444 B1 | 10/2009 | Erol et al. |
| 7,606,712 B1 | 10/2009 | Smith et al. |
| 7,607,083 B2 | 10/2009 | Gong et al. |
| 7,609,179 B2 | 10/2009 | Diaz-Gutierrez et al. |
| 7,610,258 B2 | 10/2009 | Yuknewicz et al. |
| 7,613,264 B2 | 11/2009 | Wells et al. |
| 7,614,008 B2 | 11/2009 | Ording |
| 7,617,094 B2 | 11/2009 | Aoki et al. |
| 7,620,407 B1 | 11/2009 | Donald et al. |
| 7,620,549 B2 | 11/2009 | Di Cristo et al. |
| 7,620,894 B1 | 11/2009 | Kahn |
| 7,623,119 B2 | 11/2009 | Autio et al. |
| 7,624,007 B2 | 11/2009 | Bennett |
| 7,627,481 B1 | 12/2009 | Kuo et al. |
| 7,630,900 B1 | 12/2009 | Strom |
| 7,630,901 B2 | 12/2009 | Omi |
| 7,633,076 B2 | 12/2009 | Huppi et al. |
| 7,634,409 B2 | 12/2009 | Kennewick et al. |
| 7,634,413 B1 | 12/2009 | Kuo et al. |
| 7,634,718 B2 | 12/2009 | Nakajima |
| 7,634,732 B1 | 12/2009 | Blagsvedt et al. |
| 7,636,657 B2 | 12/2009 | Ju et al. |
| 7,640,158 B2 | 12/2009 | Detlef et al. |
| 7,640,160 B2 | 12/2009 | Di Cristo et al. |
| 7,643,990 B1 | 1/2010 | Bellegarda |
| 7,647,225 B2 | 1/2010 | Bennett et al. |
| 7,649,454 B2 | 1/2010 | Singh et al. |
| 7,649,877 B2 | 1/2010 | Vieri et al. |
| 7,653,883 B2 | 1/2010 | Hotelling et al. |
| 7,656,393 B2 | 2/2010 | King et al. |
| 7,657,424 B2 | 2/2010 | Bennett |
| 7,657,828 B2 | 2/2010 | Lucas et al. |
| 7,657,844 B2 | 2/2010 | Gibson et al. |
| 7,657,849 B2 | 2/2010 | Chaudhri et al. |
| 7,660,715 B1 | 2/2010 | Thambiratnam |
| 7,663,607 B2 | 2/2010 | Hotelling et al. |
| 7,664,558 B2 | 2/2010 | Lindahl et al. |
| 7,664,638 B2 | 2/2010 | Cooper et al. |
| 7,668,710 B2 | 2/2010 | Doyle |
| 7,669,134 B1 | 2/2010 | Christie et al. |
| 7,672,841 B2 | 3/2010 | Bennett |
| 7,672,952 B2 | 3/2010 | Isaacson et al. |
| 7,673,238 B2 | 3/2010 | Girish et al. |
| 7,673,251 B1 * | 3/2010 | Wibisono .............. G06F 9/451 715/771 |
| 7,673,340 B1 | 3/2010 | Cohen et al. |
| 7,676,026 B1 | 3/2010 | Baxter, Jr. |
| 7,676,365 B2 | 3/2010 | Hwang et al. |
| 7,676,463 B2 | 3/2010 | Thompson et al. |
| 7,679,534 B2 | 3/2010 | Kay et al. |
| 7,680,649 B2 | 3/2010 | Park |
| 7,681,126 B2 | 3/2010 | Roose |
| 7,683,886 B2 | 3/2010 | Willey |
| 7,683,893 B2 | 3/2010 | Kim |
| 7,684,985 B2 | 3/2010 | Dominach et al. |
| 7,684,990 B2 | 3/2010 | Caskey et al. |
| 7,684,991 B2 | 3/2010 | Stohr et al. |
| 7,689,245 B2 | 3/2010 | Cox et al. |
| 7,689,408 B2 | 3/2010 | Chen et al. |
| 7,689,409 B2 | 3/2010 | Heinecke |
| 7,689,412 B2 | 3/2010 | Wu et al. |
| 7,689,421 B2 | 3/2010 | Li et al. |
| 7,693,715 B2 | 4/2010 | Hwang et al. |
| 7,693,717 B2 | 4/2010 | Kahn et al. |
| 7,693,719 B2 | 4/2010 | Chu et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,703,091 B1 | 4/2010 | Martin et al. |
| 7,706,510 B2 | 4/2010 | Ng |
| 7,707,026 B2 | 4/2010 | Liu |
| 7,707,027 B2 | 4/2010 | Balchandran et al. |
| 7,707,032 B2 | 4/2010 | Wang et al. |
| 7,707,221 B1 | 4/2010 | Dunning et al. |
| 7,707,226 B1 | 4/2010 | Tonse |
| 7,707,267 B2 | 4/2010 | Lisitsa et al. |
| 7,710,262 B2 | 5/2010 | Ruha |
| 7,711,129 B2 | 5/2010 | Lindahl et al. |
| 7,711,550 B1 | 5/2010 | Feinberg et al. |
| 7,711,565 B1 | 5/2010 | Gazdzinski |
| 7,711,672 B2 | 5/2010 | Au |
| 7,712,053 B2 | 5/2010 | Bradford et al. |
| 7,716,056 B2 | 5/2010 | Weng et al. |
| 7,716,216 B1 | 5/2010 | Harik et al. |
| 7,720,674 B2 | 5/2010 | Kaiser et al. |
| 7,720,683 B1 | 5/2010 | Vermeulen et al. |
| 7,721,226 B2 | 5/2010 | Barabe et al. |
| 7,721,301 B2 | 5/2010 | Wong et al. |
| 7,724,242 B2 | 5/2010 | Hillis et al. |
| 7,724,696 B1 | 5/2010 | Parekh |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,725,838 B2 | 5/2010 | Williams |
| 7,729,904 B2 | 6/2010 | Bennett |
| 7,729,916 B2 | 6/2010 | Coffman et al. |
| 7,734,461 B2 | 6/2010 | Kwak et al. |
| 7,735,012 B2 | 6/2010 | Naik |
| 7,739,588 B2 | 6/2010 | Reynar et al. |
| 7,742,953 B2 | 6/2010 | King et al. |
| 7,743,188 B2 | 6/2010 | Haitani et al. |
| 7,747,616 B2 | 6/2010 | Yamada et al. |
| 7,752,152 B2 | 7/2010 | Paek et al. |
| 7,756,707 B2 | 7/2010 | Garner et al. |
| 7,756,708 B2 | 7/2010 | Cohen et al. |
| 7,756,868 B2 | 7/2010 | Lee |
| 7,756,871 B2 | 7/2010 | Yacoub et al. |
| 7,757,173 B2 | 7/2010 | Beaman |
| 7,757,182 B2 | 7/2010 | Elliott et al. |
| 7,761,296 B1 | 7/2010 | Bakis et al. |
| 7,763,842 B2 | 7/2010 | Hsu et al. |
| 7,774,202 B2 | 8/2010 | Spengler et al. |
| 7,774,204 B2 | 8/2010 | Mozer et al. |
| 7,774,388 B1 | 8/2010 | Runchey |
| 7,777,717 B2 | 8/2010 | Fux et al. |
| 7,778,432 B2 | 8/2010 | Larsen |
| 7,778,595 B2 | 8/2010 | White et al. |
| 7,778,632 B2 | 8/2010 | Kurlander et al. |
| 7,778,830 B2 | 8/2010 | Davis et al. |
| 7,779,353 B2 | 8/2010 | Grigoriu et al. |
| 7,779,356 B2 | 8/2010 | Griesmer |
| 7,779,357 B2 | 8/2010 | Naik |
| 7,783,283 B2 | 8/2010 | Kuusinen et al. |
| 7,783,486 B2 | 8/2010 | Rosser et al. |
| 7,788,590 B2 | 8/2010 | Taboada et al. |
| 7,788,663 B2 | 8/2010 | Illowsky et al. |

(56) References Cited

U.S. PATENT DOCUMENTS

| | | |
|---|---|---|
| 7,796,980 B1 | 9/2010 | McKinney et al. |
| 7,797,265 B2 | 9/2010 | Brinker et al. |
| 7,797,269 B2 | 9/2010 | Rieman et al. |
| 7,797,331 B2 | 9/2010 | Theimer et al. |
| 7,797,629 B2 | 9/2010 | Fux et al. |
| 7,801,721 B2 | 9/2010 | Rosart et al. |
| 7,801,728 B2 | 9/2010 | Ben-David et al. |
| 7,801,729 B2 | 9/2010 | Mozer |
| 7,805,299 B2 | 9/2010 | Coifman |
| 7,809,550 B1 | 10/2010 | Barrows |
| 7,809,565 B2 | 10/2010 | Coifman |
| 7,809,569 B2 | 10/2010 | Attwater et al. |
| 7,809,570 B2 | 10/2010 | Kennewick et al. |
| 7,809,610 B2 | 10/2010 | Cao |
| 7,809,744 B2 | 10/2010 | Nevidomski et al. |
| 7,818,165 B2 | 10/2010 | Carlgren et al. |
| 7,818,176 B2 | 10/2010 | Freeman et al. |
| 7,818,215 B2 | 10/2010 | King et al. |
| 7,818,291 B2 | 10/2010 | Ferguson et al. |
| 7,818,672 B2 | 10/2010 | Mccormack et al. |
| 7,822,608 B2 | 10/2010 | Cross, Jr. et al. |
| 7,823,123 B2 | 10/2010 | Sabbouh |
| 7,826,945 B2 | 11/2010 | Zhang et al. |
| 7,827,047 B2 | 11/2010 | Anderson et al. |
| 7,831,246 B1 | 11/2010 | Smith et al. |
| 7,831,423 B2 | 11/2010 | Schubert |
| 7,831,426 B2 | 11/2010 | Bennett |
| 7,831,432 B2 | 11/2010 | Bodin et al. |
| 7,835,504 B1 | 11/2010 | Donald et al. |
| 7,836,437 B2 | 11/2010 | Kacmarcik et al. |
| 7,840,348 B2 | 11/2010 | Kim et al. |
| 7,840,400 B2 | 11/2010 | Lavi et al. |
| 7,840,447 B2 | 11/2010 | Kleinrock et al. |
| 7,840,581 B2 | 11/2010 | Ross et al. |
| 7,840,912 B2 | 11/2010 | Elias et al. |
| 7,844,394 B2 | 11/2010 | Kim |
| 7,848,924 B2 | 12/2010 | Nurminen et al. |
| 7,848,926 B2 | 12/2010 | Goto et al. |
| 7,853,444 B2 | 12/2010 | Wang et al. |
| 7,853,445 B2 | 12/2010 | Bachenko et al. |
| 7,853,574 B2 | 12/2010 | Kraenzel et al. |
| 7,853,577 B2 | 12/2010 | Sundaresan et al. |
| 7,853,664 B1 | 12/2010 | Wang et al. |
| 7,853,900 B2 | 12/2010 | Nguyen et al. |
| 7,865,817 B2 | 1/2011 | Ryan et al. |
| 7,869,998 B1 | 1/2011 | Di Fabbrizio et al. |
| 7,869,999 B2 | 1/2011 | Amato et al. |
| 7,870,118 B2 | 1/2011 | Jiang et al. |
| 7,870,133 B2 | 1/2011 | Krishnamoorthy et al. |
| 7,873,149 B2 | 1/2011 | Schultz et al. |
| 7,873,519 B2 | 1/2011 | Bennett |
| 7,873,654 B2 | 1/2011 | Bernard |
| 7,877,705 B2 | 1/2011 | Chambers et al. |
| 7,880,730 B2 | 2/2011 | Robinson et al. |
| 7,881,283 B2 | 2/2011 | Cormier et al. |
| 7,881,936 B2 | 2/2011 | Longe et al. |
| 7,885,390 B2 | 2/2011 | Chaudhuri et al. |
| 7,885,844 B1 | 2/2011 | Cohen et al. |
| 7,886,233 B2 | 2/2011 | Rainisto et al. |
| 7,889,101 B2 | 2/2011 | Yokota |
| 7,889,184 B2 | 2/2011 | Blumenberg et al. |
| 7,889,185 B2 | 2/2011 | Blumenberg et al. |
| 7,890,330 B2 | 2/2011 | Ozkaragoz et al. |
| 7,890,652 B2 | 2/2011 | Bull et al. |
| 7,895,039 B2 | 2/2011 | Braho et al. |
| 7,895,531 B2 | 2/2011 | Radtke et al. |
| 7,899,666 B2 | 3/2011 | Varone |
| 7,904,297 B2 | 3/2011 | Mirkovic et al. |
| 7,908,287 B1 | 3/2011 | Katragadda |
| 7,912,289 B2 | 3/2011 | Kansal et al. |
| 7,912,699 B1 | 3/2011 | Saraclar et al. |
| 7,912,702 B2 | 3/2011 | Bennett |
| 7,912,720 B1 | 3/2011 | Hakkani-Tur et al. |
| 7,912,828 B2 | 3/2011 | Bonnet et al. |
| 7,913,185 B1 | 3/2011 | Benson et al. |
| 7,916,979 B2 | 3/2011 | Simmons |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,920,682 B2 | 4/2011 | Byrne et al. |
| 7,920,857 B2 | 4/2011 | Lau et al. |
| 7,925,525 B2 | 4/2011 | Chin |
| 7,925,610 B2 | 4/2011 | Elbaz et al. |
| 7,929,805 B2 | 4/2011 | Wang et al. |
| 7,930,168 B2 | 4/2011 | Weng et al. |
| 7,930,183 B2 | 4/2011 | Odell et al. |
| 7,930,197 B2 | 4/2011 | Ozzie et al. |
| 7,936,339 B2 | 5/2011 | Marggraff et al. |
| 7,936,861 B2 | 5/2011 | Martin et al. |
| 7,936,863 B2 | 5/2011 | John et al. |
| 7,937,075 B2 | 5/2011 | Zellner |
| 7,941,009 B2 | 5/2011 | Li et al. |
| 7,945,294 B2 | 5/2011 | Zhang et al. |
| 7,945,470 B1 | 5/2011 | Cohen et al. |
| 7,949,529 B2 | 5/2011 | Weider et al. |
| 7,949,534 B2 | 5/2011 | Davis et al. |
| 7,949,752 B2 | 5/2011 | Lange et al. |
| 7,953,679 B2 | 5/2011 | Chidlovskii et al. |
| 7,957,975 B2 | 6/2011 | Burns et al. |
| 7,958,136 B1 | 6/2011 | Curtis et al. |
| 7,962,179 B2 | 6/2011 | Huang |
| 7,974,835 B2 | 7/2011 | Balchandran et al. |
| 7,974,844 B2 | 7/2011 | Sumita |
| 7,974,972 B2 | 7/2011 | Cao |
| 7,975,216 B2 | 7/2011 | Woolf et al. |
| 7,983,478 B2 | 7/2011 | Liu et al. |
| 7,983,915 B2 | 7/2011 | Knight et al. |
| 7,983,917 B2 | 7/2011 | Kennewick et al. |
| 7,983,919 B2 | 7/2011 | Conkie |
| 7,983,997 B2 | 7/2011 | Allen et al. |
| 7,984,062 B2 | 7/2011 | Dunning et al. |
| 7,986,431 B2 | 7/2011 | Emori et al. |
| 7,987,151 B2 | 7/2011 | Schott et al. |
| 7,987,244 B1 | 7/2011 | Lewis et al. |
| 7,991,614 B2 | 8/2011 | Washio et al. |
| 7,992,085 B2 | 8/2011 | Wang-Aryattanwanich et al. |
| 7,996,228 B2 | 8/2011 | Miller et al. |
| 7,996,589 B2 | 8/2011 | Schultz et al. |
| 7,996,769 B2 | 8/2011 | Fux et al. |
| 7,996,792 B2 | 8/2011 | Anzures et al. |
| 7,999,669 B2 | 8/2011 | Singh et al. |
| 8,000,453 B2 | 8/2011 | Cooper et al. |
| 8,005,664 B2 | 8/2011 | Hanumanthappa |
| 8,005,679 B2 | 8/2011 | Jordan et al. |
| 8,006,180 B2 | 8/2011 | Tunning et al. |
| 8,014,308 B2 | 9/2011 | Gates et al. |
| 8,015,006 B2 | 9/2011 | Kennewick et al. |
| 8,015,011 B2 | 9/2011 | Nagano et al. |
| 8,015,144 B2 | 9/2011 | Zheng et al. |
| 8,018,431 B1 | 9/2011 | Zehr et al. |
| 8,019,271 B1 | 9/2011 | Izdepski |
| 8,019,604 B2 | 9/2011 | Ma |
| 8,020,104 B2 | 9/2011 | Roberts et al. |
| 8,024,195 B2 | 9/2011 | Mozer et al. |
| 8,024,415 B2 | 9/2011 | Horvitz et al. |
| 8,027,836 B2 | 9/2011 | Baker et al. |
| 8,031,943 B2 | 10/2011 | Chen et al. |
| 8,032,383 B1 | 10/2011 | Bhardwaj et al. |
| 8,036,901 B2 | 10/2011 | Mozer |
| 8,037,034 B2 | 10/2011 | Plachta et al. |
| 8,041,557 B2 | 10/2011 | Liu |
| 8,041,570 B2 | 10/2011 | Mirkovic et al. |
| 8,041,611 B2 | 10/2011 | Kleinrock et al. |
| 8,042,053 B2 | 10/2011 | Darwish et al. |
| 8,046,363 B2 | 10/2011 | Cha et al. |
| 8,046,374 B1 | 10/2011 | Bromwich et al. |
| 8,050,500 B1 | 11/2011 | Batty et al. |
| 8,054,180 B1 | 11/2011 | Scofield et al. |
| 8,055,502 B2 | 11/2011 | Clark et al. |
| 8,055,708 B2 | 11/2011 | Chitsaz et al. |
| 8,056,070 B2 | 11/2011 | Goller et al. |
| 8,060,824 B2 | 11/2011 | Brownrigg, Jr. et al. |
| 8,064,753 B2 | 11/2011 | Freeman |
| 8,065,143 B2 | 11/2011 | Yanagihara |

(56) References Cited

U.S. PATENT DOCUMENTS

| | | |
|---|---|---|
| 8,065,155 B1 | 11/2011 | Gazdzinski |
| 8,065,156 B2 | 11/2011 | Gazdzinski |
| 8,068,604 B2 | 11/2011 | Leeds et al. |
| 8,069,046 B2 | 11/2011 | Kennewick et al. |
| 8,069,422 B2 | 11/2011 | Sheshagiri et al. |
| 8,073,681 B2 | 12/2011 | Baldwin et al. |
| 8,073,695 B1 | 12/2011 | Hendricks et al. |
| 8,077,153 B2 | 12/2011 | Benko et al. |
| 8,078,473 B1 | 12/2011 | Gazdzinski |
| 8,082,153 B2 | 12/2011 | Coffman et al. |
| 8,082,498 B2 | 12/2011 | Salamon et al. |
| 8,090,571 B2 | 1/2012 | Elshishiny et al. |
| 8,095,364 B2 | 1/2012 | Longe et al. |
| 8,099,289 B2 | 1/2012 | Mozer et al. |
| 8,099,395 B2 | 1/2012 | Pabla et al. |
| 8,099,418 B2 | 1/2012 | Inoue et al. |
| 8,103,510 B2 | 1/2012 | Sato |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,117,542 B2 | 2/2012 | Radtke et al. |
| 8,121,413 B2 | 2/2012 | Hwang et al. |
| 8,121,837 B2 | 2/2012 | Agapi et al. |
| 8,122,094 B1 | 2/2012 | Kotab |
| 8,122,353 B2 | 2/2012 | Bouta |
| 8,130,929 B2 | 3/2012 | Wilkes et al. |
| 8,131,557 B2 | 3/2012 | Davis et al. |
| 8,135,115 B1 | 3/2012 | Hogg, Jr. et al. |
| 8,138,912 B2 | 3/2012 | Singh et al. |
| 8,140,330 B2 | 3/2012 | Cevik et al. |
| 8,140,335 B2 | 3/2012 | Kennewick et al. |
| 8,140,567 B2 | 3/2012 | Padovitz et al. |
| 8,145,489 B2 | 3/2012 | Freeman et al. |
| 8,150,694 B2 | 4/2012 | Kennewick et al. |
| 8,150,700 B2 | 4/2012 | Shin et al. |
| 8,155,956 B2 | 4/2012 | Cho et al. |
| 8,156,005 B2 | 4/2012 | Vieri |
| 8,160,877 B1 | 4/2012 | Nucci et al. |
| 8,160,883 B2 | 4/2012 | Lecoeuche |
| 8,165,321 B2 | 4/2012 | Paquier et al. |
| 8,165,886 B1 * | 4/2012 | Gagnon .............. G10L 15/19 704/275 |
| 8,166,019 B1 | 4/2012 | Lee et al. |
| 8,166,032 B2 | 4/2012 | Sommer et al. |
| 8,170,790 B2 | 5/2012 | Lee et al. |
| 8,175,872 B2 | 5/2012 | Kristjansson et al. |
| 8,175,876 B2 | 5/2012 | Bou-Ghazale et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,190,596 B2 | 5/2012 | Nambiar et al. |
| 8,195,467 B2 | 6/2012 | Mozer et al. |
| 8,195,468 B2 | 6/2012 | Kennewick et al. |
| 8,200,489 B1 | 6/2012 | Baggenstoss |
| 8,200,495 B2 | 6/2012 | Braho et al. |
| 8,201,109 B2 | 6/2012 | Van Os et al. |
| 8,204,238 B2 | 6/2012 | Mozer |
| 8,205,788 B1 | 6/2012 | Gazdzinski et al. |
| 8,209,183 B1 | 6/2012 | Patel et al. |
| 8,213,911 B2 | 7/2012 | Williams et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,608 B2 | 7/2012 | alSafadi et al. |
| 8,224,649 B2 | 7/2012 | Chaudhari et al. |
| 8,228,299 B1 | 7/2012 | Maloney et al. |
| 8,233,919 B2 | 7/2012 | Haag et al. |
| 8,234,111 B2 | 7/2012 | Lloyd et al. |
| 8,239,206 B1 | 8/2012 | LeBeau et al. |
| 8,239,207 B2 | 8/2012 | Seligman et al. |
| 8,244,712 B2 | 8/2012 | Serlet et al. |
| 8,250,071 B1 | 8/2012 | Killalea et al. |
| 8,254,829 B1 | 8/2012 | Kindred et al. |
| 8,255,216 B2 | 8/2012 | White |
| 8,255,217 B2 | 8/2012 | Stent et al. |
| 8,260,247 B2 | 9/2012 | Lazaridis et al. |
| 8,260,617 B2 | 9/2012 | Dhanakshirur et al. |
| 8,270,933 B2 | 9/2012 | Riemer et al. |
| 8,271,287 B1 | 9/2012 | Kermani |
| 8,275,621 B2 | 9/2012 | Alewine et al. |
| 8,279,171 B2 | 10/2012 | Hirai et al. |
| 8,280,438 B2 | 10/2012 | Barbera |
| 8,285,546 B2 | 10/2012 | Reich |
| 8,285,551 B2 | 10/2012 | Gazdzinski |
| 8,285,553 B2 | 10/2012 | Gazdzinski |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,124 B1 | 10/2012 | Holsztynska et al. |
| 8,296,145 B2 | 10/2012 | Clark et al. |
| 8,296,146 B2 | 10/2012 | Gazdzinski |
| 8,296,153 B2 | 10/2012 | Gazdzinski |
| 8,296,380 B1 | 10/2012 | Kelly et al. |
| 8,296,383 B2 | 10/2012 | Lindahl |
| 8,300,776 B2 | 10/2012 | Davies et al. |
| 8,300,801 B2 | 10/2012 | Sweeney et al. |
| 8,301,456 B2 | 10/2012 | Gazdzinski |
| 8,311,189 B2 | 11/2012 | Champlin et al. |
| 8,311,834 B1 | 11/2012 | Gazdzinski |
| 8,311,835 B2 | 11/2012 | Lecoeuche |
| 8,311,838 B2 | 11/2012 | Lindahl et al. |
| 8,312,017 B2 | 11/2012 | Martin et al. |
| 8,321,786 B2 | 11/2012 | Lunati et al. |
| 8,326,627 B2 | 12/2012 | Kennewick et al. |
| 8,332,205 B2 | 12/2012 | Krishnan et al. |
| 8,332,218 B2 | 12/2012 | Cross et al. |
| 8,332,224 B2 | 12/2012 | Di Cristo et al. |
| 8,332,748 B1 | 12/2012 | Karam |
| 8,335,689 B2 | 12/2012 | Wittenstein et al. |
| 8,340,975 B1 | 12/2012 | Rosenberger |
| 8,345,665 B2 | 1/2013 | Vieri et al. |
| 8,346,563 B1 | 1/2013 | Hjelm et al. |
| 8,352,183 B2 | 1/2013 | Thota et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,145 B2 | 2/2013 | Endo et al. |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,380,504 B1 | 2/2013 | Peden et al. |
| 8,380,507 B2 | 2/2013 | Herman et al. |
| 8,381,107 B2 | 2/2013 | Rottler et al. |
| 8,381,135 B2 | 2/2013 | Hotelling et al. |
| 8,386,485 B2 | 2/2013 | Kerschberg et al. |
| 8,386,926 B1 | 2/2013 | Matsuoka |
| 8,391,844 B2 | 3/2013 | Lamiraux et al. |
| 8,396,714 B2 | 3/2013 | Rogers et al. |
| 8,401,163 B1 | 3/2013 | Kirchhoff et al. |
| 8,406,745 B1 | 3/2013 | Upadhyay et al. |
| 8,423,288 B2 | 4/2013 | Stahl et al. |
| 8,428,758 B2 | 4/2013 | Naik et al. |
| 8,433,572 B2 | 4/2013 | Caskey et al. |
| 8,433,778 B1 * | 4/2013 | Shreesha .............. H04N 5/4403 709/218 |
| 8,442,821 B1 | 5/2013 | Vanhoucke |
| 8,447,612 B2 | 5/2013 | Gazdzinski |
| 8,452,597 B2 | 5/2013 | Bringert et al. |
| 8,457,959 B2 | 6/2013 | Kaiser |
| 8,458,115 B2 | 6/2013 | Cai et al. |
| 8,458,278 B2 | 6/2013 | Christie et al. |
| 8,464,150 B2 | 6/2013 | Davidson et al. |
| 8,473,289 B2 | 6/2013 | Jitkoff et al. |
| 8,479,122 B2 | 7/2013 | Hotelling et al. |
| 8,484,027 B1 | 7/2013 | Murphy |
| 8,489,599 B2 | 7/2013 | Bellotti |
| 8,498,857 B2 | 7/2013 | Kopparapu et al. |
| 8,514,197 B2 | 8/2013 | Shahraray et al. |
| 8,515,750 B1 | 8/2013 | Lei et al. |
| 8,521,513 B2 | 8/2013 | Millett et al. |
| 8,521,531 B1 | 8/2013 | Kim |

(56) References Cited

U.S. PATENT DOCUMENTS

| | | |
|---|---|---|
| 8,527,276 B1 | 9/2013 | Senior et al. |
| 8,537,033 B2 | 9/2013 | Gueziec |
| 8,543,375 B2 | 9/2013 | Hong |
| 8,543,397 B1 | 9/2013 | Nguyen |
| 8,543,398 B1 | 9/2013 | Strope et al. |
| 8,560,229 B1 | 10/2013 | Park et al. |
| 8,571,851 B1 | 10/2013 | Tickner et al. |
| 8,583,416 B2 | 11/2013 | Huang et al. |
| 8,583,511 B2 | 11/2013 | Hendrickson |
| 8,589,869 B2 | 11/2013 | Wolfram |
| 8,589,911 B1 * | 11/2013 | Sharkey ............... G06F 8/61 717/173 |
| 8,595,004 B2 | 11/2013 | Koshinaka |
| 8,600,743 B2 | 12/2013 | Lindahl et al. |
| 8,600,746 B1 | 12/2013 | Lei et al. |
| 8,600,930 B2 | 12/2013 | Sata et al. |
| 8,606,090 B2 | 12/2013 | Eyer |
| 8,606,568 B1 | 12/2013 | Tickner et al. |
| 8,606,576 B1 | 12/2013 | Barr et al. |
| 8,620,659 B2 | 12/2013 | Di Cristo et al. |
| 8,620,662 B2 | 12/2013 | Bellegarda |
| 8,626,681 B1 | 1/2014 | Jurca et al. |
| 8,638,363 B2 | 1/2014 | King et al. |
| 8,639,516 B2 | 1/2014 | Lindahl et al. |
| 8,645,137 B2 | 2/2014 | Bellegarda et al. |
| 8,645,138 B1 | 2/2014 | Weinstein et al. |
| 8,654,936 B1 | 2/2014 | Tofighbakhsh et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,970 B1 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,904 B2 | 3/2014 | Lindahl et al. |
| 8,677,377 B2 | 3/2014 | Cheyer et al. |
| 8,681,950 B2 | 3/2014 | Vlack et al. |
| 8,682,667 B2 | 3/2014 | Haughay et al. |
| 8,687,777 B1 | 4/2014 | Lavian et al. |
| 8,688,446 B2 | 4/2014 | Yanagihara et al. |
| 8,688,453 B1 | 4/2014 | Joshi et al. |
| 8,695,074 B2 | 4/2014 | Saraf et al. |
| 8,696,364 B2 | 4/2014 | Cohen |
| 8,706,472 B2 | 4/2014 | Ramerth et al. |
| 8,706,474 B2 | 4/2014 | Blume et al. |
| 8,706,503 B2 | 4/2014 | Cheyer et al. |
| 8,713,119 B2 | 4/2014 | Lindahl et al. |
| 8,713,418 B2 | 4/2014 | King et al. |
| 8,719,006 B2 | 5/2014 | Bellegarda et al. |
| 8,719,014 B2 | 5/2014 | Wagner et al. |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Rodriguez et al. |
| 8,744,852 B1 | 6/2014 | Seymour et al. |
| 8,760,537 B2 | 6/2014 | Johnson et al. |
| 8,762,145 B2 | 6/2014 | Ouchi et al. |
| 8,762,156 B2 | 6/2014 | Chen et al. |
| 8,762,469 B2 | 6/2014 | Lindahl et al. |
| 8,768,693 B2 | 7/2014 | Lempel et al. |
| 8,768,702 B2 | 7/2014 | Boettcher et al. |
| 8,775,154 B2 | 7/2014 | Clinchant et al. |
| 8,775,931 B2 | 7/2014 | Fux et al. |
| 8,781,456 B2 | 7/2014 | Prociw |
| 8,781,841 B1 | 7/2014 | Wang |
| 8,798,255 B2 | 8/2014 | Lubowich et al. |
| 8,798,995 B1 | 8/2014 | Edara et al. |
| 8,799,000 B2 | 8/2014 | Guzzoni et al. |
| 8,805,690 B1 | 8/2014 | LeBeau et al. |
| 8,812,302 B2 | 8/2014 | Xiao et al. |
| 8,838,457 B2 | 9/2014 | Cerra et al. |
| 8,855,915 B2 | 10/2014 | Furuhata et al. |
| 8,861,925 B1 | 10/2014 | Ohme |
| 8,862,252 B2 | 10/2014 | Rottler et al. |
| 8,868,409 B1 | 10/2014 | Mengibar et al. |
| 8,880,405 B2 | 11/2014 | Cerra et al. |
| 8,886,534 B2 | 11/2014 | Nakano et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,893,023 B2 | 11/2014 | Perry et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,930,176 B2 | 1/2015 | Li et al. |
| 8,930,191 B2 | 1/2015 | Gruber et al. |
| 8,938,394 B1 | 1/2015 | Faaborg et al. |
| 8,938,450 B2 | 1/2015 | Spivack et al. |
| 8,938,688 B2 | 1/2015 | Bradford et al. |
| 8,942,986 B2 | 1/2015 | Cheyer et al. |
| 8,943,423 B2 | 1/2015 | Merrill et al. |
| 8,972,240 B2 | 3/2015 | Brockett et al. |
| 8,972,432 B2 | 3/2015 | Shaw et al. |
| 8,972,878 B2 | 3/2015 | Mohler et al. |
| 8,983,383 B1 | 3/2015 | Haskin |
| 8,989,713 B2 | 3/2015 | Doulton |
| 8,990,235 B2 | 3/2015 | King et al. |
| 8,994,660 B2 | 3/2015 | Neels et al. |
| 8,996,350 B1 | 3/2015 | Dub et al. |
| 8,996,376 B2 | 3/2015 | Fleizach et al. |
| 8,996,381 B2 | 3/2015 | Mozer et al. |
| 8,996,639 B1 | 3/2015 | Faaborg et al. |
| 9,009,046 B1 | 4/2015 | Stewart |
| 9,020,804 B2 | 4/2015 | Barbaiani et al. |
| 9,026,425 B2 | 5/2015 | Nikoulina et al. |
| 9,031,834 B2 | 5/2015 | Coorman et al. |
| 9,037,967 B1 | 5/2015 | Al-Jefri et al. |
| 9,043,208 B2 | 5/2015 | Koch et al. |
| 9,049,255 B2 | 6/2015 | MacFarlane et al. |
| 9,049,295 B1 | 6/2015 | Cooper et al. |
| 9,053,706 B2 | 6/2015 | Jitkoff et al. |
| 9,058,811 B2 | 6/2015 | Wang et al. |
| 9,063,979 B2 | 6/2015 | Chiu et al. |
| 9,070,366 B1 | 6/2015 | Mathias et al. |
| 9,071,701 B2 | 6/2015 | Donaldson et al. |
| 9,076,448 B2 | 7/2015 | Bennett et al. |
| 9,076,450 B1 | 7/2015 | Sadek et al. |
| 9,081,411 B2 | 7/2015 | Kalns et al. |
| 9,081,482 B1 | 7/2015 | Zhai et al. |
| 9,082,402 B2 | 7/2015 | Yadgar et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,447 B2 | 8/2015 | Gruber et al. |
| 9,123,338 B1 | 9/2015 | Sanders et al. |
| 9,171,541 B2 | 10/2015 | Kennewick et al. |
| 9,171,546 B1 | 10/2015 | Pike |
| 9,190,062 B2 | 11/2015 | Haughay |
| 9,208,153 B1 | 12/2015 | Zaveri et al. |
| 9,218,809 B2 | 12/2015 | Bellegarda |
| 9,218,819 B1 | 12/2015 | Stekkelpak et al. |
| 9,223,537 B2 | 12/2015 | Brown et al. |
| 9,255,812 B2 | 2/2016 | Maeoka et al. |
| 9,258,604 B1 | 2/2016 | Bilobrov et al. |
| 9,262,612 B2 | 2/2016 | Cheyer |
| 9,280,535 B2 | 3/2016 | Varma et al. |
| 9,286,910 B1 | 3/2016 | Li et al. |
| 9,292,487 B1 | 3/2016 | Weber |
| 9,292,489 B1 | 3/2016 | Sak et al. |
| 9,299,344 B2 | 3/2016 | Braho et al. |
| 9,300,718 B2 | 3/2016 | Khanna |
| 9,305,543 B2 | 4/2016 | Fleizach et al. |
| 9,305,548 B2 | 4/2016 | Kennewick et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,325,809 B1 | 4/2016 | Barros et al. |
| 9,330,659 B2 | 5/2016 | Ju et al. |
| 9,330,720 B2 | 5/2016 | Lee |
| 9,338,493 B2 | 5/2016 | Van Os et al. |
| 9,349,368 B1 | 5/2016 | LeBeau et al. |
| 9,361,084 B1 | 6/2016 | Costa |

(56) References Cited

U.S. PATENT DOCUMENTS

| | | |
|---|---|---|
| 9,367,541 B1 | 6/2016 | Servan et al. |
| 9,377,871 B2 | 6/2016 | Waddell et al. |
| 9,378,740 B1 | 6/2016 | Rosen et al. |
| 9,380,155 B1 | 6/2016 | Reding et al. |
| 9,390,726 B1 | 7/2016 | Smus et al. |
| 9,396,722 B2 | 7/2016 | Chung et al. |
| 9,401,147 B2 | 7/2016 | Jitkoff et al. |
| 9,406,224 B1 | 8/2016 | Sanders et al. |
| 9,412,392 B2 | 8/2016 | Lindahl |
| 9,423,266 B2 | 8/2016 | Clark et al. |
| 9,424,840 B1 | 8/2016 | Hart et al. |
| 9,436,918 B2 | 9/2016 | Pantel et al. |
| 9,437,186 B1 | 9/2016 | Liu et al. |
| 9,437,189 B2 | 9/2016 | Epstein et al. |
| 9,454,957 B1 | 9/2016 | Mathias et al. |
| 9,465,833 B2 | 10/2016 | Aravamudan et al. |
| 9,471,566 B1 | 10/2016 | Zhang et al. |
| 9,484,021 B1 | 11/2016 | Mairesse et al. |
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,535,906 B2 | 1/2017 | Lee et al. |
| 9,536,527 B1 | 1/2017 | Carlson |
| 9,547,647 B2 | 1/2017 | Badaskar |
| 9,548,050 B2 | 1/2017 | Gruber et al. |
| 9,569,549 B1 | 2/2017 | Jenkins et al. |
| 9,575,964 B2 | 2/2017 | Yadgar et al. |
| 9,578,173 B2 | 2/2017 | Sanghavi et al. |
| 9,607,612 B2 | 3/2017 | Deleeuw |
| 9,620,113 B2 | 4/2017 | Kennewick et al. |
| 9,620,126 B2 | 4/2017 | Chiba |
| 9,626,955 B2 | 4/2017 | Fleizach et al. |
| 9,633,004 B2 | 4/2017 | Giuli et al. |
| 9,633,660 B2 | 4/2017 | Haughay |
| 9,652,453 B2 | 5/2017 | Mathur et al. |
| 9,658,746 B2 | 5/2017 | Cohn et al. |
| 9,665,567 B2 | 5/2017 | Liu et al. |
| 9,668,121 B2 | 5/2017 | Naik et al. |
| 9,672,725 B2 | 6/2017 | Dotan-Cohen et al. |
| 9,691,378 B1 | 6/2017 | Meyers et al. |
| 9,697,827 B1 | 7/2017 | Lilly et al. |
| 9,720,907 B2 | 8/2017 | Bangalore et al. |
| 9,721,566 B2 | 8/2017 | Newendorp et al. |
| 9,734,839 B1 | 8/2017 | Adams |
| 9,741,343 B1 | 8/2017 | Miles et al. |
| 9,747,083 B1 | 8/2017 | Roman et al. |
| 9,755,605 B1 | 9/2017 | Li et al. |
| 9,842,584 B1 | 12/2017 | Hart et al. |
| 9,934,785 B1 | 4/2018 | Hulaud |
| 9,948,728 B2 | 4/2018 | Linn et al. |
| 9,966,068 B2 | 5/2018 | Cash et al. |
| 9,967,381 B1 | 5/2018 | Kashimba et al. |
| 9,990,176 B1 | 6/2018 | Gray |
| 10,037,758 B2 | 7/2018 | Jing et al. |
| 10,049,663 B2 | 8/2018 | Orr et al. |
| 10,096,319 B1 | 10/2018 | Jin et al. |
| 2003/0005174 A1* | 1/2003 | Coffman ............... G06F 9/542 719/318 |
| 2004/0148154 A1 | 7/2004 | Acero et al. |
| 2007/0174350 A1 | 7/2007 | Pell et al. |
| 2008/0001785 A1 | 1/2008 | Elizarov et al. |
| 2008/0010050 A1 | 1/2008 | Fux et al. |
| 2008/0010355 A1 | 1/2008 | Vieri et al. |
| 2008/0010605 A1 | 1/2008 | Frank et al. |
| 2008/0012950 A1 | 1/2008 | Lee et al. |
| 2008/0013751 A1 | 1/2008 | Hiselius |
| 2008/0015863 A1 | 1/2008 | Agapi et al. |
| 2008/0015864 A1 | 1/2008 | Ross et al. |
| 2008/0016575 A1 | 1/2008 | Vincent et al. |
| 2008/0021708 A1 | 1/2008 | Bennett et al. |
| 2008/0021886 A1 | 1/2008 | Wang-Aryattanwanich et al. |
| 2008/0022208 A1 | 1/2008 | Morse |
| 2008/0027711 A1 | 1/2008 | Rajendran et al. |
| 2008/0027726 A1 | 1/2008 | Hansen et al. |
| 2008/0031475 A1 | 2/2008 | Goldstein |
| 2008/0033719 A1 | 2/2008 | Hall et al. |
| 2008/0033723 A1 | 2/2008 | Jang et al. |
| 2008/0034032 A1 | 2/2008 | Healey et al. |
| 2008/0034044 A1 | 2/2008 | Bhakta et al. |
| 2008/0034081 A1 | 2/2008 | Marshall et al. |
| 2008/0036743 A1 | 2/2008 | Westerman et al. |
| 2008/0040339 A1 | 2/2008 | Zhou et al. |
| 2008/0042970 A1 | 2/2008 | Liang et al. |
| 2008/0043936 A1 | 2/2008 | Liebermann |
| 2008/0043943 A1 | 2/2008 | Sipher et al. |
| 2008/0046239 A1 | 2/2008 | Boo |
| 2008/0046250 A1 | 2/2008 | Agapi et al. |
| 2008/0046422 A1 | 2/2008 | Lee et al. |
| 2008/0046820 A1 | 2/2008 | Lee et al. |
| 2008/0046948 A1 | 2/2008 | Verosub |
| 2008/0048908 A1 | 2/2008 | Sato |
| 2008/0050027 A1 | 2/2008 | Bashyam et al. |
| 2008/0052063 A1 | 2/2008 | Bennett et al. |
| 2008/0052073 A1 | 2/2008 | Goto et al. |
| 2008/0052077 A1 | 2/2008 | Bennett et al. |
| 2008/0052080 A1 | 2/2008 | Narayanan et al. |
| 2008/0052262 A1 | 2/2008 | Kosinov et al. |
| 2008/0055194 A1 | 3/2008 | Baudino et al. |
| 2008/0056459 A1 | 3/2008 | Vallier et al. |
| 2008/0056579 A1 | 3/2008 | Guha |
| 2008/0057922 A1 | 3/2008 | Kokes et al. |
| 2008/0059190 A1 | 3/2008 | Chu et al. |
| 2008/0059200 A1 | 3/2008 | Puli |
| 2008/0059876 A1 | 3/2008 | Hantler et al. |
| 2008/0062141 A1 | 3/2008 | Chaudhri |
| 2008/0065382 A1 | 3/2008 | Gerl et al. |
| 2008/0065387 A1 | 3/2008 | Cross et al. |
| 2008/0066135 A1 | 3/2008 | Brodersen et al. |
| 2008/0071529 A1 | 3/2008 | Silverman et al. |
| 2008/0071544 A1 | 3/2008 | Beaufays et al. |
| 2008/0071742 A1 | 3/2008 | Yang et al. |
| 2008/0072143 A1 | 3/2008 | Assadollahi |
| 2008/0075296 A1 | 3/2008 | Lindahl et al. |
| 2008/0076972 A1 | 3/2008 | Dorogusker et al. |
| 2008/0077310 A1 | 3/2008 | Murlidar et al. |
| 2008/0077384 A1 | 3/2008 | Agapi et al. |
| 2008/0077386 A1 | 3/2008 | Gao et al. |
| 2008/0077391 A1 | 3/2008 | Chino et al. |
| 2008/0077393 A1 | 3/2008 | Gao et al. |
| 2008/0077406 A1 | 3/2008 | Ganong, III |
| 2008/0077859 A1 | 3/2008 | Schabes et al. |
| 2008/0079566 A1 | 4/2008 | Singh et al. |
| 2008/0080411 A1 | 4/2008 | Cole |
| 2008/0082332 A1 | 4/2008 | Mallett et al. |
| 2008/0082338 A1 | 4/2008 | O"Neil et al. |
| 2008/0082390 A1 | 4/2008 | Hawkins et al. |
| 2008/0082576 A1 | 4/2008 | Bodin et al. |
| 2008/0082651 A1 | 4/2008 | Singh et al. |
| 2008/0084974 A1 | 4/2008 | Dhanakshirur |
| 2008/0085689 A1 | 4/2008 | Zellner |
| 2008/0086306 A1 | 4/2008 | Hirota et al. |
| 2008/0091406 A1 | 4/2008 | Baldwin et al. |
| 2008/0091426 A1 | 4/2008 | Rempel et al. |
| 2008/0091428 A1 | 4/2008 | Bellegarda |
| 2008/0091443 A1 | 4/2008 | Strope et al. |
| 2008/0096531 A1 | 4/2008 | Mcquaide et al. |
| 2008/0096533 A1 | 4/2008 | Manfredi et al. |
| 2008/0096726 A1 | 4/2008 | Riley et al. |
| 2008/0097937 A1 | 4/2008 | Hadjarian |
| 2008/0098302 A1 | 4/2008 | Roose |
| 2008/0098480 A1 | 4/2008 | Henry et al. |
| 2008/0100579 A1 | 5/2008 | Robinson et al. |
| 2008/0101584 A1 | 5/2008 | Gray et al. |
| 2008/0103774 A1 | 5/2008 | White |
| 2008/0109222 A1 | 5/2008 | Liu |
| 2008/0109402 A1 | 5/2008 | Wang et al. |
| 2008/0114480 A1 | 5/2008 | Harb |
| 2008/0114598 A1 | 5/2008 | Prieto et al. |
| 2008/0114604 A1 | 5/2008 | Wei et al. |
| 2008/0114841 A1 | 5/2008 | Lambert |
| 2008/0115084 A1 | 5/2008 | Scott et al. |
| 2008/0118143 A1 | 5/2008 | Gordon et al. |

(56) References Cited

U.S. PATENT DOCUMENTS

| | | |
|---|---|---|
| 2008/0119953 A1 | 5/2008 | Reed |
| 2008/0120102 A1 | 5/2008 | Rao |
| 2008/0120112 A1 | 5/2008 | Jordan et al. |
| 2008/0120196 A1 | 5/2008 | Reed et al. |
| 2008/0120311 A1 | 5/2008 | Reed |
| 2008/0120312 A1 | 5/2008 | Reed |
| 2008/0120330 A1 | 5/2008 | Reed |
| 2008/0120342 A1 | 5/2008 | Reed et al. |
| 2008/0122796 A1 | 5/2008 | Jobs et al. |
| 2008/0124695 A1 | 5/2008 | Myers et al. |
| 2008/0126075 A1 | 5/2008 | Thorn et al. |
| 2008/0126077 A1 | 5/2008 | Thorn |
| 2008/0126091 A1 | 5/2008 | Clark et al. |
| 2008/0126093 A1 | 5/2008 | Sivadas |
| 2008/0126100 A1 | 5/2008 | Grost et al. |
| 2008/0126491 A1 | 5/2008 | Portele et al. |
| 2008/0129520 A1 | 6/2008 | Lee |
| 2008/0130867 A1 | 6/2008 | Bowen |
| 2008/0131006 A1 | 6/2008 | Oliver |
| 2008/0132221 A1 | 6/2008 | Willey et al. |
| 2008/0132295 A1 | 6/2008 | Horowitz |
| 2008/0133215 A1 | 6/2008 | Sarukkai |
| 2008/0133228 A1 | 6/2008 | Rao |
| 2008/0133230 A1 | 6/2008 | Herforth et al. |
| 2008/0133241 A1 | 6/2008 | Baker et al. |
| 2008/0133244 A1 | 6/2008 | Bodin et al. |
| 2008/0133245 A1 | 6/2008 | Proulx et al. |
| 2008/0133479 A1 | 6/2008 | Zelevinsky et al. |
| 2008/0133956 A1 | 6/2008 | Fadell |
| 2008/0140413 A1 | 6/2008 | Millman et al. |
| 2008/0140415 A1 | 6/2008 | Shostak |
| 2008/0140416 A1 | 6/2008 | Shostak |
| 2008/0140652 A1 | 6/2008 | Millman et al. |
| 2008/0140657 A1 | 6/2008 | Azvine et al. |
| 2008/0140702 A1 | 6/2008 | Reed et al. |
| 2008/0141125 A1 | 6/2008 | Ghassabian et al. |
| 2008/0141180 A1 | 6/2008 | Reed et al. |
| 2008/0141182 A1 | 6/2008 | Barsness et al. |
| 2008/0146245 A1 | 6/2008 | Appaji |
| 2008/0146290 A1 | 6/2008 | Sreeram et al. |
| 2008/0147408 A1 | 6/2008 | Da Palma et al. |
| 2008/0147411 A1 | 6/2008 | Dames et al. |
| 2008/0147874 A1 | 6/2008 | Yoneda et al. |
| 2008/0150900 A1 | 6/2008 | Han |
| 2008/0154577 A1 | 6/2008 | Kim et al. |
| 2008/0154599 A1 | 6/2008 | Muschett et al. |
| 2008/0154600 A1 | 6/2008 | Tian et al. |
| 2008/0154603 A1 | 6/2008 | Oddo |
| 2008/0154612 A1 | 6/2008 | Evermann et al. |
| 2008/0154828 A1 | 6/2008 | Antebi et al. |
| 2008/0157867 A1 | 7/2008 | Krah |
| 2008/0161113 A1 | 7/2008 | Hansen et al. |
| 2008/0162120 A1 | 7/2008 | Mactavish et al. |
| 2008/0162137 A1 | 7/2008 | Saitoh et al. |
| 2008/0162471 A1 | 7/2008 | Bernard |
| 2008/0163119 A1 | 7/2008 | Kim et al. |
| 2008/0163131 A1 | 7/2008 | Hirai et al. |
| 2008/0165144 A1 | 7/2008 | Forstall et al. |
| 2008/0165980 A1 | 7/2008 | Pavlovic et al. |
| 2008/0165994 A1 | 7/2008 | Caren et al. |
| 2008/0167013 A1 | 7/2008 | Novick et al. |
| 2008/0167858 A1 | 7/2008 | Christie et al. |
| 2008/0167876 A1 | 7/2008 | Bakis et al. |
| 2008/0168052 A1 | 7/2008 | Ott et al. |
| 2008/0168144 A1 | 7/2008 | Lee |
| 2008/0168366 A1 | 7/2008 | Kocienda et al. |
| 2008/0172698 A1 | 7/2008 | Berger et al. |
| 2008/0183473 A1 | 7/2008 | Nagano et al. |
| 2008/0186960 A1 | 8/2008 | Kocheisen et al. |
| 2008/0189099 A1 | 8/2008 | Friedman et al. |
| 2008/0189106 A1 | 8/2008 | Low et al. |
| 2008/0189110 A1 | 8/2008 | Freeman et al. |
| 2008/0189114 A1 | 8/2008 | Fail et al. |
| 2008/0189360 A1 | 8/2008 | Kiley et al. |
| 2008/0189606 A1 | 8/2008 | Rybak |
| 2008/0195312 A1 | 8/2008 | Aaron et al. |
| 2008/0195388 A1 | 8/2008 | Bower et al. |
| 2008/0195391 A1 | 8/2008 | Marple et al. |
| 2008/0195601 A1 | 8/2008 | Ntoulas et al. |
| 2008/0195630 A1 | 8/2008 | Exartier et al. |
| 2008/0195940 A1 | 8/2008 | Gail et al. |
| 2008/0200142 A1 | 8/2008 | Abdel-Kader et al. |
| 2008/0201000 A1 | 8/2008 | Heikkila et al. |
| 2008/0201306 A1 | 8/2008 | Cooper et al. |
| 2008/0201375 A1 | 8/2008 | Khedouri et al. |
| 2008/0201434 A1 | 8/2008 | Holmes et al. |
| 2008/0204379 A1 | 8/2008 | Perez-Noguera |
| 2008/0207176 A1 | 8/2008 | Brackbill et al. |
| 2008/0208585 A1 | 8/2008 | Ativanichayaphong et al. |
| 2008/0208587 A1 | 8/2008 | Ben-David et al. |
| 2008/0208864 A1 | 8/2008 | Cucerzan et al. |
| 2008/0212796 A1 | 9/2008 | Denda |
| 2008/0215678 A1 | 9/2008 | Coletrane et al. |
| 2008/0219641 A1 | 9/2008 | Sandrew et al. |
| 2008/0221866 A1 | 9/2008 | Katragadda et al. |
| 2008/0221879 A1 | 9/2008 | Cerra et al. |
| 2008/0221880 A1 | 9/2008 | Cerra et al. |
| 2008/0221887 A1 | 9/2008 | Rose et al. |
| 2008/0221889 A1 | 9/2008 | Cerra et al. |
| 2008/0221903 A1 | 9/2008 | Kanevsky et al. |
| 2008/0222118 A1 | 9/2008 | Scian et al. |
| 2008/0226130 A1 | 9/2008 | Kansal et al. |
| 2008/0228463 A1 | 9/2008 | Mori et al. |
| 2008/0228485 A1 | 9/2008 | Owen |
| 2008/0228490 A1 | 9/2008 | Fischer et al. |
| 2008/0228495 A1 | 9/2008 | Cross et al. |
| 2008/0228496 A1 | 9/2008 | Yu et al. |
| 2008/0228928 A1 | 9/2008 | Donelli et al. |
| 2008/0229185 A1 | 9/2008 | Lynch |
| 2008/0229218 A1 | 9/2008 | Maeng |
| 2008/0235017 A1 | 9/2008 | Satomura et al. |
| 2008/0235018 A1 | 9/2008 | Eggen et al. |
| 2008/0235023 A1 | 9/2008 | Kennewick et al. |
| 2008/0235024 A1 | 9/2008 | Goldberg et al. |
| 2008/0235027 A1 | 9/2008 | Cross |
| 2008/0240569 A1 | 10/2008 | Tonouchi |
| 2008/0242280 A1 | 10/2008 | Shapiro et al. |
| 2008/0242322 A1 | 10/2008 | Scott et al. |
| 2008/0242363 A1 | 10/2008 | Onda et al. |
| 2008/0243501 A1 | 10/2008 | Hafsteinsson et al. |
| 2008/0243834 A1 | 10/2008 | Rieman et al. |
| 2008/0244390 A1 | 10/2008 | Fux et al. |
| 2008/0244446 A1 | 10/2008 | Lefevre et al. |
| 2008/0247519 A1 | 10/2008 | Abella et al. |
| 2008/0247529 A1 | 10/2008 | Barton et al. |
| 2008/0248797 A1 | 10/2008 | Freeman et al. |
| 2008/0249770 A1 | 10/2008 | Kim et al. |
| 2008/0249778 A1 | 10/2008 | Barton et al. |
| 2008/0253577 A1 | 10/2008 | Eppolito |
| 2008/0254419 A1 | 10/2008 | Cohen |
| 2008/0254425 A1 | 10/2008 | Cohen et al. |
| 2008/0255837 A1 | 10/2008 | Kahn et al. |
| 2008/0255842 A1 | 10/2008 | Simhi et al. |
| 2008/0255845 A1 | 10/2008 | Bennett |
| 2008/0256613 A1 | 10/2008 | Grover |
| 2008/0259022 A1 | 10/2008 | Mansfield et al. |
| 2008/0261572 A1 | 10/2008 | Tsui et al. |
| 2008/0262828 A1 | 10/2008 | Och et al. |
| 2008/0262838 A1 | 10/2008 | Nurminen et al. |
| 2008/0262846 A1 | 10/2008 | Burns et al. |
| 2008/0263139 A1 | 10/2008 | Martin |
| 2008/0267416 A1 | 10/2008 | Goldstein et al. |
| 2008/0270118 A1 | 10/2008 | Kuo et al. |
| 2008/0270138 A1 | 10/2008 | Knight et al. |
| 2008/0270139 A1 | 10/2008 | Shi et al. |
| 2008/0270140 A1 | 10/2008 | Hertz et al. |
| 2008/0270151 A1 | 10/2008 | Mahoney et al. |
| 2008/0270344 A1 | 10/2008 | Yurick et al. |
| 2008/0273672 A1 | 11/2008 | Didcock et al. |
| 2008/0277473 A1 | 11/2008 | Kotlarsky et al. |
| 2008/0281510 A1 | 11/2008 | Shahine |
| 2008/0281582 A1 | 11/2008 | Hsu et al. |
| 2008/0288259 A1 | 11/2008 | Chambers et al. |
| 2008/0288460 A1 | 11/2008 | Poniatowski et al. |

(56) References Cited

U.S. PATENT DOCUMENTS

| | | |
|---|---|---|
| 2008/0292112 A1 | 11/2008 | Valenzuela et al. |
| 2008/0294418 A1 | 11/2008 | Cleary et al. |
| 2008/0294517 A1 | 11/2008 | Hill |
| 2008/0294651 A1 | 11/2008 | Masuyama et al. |
| 2008/0294981 A1 | 11/2008 | Balzano et al. |
| 2008/0298563 A1 | 12/2008 | Rondeau et al. |
| 2008/0298766 A1 | 12/2008 | Wen et al. |
| 2008/0299523 A1 | 12/2008 | Chai et al. |
| 2008/0300857 A1 | 12/2008 | Barbaiani et al. |
| 2008/0300871 A1 | 12/2008 | Gilbert |
| 2008/0300877 A1 | 12/2008 | Gilbert et al. |
| 2008/0300878 A1 | 12/2008 | Bennett |
| 2008/0300886 A1 | 12/2008 | Patch |
| 2008/0301567 A1 | 12/2008 | Martin et al. |
| 2008/0303645 A1 | 12/2008 | Seymour et al. |
| 2008/0306727 A1 | 12/2008 | Thurmair et al. |
| 2008/0312909 A1 | 12/2008 | Hermansen et al. |
| 2008/0312928 A1 | 12/2008 | Goebel et al. |
| 2008/0313335 A1 | 12/2008 | Jung et al. |
| 2008/0316183 A1 | 12/2008 | Westerman et al. |
| 2008/0319735 A1 | 12/2008 | Kambhatla et al. |
| 2008/0319738 A1 | 12/2008 | Liu et al. |
| 2008/0319753 A1 | 12/2008 | Hancock |
| 2008/0319763 A1 | 12/2008 | Di Fabbrizio et al. |
| 2008/0319783 A1 | 12/2008 | Yao et al. |
| 2009/0003115 A1 | 1/2009 | Lindahl et al. |
| 2009/0005012 A1 | 1/2009 | Van Heugten |
| 2009/0005891 A1 | 1/2009 | Batson et al. |
| 2009/0006096 A1 | 1/2009 | Li et al. |
| 2009/0006097 A1 | 1/2009 | Etezadi et al. |
| 2009/0006099 A1 | 1/2009 | Sharpe et al. |
| 2009/0006100 A1 | 1/2009 | Badger et al. |
| 2009/0006343 A1 | 1/2009 | Platt et al. |
| 2009/0006345 A1 | 1/2009 | Platt et al. |
| 2009/0006488 A1 | 1/2009 | Lindahl et al. |
| 2009/0006671 A1 | 1/2009 | Batson et al. |
| 2009/0007001 A1 | 1/2009 | Morin et al. |
| 2009/0011709 A1 | 1/2009 | Akasaka et al. |
| 2009/0012748 A1 | 1/2009 | Beish et al. |
| 2009/0012775 A1 | 1/2009 | El Hady et al. |
| 2009/0018828 A1 | 1/2009 | Nakadai et al. |
| 2009/0018829 A1 | 1/2009 | Kuperstein |
| 2009/0018834 A1 | 1/2009 | Cooper et al. |
| 2009/0018835 A1 | 1/2009 | Cooper et al. |
| 2009/0018839 A1 | 1/2009 | Cooper et al. |
| 2009/0018840 A1 | 1/2009 | Lutz et al. |
| 2009/0022329 A1 | 1/2009 | Mahowald |
| 2009/0024595 A1 | 1/2009 | Chen |
| 2009/0028435 A1 | 1/2009 | Wu et al. |
| 2009/0030685 A1 | 1/2009 | Cerra et al. |
| 2009/0030800 A1 | 1/2009 | Grois |
| 2009/0030978 A1 | 1/2009 | Johnson et al. |
| 2009/0043580 A1 | 2/2009 | Mozer et al. |
| 2009/0043583 A1 | 2/2009 | Agapi et al. |
| 2009/0043763 A1 | 2/2009 | Peng |
| 2009/0044094 A1 | 2/2009 | Rapp et al. |
| 2009/0048821 A1 | 2/2009 | Yam et al. |
| 2009/0048841 A1 | 2/2009 | Pollet et al. |
| 2009/0048845 A1 | 2/2009 | Burckart et al. |
| 2009/0049067 A1 | 2/2009 | Murray |
| 2009/0055168 A1 | 2/2009 | Wu et al. |
| 2009/0055175 A1 | 2/2009 | Terrell et al. |
| 2009/0055179 A1 | 2/2009 | Cho et al. |
| 2009/0055186 A1 | 2/2009 | Lance et al. |
| 2009/0055380 A1 | 2/2009 | Peng et al. |
| 2009/0055381 A1 | 2/2009 | Wu et al. |
| 2009/0055648 A1 | 2/2009 | Kim et al. |
| 2009/0058823 A1 | 3/2009 | Kocienda |
| 2009/0058860 A1 | 3/2009 | Fong et al. |
| 2009/0060351 A1 | 3/2009 | Li et al. |
| 2009/0060472 A1 | 3/2009 | Bull et al. |
| 2009/0063974 A1 | 3/2009 | Bull et al. |
| 2009/0064031 A1 | 3/2009 | Bull et al. |
| 2009/0070097 A1 | 3/2009 | Wu et al. |
| 2009/0070102 A1 | 3/2009 | Maegawa |
| 2009/0070109 A1 | 3/2009 | Didcock et al. |
| 2009/0070114 A1 | 3/2009 | Staszak |
| 2009/0074214 A1 | 3/2009 | Bradford et al. |
| 2009/0076792 A1 | 3/2009 | Lawson-Tancred |
| 2009/0076796 A1 | 3/2009 | Daraselia |
| 2009/0076798 A1 | 3/2009 | Oh et al. |
| 2009/0076819 A1 | 3/2009 | Wouters et al. |
| 2009/0076821 A1 | 3/2009 | Brenner et al. |
| 2009/0076825 A1 | 3/2009 | Bradford et al. |
| 2009/0077047 A1 | 3/2009 | Cooper et al. |
| 2009/0077165 A1 | 3/2009 | Rhodes et al. |
| 2009/0077464 A1 | 3/2009 | Goldsmith et al. |
| 2009/0079622 A1 | 3/2009 | Seshadri et al. |
| 2009/0083034 A1 | 3/2009 | Hernandez et al. |
| 2009/0083035 A1 | 3/2009 | Huang et al. |
| 2009/0083036 A1 | 3/2009 | Zhao et al. |
| 2009/0083037 A1 | 3/2009 | Gleason et al. |
| 2009/0083047 A1 | 3/2009 | Lindahl et al. |
| 2009/0089058 A1 | 4/2009 | Bellegarda |
| 2009/0091537 A1 | 4/2009 | Huang et al. |
| 2009/0092239 A1 | 4/2009 | Macwan et al. |
| 2009/0092260 A1 | 4/2009 | Powers |
| 2009/0092261 A1 | 4/2009 | Bard |
| 2009/0092262 A1 | 4/2009 | Costa et al. |
| 2009/0094029 A1 | 4/2009 | Koch et al. |
| 2009/0094033 A1 | 4/2009 | Mozer et al. |
| 2009/0097634 A1 | 4/2009 | Nambiar et al. |
| 2009/0097637 A1 | 4/2009 | Boscher et al. |
| 2009/0098903 A1 | 4/2009 | Donaldson et al. |
| 2009/0100049 A1 | 4/2009 | Cao |
| 2009/0100454 A1 | 4/2009 | Weber |
| 2009/0104898 A1 | 4/2009 | Harris |
| 2009/0106026 A1 | 4/2009 | Ferrieux |
| 2009/0106376 A1 | 4/2009 | Tom et al. |
| 2009/0106397 A1 | 4/2009 | O'Keefe |
| 2009/0112572 A1 | 4/2009 | Thorn |
| 2009/0112576 A1 | 4/2009 | Jackson et al. |
| 2009/0112592 A1 | 4/2009 | Candelore et al. |
| 2009/0112596 A1 | 4/2009 | Syrdal et al. |
| 2009/0112677 A1 | 4/2009 | Rhett |
| 2009/0112892 A1 | 4/2009 | Cardie et al. |
| 2009/0119587 A1 | 5/2009 | Allen et al. |
| 2009/0123021 A1 | 5/2009 | Jung et al. |
| 2009/0123071 A1 | 5/2009 | Iwasaki |
| 2009/0125477 A1 | 5/2009 | Lu et al. |
| 2009/0125602 A1 | 5/2009 | Bhatia et al. |
| 2009/0125813 A1 | 5/2009 | Shen et al. |
| 2009/0125947 A1 | 5/2009 | Ibaraki |
| 2009/0128505 A1 | 5/2009 | Partridge et al. |
| 2009/0132253 A1 | 5/2009 | Bellegarda |
| 2009/0132255 A1 | 5/2009 | Lu |
| 2009/0137286 A1 | 5/2009 | Luke et al. |
| 2009/0138263 A1 | 5/2009 | Shozakai et al. |
| 2009/0138430 A1 | 5/2009 | Nambiar et al. |
| 2009/0138736 A1 | 5/2009 | Chin |
| 2009/0138828 A1 | 5/2009 | Schultz et al. |
| 2009/0144036 A1 | 6/2009 | Jorgensen et al. |
| 2009/0144049 A1 | 6/2009 | Haddad et al. |
| 2009/0144428 A1 | 6/2009 | Bowater et al. |
| 2009/0144609 A1 | 6/2009 | Liang et al. |
| 2009/0146848 A1 | 6/2009 | Ghassabian |
| 2009/0150147 A1 | 6/2009 | Jacoby et al. |
| 2009/0150156 A1 | 6/2009 | Kennewick et al. |
| 2009/0152349 A1 | 6/2009 | Bonev et al. |
| 2009/0153288 A1 | 6/2009 | Hope et al. |
| 2009/0154669 A1 | 6/2009 | Wood et al. |
| 2009/0157382 A1 | 6/2009 | Bar |
| 2009/0157384 A1 | 6/2009 | Toutanova et al. |
| 2009/0157401 A1 | 6/2009 | Bennett |
| 2009/0158200 A1 | 6/2009 | Palahnuk et al. |
| 2009/0158323 A1 | 6/2009 | Bober et al. |
| 2009/0158423 A1 | 6/2009 | Orlassino et al. |
| 2009/0160803 A1 | 6/2009 | Hashimoto |
| 2009/0163243 A1 | 6/2009 | Barbera |
| 2009/0164301 A1 | 6/2009 | O'Sullivan et al. |
| 2009/0164441 A1 | 6/2009 | Cheyer |
| 2009/0164655 A1 | 6/2009 | Pettersson et al. |
| 2009/0164937 A1 | 6/2009 | Alviar et al. |
| 2009/0167508 A1 | 7/2009 | Fadell et al. |

(56) References Cited

U.S. PATENT DOCUMENTS

| | | |
|---|---|---|
| 2009/0167509 A1 | 7/2009 | Fadell et al. |
| 2009/0171578 A1 | 7/2009 | Kim et al. |
| 2009/0171662 A1 | 7/2009 | Huang et al. |
| 2009/0171664 A1 | 7/2009 | Kennewick et al. |
| 2009/0172108 A1 | 7/2009 | Singh |
| 2009/0172542 A1 | 7/2009 | Girish et al. |
| 2009/0174667 A1 | 7/2009 | Kocienda et al. |
| 2009/0174677 A1 | 7/2009 | Gehani et al. |
| 2009/0177300 A1 | 7/2009 | Lee |
| 2009/0177461 A1 | 7/2009 | Ehsani et al. |
| 2009/0177966 A1 | 7/2009 | Chaudhri |
| 2009/0182445 A1 | 7/2009 | Girish et al. |
| 2009/0182549 A1 | 7/2009 | Anisimovich et al. |
| 2009/0182702 A1 | 7/2009 | Miller |
| 2009/0183070 A1 | 7/2009 | Robbins |
| 2009/0187402 A1 | 7/2009 | Scholl |
| 2009/0187577 A1 | 7/2009 | Reznik et al. |
| 2009/0187950 A1 | 7/2009 | Nicas et al. |
| 2009/0190774 A1 | 7/2009 | Wang et al. |
| 2009/0191895 A1 | 7/2009 | Singh et al. |
| 2009/0192782 A1 | 7/2009 | Drewes |
| 2009/0192787 A1 | 7/2009 | Roon |
| 2009/0192798 A1 | 7/2009 | Basson et al. |
| 2009/0198497 A1 | 8/2009 | Kwon |
| 2009/0204402 A1 | 8/2009 | Marhawa et al. |
| 2009/0204409 A1 | 8/2009 | Mozer et al. |
| 2009/0204478 A1 | 8/2009 | Kaib et al. |
| 2009/0204596 A1 | 8/2009 | Brun et al. |
| 2009/0204601 A1 | 8/2009 | Grasset |
| 2009/0204620 A1 | 8/2009 | Thione et al. |
| 2009/0210230 A1 | 8/2009 | Schwarz et al. |
| 2009/0210232 A1 | 8/2009 | Sanchez et al. |
| 2009/0213134 A1 | 8/2009 | Stephanick et al. |
| 2009/0215466 A1 | 8/2009 | Ahl et al. |
| 2009/0215503 A1 | 8/2009 | Zhang et al. |
| 2009/0216396 A1 | 8/2009 | Yamagata |
| 2009/0216528 A1 | 8/2009 | Gemello et al. |
| 2009/0216540 A1 | 8/2009 | Tessel et al. |
| 2009/0216704 A1 | 8/2009 | Zheng et al. |
| 2009/0219166 A1 | 9/2009 | MacFarlane et al. |
| 2009/0221274 A1 | 9/2009 | Venkatakrishnan et al. |
| 2009/0222257 A1 | 9/2009 | Sumita et al. |
| 2009/0222270 A2 | 9/2009 | Likens et al. |
| 2009/0222488 A1 | 9/2009 | Boerries et al. |
| 2009/0228126 A1 | 9/2009 | Spielberg et al. |
| 2009/0228273 A1 | 9/2009 | Wang et al. |
| 2009/0228277 A1 | 9/2009 | Bonforte et al. |
| 2009/0228281 A1 | 9/2009 | Singleton et al. |
| 2009/0228439 A1 | 9/2009 | Manolescu et al. |
| 2009/0228792 A1 | 9/2009 | Van Os et al. |
| 2009/0228842 A1 | 9/2009 | Westerman et al. |
| 2009/0233264 A1 | 9/2009 | Rogers et al. |
| 2009/0234638 A1 | 9/2009 | Ranjan et al. |
| 2009/0234651 A1 | 9/2009 | Basir et al. |
| 2009/0234655 A1 | 9/2009 | Kwon |
| 2009/0235280 A1 | 9/2009 | Tannier et al. |
| 2009/0239202 A1 | 9/2009 | Stone |
| 2009/0239552 A1 | 9/2009 | Churchill et al. |
| 2009/0240485 A1 | 9/2009 | Dalal et al. |
| 2009/0241054 A1 | 9/2009 | Hendricks |
| 2009/0241760 A1 | 10/2009 | Georges |
| 2009/0247237 A1 | 10/2009 | Mittleman et al. |
| 2009/0248182 A1 | 10/2009 | Logan et al. |
| 2009/0248395 A1 | 10/2009 | Alewine et al. |
| 2009/0248402 A1 | 10/2009 | Ito et al. |
| 2009/0248420 A1 | 10/2009 | Basir et al. |
| 2009/0248422 A1 | 10/2009 | Li et al. |
| 2009/0248456 A1 | 10/2009 | Fahmy et al. |
| 2009/0249198 A1 | 10/2009 | Davis et al. |
| 2009/0249247 A1 | 10/2009 | Tseng et al. |
| 2009/0252350 A1 | 10/2009 | Seguin |
| 2009/0253457 A1 | 10/2009 | Seguin |
| 2009/0253463 A1 | 10/2009 | Shin et al. |
| 2009/0254339 A1 | 10/2009 | Seguin |
| 2009/0254345 A1 | 10/2009 | Fleizach et al. |
| 2009/0254819 A1 | 10/2009 | Song et al. |
| 2009/0254823 A1 | 10/2009 | Barrett |
| 2009/0259472 A1 | 10/2009 | Schroeter |
| 2009/0259475 A1 | 10/2009 | Yamagami et al. |
| 2009/0259969 A1 | 10/2009 | Pallakoff |
| 2009/0265171 A1 | 10/2009 | Davis |
| 2009/0265368 A1 | 10/2009 | Crider et al. |
| 2009/0271109 A1 | 10/2009 | Lee et al. |
| 2009/0271175 A1 | 10/2009 | Bodin et al. |
| 2009/0271176 A1 | 10/2009 | Bodin et al. |
| 2009/0271178 A1 | 10/2009 | Bodin et al. |
| 2009/0271188 A1 | 10/2009 | Agapi et al. |
| 2009/0271189 A1 | 10/2009 | Agapi et al. |
| 2009/0274315 A1 | 11/2009 | Carnes et al. |
| 2009/0274376 A1 | 11/2009 | Selvaraj et al. |
| 2009/0278804 A1 | 11/2009 | Rubanovich et al. |
| 2009/0281789 A1 | 11/2009 | Weibel et al. |
| 2009/0284471 A1 | 11/2009 | Longe et al. |
| 2009/0284482 A1 | 11/2009 | Chin |
| 2009/0286514 A1 | 11/2009 | Lichorowic et al. |
| 2009/0287583 A1 | 11/2009 | Holmes |
| 2009/0290718 A1 | 11/2009 | Kahn et al. |
| 2009/0292987 A1 | 11/2009 | Sorenson |
| 2009/0296552 A1 | 12/2009 | Hicks et al. |
| 2009/0298474 A1 | 12/2009 | George |
| 2009/0298529 A1 | 12/2009 | Mahajan |
| 2009/0299745 A1 | 12/2009 | Kennewick et al. |
| 2009/0299849 A1 | 12/2009 | Cao et al. |
| 2009/0300391 A1 | 12/2009 | Jessup et al. |
| 2009/0300488 A1 | 12/2009 | Salamon et al. |
| 2009/0304198 A1 | 12/2009 | Herre et al. |
| 2009/0305203 A1 | 12/2009 | Okumura et al. |
| 2009/0306967 A1 | 12/2009 | Nicolov et al. |
| 2009/0306969 A1 | 12/2009 | Goud et al. |
| 2009/0306979 A1 | 12/2009 | Jaiswal et al. |
| 2009/0306980 A1 | 12/2009 | Shin |
| 2009/0306981 A1 | 12/2009 | Cromack et al. |
| 2009/0306985 A1 | 12/2009 | Roberts et al. |
| 2009/0306988 A1 | 12/2009 | Chen et al. |
| 2009/0306989 A1 | 12/2009 | Kaji |
| 2009/0307162 A1 | 12/2009 | Bui et al. |
| 2009/0307201 A1 | 12/2009 | Dunning et al. |
| 2009/0307584 A1 | 12/2009 | Davidson et al. |
| 2009/0307594 A1 | 12/2009 | Kosonen et al. |
| 2009/0309352 A1 | 12/2009 | Walker et al. |
| 2009/0313014 A1 | 12/2009 | Shin et al. |
| 2009/0313020 A1 | 12/2009 | Koivunen |
| 2009/0313023 A1 | 12/2009 | Jones |
| 2009/0313026 A1 | 12/2009 | Coffman et al. |
| 2009/0313544 A1 | 12/2009 | Wood et al. |
| 2009/0313564 A1 | 12/2009 | Rottler et al. |
| 2009/0316943 A1 | 12/2009 | Frigola Munoz et al. |
| 2009/0318119 A1 | 12/2009 | Basir et al. |
| 2009/0318198 A1 | 12/2009 | Carroll |
| 2009/0319257 A1 | 12/2009 | Blume et al. |
| 2009/0319266 A1 | 12/2009 | Brown et al. |
| 2009/0319342 A1 | 12/2009 | Shilman et al. |
| 2009/0326923 A1 | 12/2009 | Yan et al. |
| 2009/0326936 A1 | 12/2009 | Nagashima |
| 2009/0326938 A1 | 12/2009 | Marila et al. |
| 2009/0326949 A1 | 12/2009 | Douthitt et al. |
| 2009/0327977 A1 | 12/2009 | Bachfischer et al. |
| 2010/0004918 A1 | 1/2010 | Lee et al. |
| 2010/0004930 A1 | 1/2010 | Strope et al. |
| 2010/0004931 A1 | 1/2010 | Ma et al. |
| 2010/0005081 A1 | 1/2010 | Bennett |
| 2010/0010803 A1 | 1/2010 | Ishikawa et al. |
| 2010/0010814 A1 | 1/2010 | Patel |
| 2010/0010948 A1 | 1/2010 | Ito et al. |
| 2010/0013760 A1 | 1/2010 | Hirai et al. |
| 2010/0013796 A1 | 1/2010 | Abileah et al. |
| 2010/0017212 A1 | 1/2010 | Attwater et al. |
| 2010/0017382 A1 | 1/2010 | Katragadda et al. |
| 2010/0019834 A1 | 1/2010 | Zerbe et al. |
| 2010/0023318 A1 | 1/2010 | Lemoine |
| 2010/0023320 A1 | 1/2010 | Di Cristo et al. |
| 2010/0023331 A1 | 1/2010 | Duta et al. |
| 2010/0026526 A1 | 2/2010 | Yokota |
| 2010/0030549 A1 | 2/2010 | Lee et al. |

(56) References Cited

U.S. PATENT DOCUMENTS

| | | |
|---|---|---|
| 2010/0030928 A1 | 2/2010 | Conroy et al. |
| 2010/0031143 A1 | 2/2010 | Rao et al. |
| 2010/0036653 A1 | 2/2010 | Kim et al. |
| 2010/0036655 A1 | 2/2010 | Cecil et al. |
| 2010/0036660 A1 | 2/2010 | Bennett |
| 2010/0036829 A1 | 2/2010 | Leyba |
| 2010/0036928 A1 | 2/2010 | Granito et al. |
| 2010/0037183 A1 | 2/2010 | Miyashita et al. |
| 2010/0042400 A1 | 2/2010 | Block et al. |
| 2010/0042576 A1 | 2/2010 | Roettger et al. |
| 2010/0046842 A1 | 2/2010 | Conwell et al. |
| 2010/0049498 A1 | 2/2010 | Cao et al. |
| 2010/0049514 A1 | 2/2010 | Kennewick et al. |
| 2010/0050064 A1 | 2/2010 | Liu et al. |
| 2010/0054512 A1 | 3/2010 | Solum |
| 2010/0057435 A1 | 3/2010 | Kent et al. |
| 2010/0057443 A1 | 3/2010 | Di Cristo et al. |
| 2010/0057457 A1 | 3/2010 | Ogata et al. |
| 2010/0057461 A1 | 3/2010 | Neubacher et al. |
| 2010/0057643 A1 | 3/2010 | Yang |
| 2010/0058200 A1 | 3/2010 | Jablokov et al. |
| 2010/0060646 A1 | 3/2010 | Unsal et al. |
| 2010/0063804 A1 | 3/2010 | Sato et al. |
| 2010/0063825 A1 | 3/2010 | Williams et al. |
| 2010/0063961 A1 | 3/2010 | Guiheneuf et al. |
| 2010/0064113 A1 | 3/2010 | Lindahl et al. |
| 2010/0064218 A1 | 3/2010 | Bull et al. |
| 2010/0064226 A1 | 3/2010 | Stefaniak et al. |
| 2010/0066546 A1 | 3/2010 | Aaron |
| 2010/0066684 A1 | 3/2010 | Shahraray et al. |
| 2010/0067723 A1 | 3/2010 | Bergmann et al. |
| 2010/0067867 A1 | 3/2010 | Lin et al. |
| 2010/0070281 A1 | 3/2010 | Conkie et al. |
| 2010/0070517 A1 | 3/2010 | Ghosh et al. |
| 2010/0070521 A1 | 3/2010 | Clinchant et al. |
| 2010/0070899 A1 | 3/2010 | Hunt et al. |
| 2010/0071003 A1 | 3/2010 | Bychkov et al. |
| 2010/0076760 A1 | 3/2010 | Kraenzel et al. |
| 2010/0076993 A1 | 3/2010 | Klawitter et al. |
| 2010/0077350 A1 | 3/2010 | Lim et al. |
| 2010/0079501 A1 | 4/2010 | Ikeda et al. |
| 2010/0080398 A1 | 4/2010 | Waldmann |
| 2010/0080470 A1 | 4/2010 | Deluca et al. |
| 2010/0081456 A1 | 4/2010 | Singh et al. |
| 2010/0081487 A1 | 4/2010 | Chen et al. |
| 2010/0082286 A1 | 4/2010 | Leung |
| 2010/0082327 A1 | 4/2010 | Rogers et al. |
| 2010/0082328 A1 | 4/2010 | Rogers et al. |
| 2010/0082329 A1 | 4/2010 | Silverman et al. |
| 2010/0082333 A1 | 4/2010 | Al-Shammari |
| 2010/0082346 A1 | 4/2010 | Rogers et al. |
| 2010/0082347 A1 | 4/2010 | Rogers et al. |
| 2010/0082348 A1 | 4/2010 | Silverman et al. |
| 2010/0082349 A1 | 4/2010 | Bellegarda et al. |
| 2010/0082567 A1 | 4/2010 | Rosenblatt et al. |
| 2010/0082970 A1 | 4/2010 | Lindahl et al. |
| 2010/0086152 A1 | 4/2010 | Rank et al. |
| 2010/0086153 A1 | 4/2010 | Hagen et al. |
| 2010/0086156 A1 | 4/2010 | Rank et al. |
| 2010/0088020 A1 | 4/2010 | Sano et al. |
| 2010/0088093 A1 | 4/2010 | Lee et al. |
| 2010/0088100 A1 | 4/2010 | Lindahl |
| 2010/0094632 A1 | 4/2010 | Davis et al. |
| 2010/0098231 A1 | 4/2010 | Wohlert et al. |
| 2010/0100212 A1 | 4/2010 | Lindahl et al. |
| 2010/0100384 A1 | 4/2010 | Ju et al. |
| 2010/0100385 A1 | 4/2010 | Davis et al. |
| 2010/0100816 A1 | 4/2010 | Mccloskey et al. |
| 2010/0103776 A1 | 4/2010 | Chan |
| 2010/0106486 A1 | 4/2010 | Hua et al. |
| 2010/0106498 A1 | 4/2010 | Morrison et al. |
| 2010/0106500 A1 | 4/2010 | McKee et al. |
| 2010/0106503 A1 | 4/2010 | Farrell et al. |
| 2010/0114856 A1 | 5/2010 | Kuboyama |
| 2010/0114887 A1 | 5/2010 | Conway et al. |
| 2010/0121637 A1 | 5/2010 | Roy et al. |
| 2010/0125456 A1 | 5/2010 | Weng et al. |
| 2010/0125458 A1 | 5/2010 | Franco et al. |
| 2010/0125460 A1 | 5/2010 | Mellott et al. |
| 2010/0125811 A1 | 5/2010 | Moore et al. |
| 2010/0131269 A1 | 5/2010 | Park et al. |
| 2010/0131273 A1 | 5/2010 | Aley-Raz et al. |
| 2010/0131498 A1 | 5/2010 | Linthicum et al. |
| 2010/0131899 A1 | 5/2010 | Hubert |
| 2010/0138215 A1 | 6/2010 | Williams |
| 2010/0138224 A1 | 6/2010 | Bedingfield, Sr. |
| 2010/0138416 A1 | 6/2010 | Bellotti |
| 2010/0138680 A1 | 6/2010 | Brisebois et al. |
| 2010/0138759 A1 | 6/2010 | Roy |
| 2010/0138798 A1 | 6/2010 | Wilson et al. |
| 2010/0142740 A1 | 6/2010 | Roerup |
| 2010/0145694 A1 | 6/2010 | Ju et al. |
| 2010/0145700 A1 | 6/2010 | Kennewick et al. |
| 2010/0145707 A1 | 6/2010 | Ljolje et al. |
| 2010/0146442 A1 | 6/2010 | Nagasaka et al. |
| 2010/0150321 A1 | 6/2010 | Harris et al. |
| 2010/0153114 A1 | 6/2010 | Shih et al. |
| 2010/0153115 A1 | 6/2010 | Klee et al. |
| 2010/0153448 A1 | 6/2010 | Harpur et al. |
| 2010/0161311 A1 | 6/2010 | Massuh |
| 2010/0161313 A1 | 6/2010 | Karttunen |
| 2010/0161337 A1 | 6/2010 | Pulz et al. |
| 2010/0161554 A1 | 6/2010 | Datuashvili et al. |
| 2010/0164897 A1 | 7/2010 | Morin et al. |
| 2010/0169075 A1 | 7/2010 | Raffa et al. |
| 2010/0169093 A1 | 7/2010 | Washio |
| 2010/0169097 A1 | 7/2010 | Nachman et al. |
| 2010/0169098 A1 | 7/2010 | Patch |
| 2010/0171713 A1 | 7/2010 | Kwok et al. |
| 2010/0174544 A1 | 7/2010 | Heifets |
| 2010/0175066 A1 | 7/2010 | Paik |
| 2010/0179932 A1 | 7/2010 | Yoon et al. |
| 2010/0179991 A1 | 7/2010 | Lorch et al. |
| 2010/0180218 A1 | 7/2010 | Boston et al. |
| 2010/0185448 A1 | 7/2010 | Meisel |
| 2010/0185949 A1 | 7/2010 | Jaeger |
| 2010/0191520 A1 | 7/2010 | Gruhn et al. |
| 2010/0197359 A1 | 8/2010 | Harris |
| 2010/0199180 A1 | 8/2010 | Brichter et al. |
| 2010/0199215 A1 | 8/2010 | Seymour et al. |
| 2010/0204986 A1 | 8/2010 | Kennewick et al. |
| 2010/0211199 A1 | 8/2010 | Naik et al. |
| 2010/0211379 A1 | 8/2010 | Gorman et al. |
| 2010/0211644 A1 | 8/2010 | Lavoie et al. |
| 2010/0216509 A1 | 8/2010 | Riemer et al. |
| 2010/0217604 A1 | 8/2010 | Baldwin et al. |
| 2010/0222033 A1 | 9/2010 | Scott et al. |
| 2010/0222098 A1 | 9/2010 | Garg |
| 2010/0223055 A1 | 9/2010 | Mclean |
| 2010/0223056 A1 | 9/2010 | Kadirkamanathan et al. |
| 2010/0223131 A1 | 9/2010 | Scott et al. |
| 2010/0225599 A1 | 9/2010 | Danielsson et al. |
| 2010/0225809 A1 | 9/2010 | Connors et al. |
| 2010/0227642 A1 | 9/2010 | Kim et al. |
| 2010/0228540 A1 | 9/2010 | Bennett |
| 2010/0228549 A1 | 9/2010 | Herman et al. |
| 2010/0228691 A1 | 9/2010 | Yang et al. |
| 2010/0229082 A1 | 9/2010 | Karmarkar et al. |
| 2010/0229100 A1 | 9/2010 | Miller et al. |
| 2010/0231474 A1 | 9/2010 | Yamagajo et al. |
| 2010/0235167 A1 | 9/2010 | Bourdon |
| 2010/0235341 A1 | 9/2010 | Bennett |
| 2010/0235729 A1 | 9/2010 | Kocienda et al. |
| 2010/0235732 A1 | 9/2010 | Bergman |
| 2010/0235770 A1 | 9/2010 | Ording et al. |
| 2010/0235780 A1 | 9/2010 | Westerman et al. |
| 2010/0241418 A1 | 9/2010 | Maeda et al. |
| 2010/0250542 A1 | 9/2010 | Fujimaki |
| 2010/0250599 A1 | 9/2010 | Schmidt et al. |
| 2010/0255858 A1 | 10/2010 | Juhasz |
| 2010/0257160 A1 | 10/2010 | Cao |
| 2010/0257478 A1 | 10/2010 | Longe et al. |
| 2010/0262599 A1 | 10/2010 | Nitz |
| 2010/0263015 A1 | 10/2010 | Pandey et al. |

(56) References Cited

U.S. PATENT DOCUMENTS

| | | |
|---|---|---|
| 2010/0268537 A1 | 10/2010 | Al-Telmissani |
| 2010/0268539 A1 | 10/2010 | Xu et al. |
| 2010/0269040 A1 | 10/2010 | Lee |
| 2010/0274753 A1 | 10/2010 | Liberty et al. |
| 2010/0277579 A1 | 11/2010 | Cho et al. |
| 2010/0278320 A1 | 11/2010 | Arsenault et al. |
| 2010/0278453 A1 | 11/2010 | King |
| 2010/0280983 A1 | 11/2010 | Cho et al. |
| 2010/0281034 A1 | 11/2010 | Petrou et al. |
| 2010/0286984 A1 | 11/2010 | Wandinger et al. |
| 2010/0286985 A1 | 11/2010 | Kennewick et al. |
| 2010/0287514 A1 | 11/2010 | Cragun et al. |
| 2010/0290632 A1 | 11/2010 | Lin |
| 2010/0293460 A1 | 11/2010 | Budelli |
| 2010/0295645 A1 | 11/2010 | Falldin et al. |
| 2010/0299133 A1 | 11/2010 | Kopparapu et al. |
| 2010/0299138 A1 | 11/2010 | Kim |
| 2010/0299142 A1 | 11/2010 | Freeman et al. |
| 2010/0302056 A1 | 12/2010 | Dutton et al. |
| 2010/0304342 A1 | 12/2010 | Zilber |
| 2010/0304705 A1 | 12/2010 | Hursey et al. |
| 2010/0305807 A1 | 12/2010 | Basir et al. |
| 2010/0305947 A1 | 12/2010 | Schwarz et al. |
| 2010/0312547 A1 | 12/2010 | Van Os et al. |
| 2010/0312566 A1 | 12/2010 | Odinak et al. |
| 2010/0318366 A1 | 12/2010 | Sullivan et al. |
| 2010/0318576 A1 | 12/2010 | Kim |
| 2010/0322438 A1 | 12/2010 | Siotis |
| 2010/0324709 A1 | 12/2010 | Starmen |
| 2010/0324895 A1 | 12/2010 | Kurzweil et al. |
| 2010/0324896 A1 | 12/2010 | Attwater et al. |
| 2010/0324905 A1 | 12/2010 | Kurzweil et al. |
| 2010/0325131 A1 | 12/2010 | Dumais et al. |
| 2010/0325158 A1 | 12/2010 | Oral et al. |
| 2010/0325573 A1 | 12/2010 | Estrada et al. |
| 2010/0325588 A1 | 12/2010 | Reddy et al. |
| 2010/0330908 A1 | 12/2010 | Maddern et al. |
| 2010/0332220 A1 | 12/2010 | Hursey et al. |
| 2010/0332224 A1 | 12/2010 | Mäkelä et al. |
| 2010/0332235 A1 | 12/2010 | David |
| 2010/0332236 A1 | 12/2010 | Tan |
| 2010/0332280 A1 | 12/2010 | Bradley et al. |
| 2010/0332348 A1 | 12/2010 | Cao |
| 2010/0332428 A1 | 12/2010 | Mchenry et al. |
| 2010/0332976 A1 | 12/2010 | Fux et al. |
| 2010/0333030 A1 | 12/2010 | Johns |
| 2010/0333163 A1 | 12/2010 | Daly |
| 2011/0002487 A1 | 1/2011 | Panther et al. |
| 2011/0004475 A1 | 1/2011 | Bellegarda |
| 2011/0006876 A1 | 1/2011 | Moberg et al. |
| 2011/0009107 A1 | 1/2011 | Guba et al. |
| 2011/0010178 A1 | 1/2011 | Lee et al. |
| 2011/0010644 A1 | 1/2011 | Merrill et al. |
| 2011/0015928 A1 | 1/2011 | Odell et al. |
| 2011/0016150 A1 | 1/2011 | Engstrom et al. |
| 2011/0016421 A1 | 1/2011 | Krupka et al. |
| 2011/0018695 A1 | 1/2011 | Bells et al. |
| 2011/0021211 A1 | 1/2011 | Ohki |
| 2011/0021213 A1 | 1/2011 | Carr |
| 2011/0022292 A1 | 1/2011 | Shen et al. |
| 2011/0022388 A1 | 1/2011 | Wu et al. |
| 2011/0022393 A1 | 1/2011 | Waller et al. |
| 2011/0022394 A1 | 1/2011 | Wide et al. |
| 2011/0022472 A1 | 1/2011 | Zon et al. |
| 2011/0022952 A1 | 1/2011 | Wu et al. |
| 2011/0029616 A1 | 2/2011 | Wang et al. |
| 2011/0030067 A1 | 2/2011 | Wilson |
| 2011/0033064 A1 | 2/2011 | Johnson et al. |
| 2011/0034183 A1 | 2/2011 | Haag et al. |
| 2011/0035144 A1 | 2/2011 | Okamoto et al. |
| 2011/0035434 A1 | 2/2011 | Lockwood |
| 2011/0038489 A1 | 2/2011 | Visser et al. |
| 2011/0040707 A1 | 2/2011 | Theisen et al. |
| 2011/0045841 A1 | 2/2011 | Kuhlke et al. |
| 2011/0047072 A1 | 2/2011 | Ciurea |
| 2011/0047149 A1 | 2/2011 | Vaananen |
| 2011/0047161 A1 | 2/2011 | Myaeng et al. |
| 2011/0047266 A1 | 2/2011 | Yu et al. |
| 2011/0047605 A1 | 2/2011 | Sontag et al. |
| 2011/0050591 A1 | 3/2011 | Kim et al. |
| 2011/0050592 A1 | 3/2011 | Kim et al. |
| 2011/0054647 A1 | 3/2011 | Chipchase |
| 2011/0054894 A1 | 3/2011 | Phillips et al. |
| 2011/0054901 A1 | 3/2011 | Qin et al. |
| 2011/0055256 A1 | 3/2011 | Phillips et al. |
| 2011/0060584 A1 | 3/2011 | Ferrucci et al. |
| 2011/0060587 A1 | 3/2011 | Phillips et al. |
| 2011/0060589 A1 | 3/2011 | Weinberg et al. |
| 2011/0060807 A1 | 3/2011 | Martin et al. |
| 2011/0064387 A1 | 3/2011 | Mendeloff et al. |
| 2011/0065456 A1 | 3/2011 | Brennan et al. |
| 2011/0066366 A1 | 3/2011 | Ellanti et al. |
| 2011/0066436 A1 | 3/2011 | Bezar |
| 2011/0066468 A1 | 3/2011 | Huang et al. |
| 2011/0066634 A1 | 3/2011 | Phillips et al. |
| 2011/0072033 A1 | 3/2011 | White et al. |
| 2011/0072492 A1 | 3/2011 | Mohler et al. |
| 2011/0076994 A1 | 3/2011 | Kim et al. |
| 2011/0077943 A1 | 3/2011 | Miki et al. |
| 2011/0080260 A1 | 4/2011 | Wang et al. |
| 2011/0081889 A1 | 4/2011 | Gao et al. |
| 2011/0082688 A1 | 4/2011 | Kim et al. |
| 2011/0083079 A1 | 4/2011 | Farrell et al. |
| 2011/0087491 A1 | 4/2011 | Wittenstein et al. |
| 2011/0087685 A1 | 4/2011 | Lin et al. |
| 2011/0090078 A1 | 4/2011 | Kim et al. |
| 2011/0092187 A1 | 4/2011 | Miller |
| 2011/0093261 A1 | 4/2011 | Angott |
| 2011/0093265 A1 | 4/2011 | Stent et al. |
| 2011/0093271 A1 | 4/2011 | Bernard et al. |
| 2011/0093272 A1 | 4/2011 | Isobe et al. |
| 2011/0099000 A1 | 4/2011 | Rai et al. |
| 2011/0103682 A1 | 5/2011 | Chidlovskii et al. |
| 2011/0105097 A1 | 5/2011 | Tadayon et al. |
| 2011/0106736 A1 | 5/2011 | Aharonson et al. |
| 2011/0106892 A1 | 5/2011 | Nelson et al. |
| 2011/0110502 A1 | 5/2011 | Daye et al. |
| 2011/0111724 A1 | 5/2011 | Baptiste |
| 2011/0112825 A1 | 5/2011 | Bellegarda |
| 2011/0112827 A1 | 5/2011 | Kennewick et al. |
| 2011/0112837 A1 | 5/2011 | Kurki-Suonio et al. |
| 2011/0112838 A1 | 5/2011 | Adibi |
| 2011/0112921 A1 | 5/2011 | Kennewick et al. |
| 2011/0116610 A1 | 5/2011 | Shaw et al. |
| 2011/0119049 A1 | 5/2011 | Ylonen |
| 2011/0119051 A1 | 5/2011 | Li et al. |
| 2011/0119623 A1 | 5/2011 | Kim |
| 2011/0119715 A1 | 5/2011 | Chang et al. |
| 2011/0123004 A1 | 5/2011 | Chang et al. |
| 2011/0125498 A1 | 5/2011 | Pickering et al. |
| 2011/0125540 A1 | 5/2011 | Jang et al. |
| 2011/0125701 A1 | 5/2011 | Nair et al. |
| 2011/0130958 A1 | 6/2011 | Stahl et al. |
| 2011/0131036 A1 | 6/2011 | DiCristo et al. |
| 2011/0131038 A1 | 6/2011 | Oyaizu et al. |
| 2011/0131045 A1 | 6/2011 | Cristo et al. |
| 2011/0137636 A1 | 6/2011 | Srihari et al. |
| 2011/0141141 A1 | 6/2011 | Kankainen |
| 2011/0143726 A1 | 6/2011 | de Silva |
| 2011/0143811 A1 | 6/2011 | Rodriguez |
| 2011/0144857 A1 | 6/2011 | Wingrove et al. |
| 2011/0144901 A1 | 6/2011 | Wang |
| 2011/0144973 A1 | 6/2011 | Bocchieri et al. |
| 2011/0144999 A1 | 6/2011 | Jang et al. |
| 2011/0145718 A1 | 6/2011 | Ketola et al. |
| 2011/0151830 A1 | 6/2011 | Blanda et al. |
| 2011/0153209 A1 | 6/2011 | Geelen |
| 2011/0153322 A1 | 6/2011 | Kwak et al. |
| 2011/0153324 A1 | 6/2011 | Ballinger et al. |
| 2011/0153329 A1 | 6/2011 | Moorer |
| 2011/0153330 A1 | 6/2011 | Yazdani et al. |
| 2011/0153373 A1 | 6/2011 | Dantzig et al. |
| 2011/0154193 A1 | 6/2011 | Creutz et al. |
| 2011/0157029 A1 | 6/2011 | Tseng |

(56) References Cited

U.S. PATENT DOCUMENTS

| | | |
|---|---|---|
| 2011/0161072 A1 | 6/2011 | Terao et al. |
| 2011/0161076 A1 | 6/2011 | Davis et al. |
| 2011/0161079 A1 | 6/2011 | Gruhn et al. |
| 2011/0161309 A1 | 6/2011 | Lung et al. |
| 2011/0161852 A1 | 6/2011 | Vainio et al. |
| 2011/0166851 A1 | 7/2011 | LeBeau et al. |
| 2011/0167350 A1 | 7/2011 | Hoellwarth |
| 2011/0175810 A1 | 7/2011 | Markovic et al. |
| 2011/0179002 A1 | 7/2011 | Dumitru et al. |
| 2011/0179372 A1 | 7/2011 | Moore et al. |
| 2011/0183650 A1 | 7/2011 | Mckee et al. |
| 2011/0184721 A1 | 7/2011 | Subramanian et al. |
| 2011/0184730 A1 | 7/2011 | LeBeau et al. |
| 2011/0184736 A1 | 7/2011 | Slotznick |
| 2011/0184737 A1 | 7/2011 | Nakano et al. |
| 2011/0184768 A1 | 7/2011 | Norton et al. |
| 2011/0185288 A1 | 7/2011 | Gupta et al. |
| 2011/0191108 A1 | 8/2011 | Friedlander |
| 2011/0191271 A1 | 8/2011 | Baker et al. |
| 2011/0191344 A1 | 8/2011 | Jin et al. |
| 2011/0195758 A1 | 8/2011 | Damale et al. |
| 2011/0196670 A1 | 8/2011 | Dang et al. |
| 2011/0197128 A1 | 8/2011 | Assadollahi et al. |
| 2011/0199312 A1 | 8/2011 | Okuta |
| 2011/0201385 A1 | 8/2011 | Higginbotham et al. |
| 2011/0201387 A1 | 8/2011 | Peek et al. |
| 2011/0202526 A1 | 8/2011 | Lee et al. |
| 2011/0205149 A1 | 8/2011 | Tom et al. |
| 2011/0208511 A1 | 8/2011 | Sikstrom et al. |
| 2011/0208524 A1 | 8/2011 | Haughay |
| 2011/0209088 A1 | 8/2011 | Hinckley et al. |
| 2011/0212717 A1 | 9/2011 | Rhoads et al. |
| 2011/0216093 A1 | 9/2011 | Griffin |
| 2011/0218806 A1 | 9/2011 | Alewine et al. |
| 2011/0218855 A1 | 9/2011 | Cao et al. |
| 2011/0219018 A1 | 9/2011 | Bailey et al. |
| 2011/0223893 A1 | 9/2011 | Lau et al. |
| 2011/0224972 A1 | 9/2011 | Millett et al. |
| 2011/0228913 A1 | 9/2011 | Cochinwala et al. |
| 2011/0231182 A1 | 9/2011 | Weider et al. |
| 2011/0231184 A1 | 9/2011 | Kerr |
| 2011/0231188 A1 | 9/2011 | Kennewick et al. |
| 2011/0231432 A1 | 9/2011 | Sata et al. |
| 2011/0231474 A1 | 9/2011 | Locker et al. |
| 2011/0238191 A1 | 9/2011 | Kristjansson et al. |
| 2011/0238407 A1 | 9/2011 | Kent |
| 2011/0238408 A1 | 9/2011 | Larcheveque et al. |
| 2011/0238676 A1 | 9/2011 | Liu et al. |
| 2011/0239111 A1 | 9/2011 | Grover |
| 2011/0242007 A1 | 10/2011 | Gray et al. |
| 2011/0244888 A1 | 10/2011 | Ohki |
| 2011/0246471 A1 | 10/2011 | Rakib et al. |
| 2011/0249144 A1 | 10/2011 | Chang |
| 2011/0250570 A1 | 10/2011 | Mack et al. |
| 2011/0257966 A1 | 10/2011 | Rychlik |
| 2011/0258188 A1 | 10/2011 | Abdalmageed et al. |
| 2011/0260829 A1 | 10/2011 | Lee |
| 2011/0260861 A1 | 10/2011 | Singh et al. |
| 2011/0264643 A1 | 10/2011 | Cao |
| 2011/0264999 A1 | 10/2011 | Bells et al. |
| 2011/0274303 A1 | 11/2011 | Filson et al. |
| 2011/0276595 A1 | 11/2011 | Kirkland et al. |
| 2011/0276598 A1 | 11/2011 | Kozempel |
| 2011/0276944 A1 | 11/2011 | Bergman et al. |
| 2011/0279368 A1 | 11/2011 | Klein et al. |
| 2011/0282663 A1 | 11/2011 | Talwar et al. |
| 2011/0282888 A1 | 11/2011 | Koperski et al. |
| 2011/0282906 A1 | 11/2011 | Wong |
| 2011/0283189 A1 | 11/2011 | McCarty |
| 2011/0288852 A1 | 11/2011 | Dymetman et al. |
| 2011/0288855 A1 | 11/2011 | Roy |
| 2011/0288861 A1 | 11/2011 | Kurzweil et al. |
| 2011/0288863 A1 | 11/2011 | Rasmussen |
| 2011/0288866 A1 | 11/2011 | Rasmussen |
| 2011/0298585 A1 | 12/2011 | Barry |
| 2011/0301943 A1 | 12/2011 | Patch |
| 2011/0302162 A1 | 12/2011 | Xiao et al. |
| 2011/0306426 A1 | 12/2011 | Novak et al. |
| 2011/0307241 A1 | 12/2011 | Waibel et al. |
| 2011/0307491 A1 | 12/2011 | Fisk et al. |
| 2011/0307810 A1 | 12/2011 | Hilerio et al. |
| 2011/0313775 A1 | 12/2011 | Laligand et al. |
| 2011/0314003 A1 | 12/2011 | Ju et al. |
| 2011/0314032 A1 | 12/2011 | Bennett et al. |
| 2011/0314404 A1 | 12/2011 | Kotler et al. |
| 2011/0320187 A1 | 12/2011 | Motik et al. |
| 2012/0002820 A1 | 1/2012 | Leichter |
| 2012/0005602 A1 | 1/2012 | Anttila et al. |
| 2012/0008754 A1 | 1/2012 | Mukherjee et al. |
| 2012/0010886 A1 | 1/2012 | Razavilar |
| 2012/0011138 A1 | 1/2012 | Dunning et al. |
| 2012/0013609 A1 | 1/2012 | Reponen et al. |
| 2012/0015629 A1 | 1/2012 | Olsen et al. |
| 2012/0016658 A1 | 1/2012 | Wu et al. |
| 2012/0016678 A1 | 1/2012 | Gruber et al. |
| 2012/0019400 A1 | 1/2012 | Patel et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0022967 A1 | 1/2012 | Bachman et al. |
| 2012/0023088 A1 | 1/2012 | Cheng et al. |
| 2012/0023095 A1 | 1/2012 | Wadycki et al. |
| 2012/0023462 A1 | 1/2012 | Rosing et al. |
| 2012/0029661 A1 | 2/2012 | Jones et al. |
| 2012/0029910 A1 | 2/2012 | Medlock et al. |
| 2012/0034904 A1 | 2/2012 | LeBeau et al. |
| 2012/0035907 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035925 A1 | 2/2012 | Friend et al. |
| 2012/0035926 A1 | 2/2012 | Ambler |
| 2012/0035931 A1 | 2/2012 | LeBeau et al. |
| 2012/0035932 A1 | 2/2012 | Jitkoff et al. |
| 2012/0035935 A1 | 2/2012 | Park et al. |
| 2012/0036556 A1 | 2/2012 | LeBeau et al. |
| 2012/0039539 A1 | 2/2012 | Boiman et al. |
| 2012/0041752 A1 | 2/2012 | Wang et al. |
| 2012/0042014 A1 | 2/2012 | Desai et al. |
| 2012/0042343 A1 | 2/2012 | Laligand et al. |
| 2012/0053815 A1 | 3/2012 | Montanari et al. |
| 2012/0053829 A1 | 3/2012 | Agarwal et al. |
| 2012/0053945 A1 | 3/2012 | Gupta et al. |
| 2012/0056815 A1 | 3/2012 | Mehra |
| 2012/0059655 A1 | 3/2012 | Cartales |
| 2012/0059813 A1 | 3/2012 | Sejnoha et al. |
| 2012/0062473 A1 | 3/2012 | Xiao et al. |
| 2012/0066212 A1 | 3/2012 | Jennings |
| 2012/0066581 A1 | 3/2012 | Spalink |
| 2012/0075054 A1 | 3/2012 | Ge et al. |
| 2012/0077479 A1 | 3/2012 | Sabotta et al. |
| 2012/0078611 A1 | 3/2012 | Soltani et al. |
| 2012/0078624 A1 | 3/2012 | Yook et al. |
| 2012/0078627 A1 | 3/2012 | Wagner |
| 2012/0078635 A1 | 3/2012 | Rothkopf et al. |
| 2012/0078747 A1 | 3/2012 | Chakrabarti et al. |
| 2012/0082317 A1 | 4/2012 | Pance et al. |
| 2012/0083286 A1 | 4/2012 | Kim et al. |
| 2012/0084086 A1 | 4/2012 | Gilbert et al. |
| 2012/0084634 A1 | 4/2012 | Wong et al. |
| 2012/0088219 A1 | 4/2012 | Briscoe et al. |
| 2012/0089331 A1 | 4/2012 | Schmidt et al. |
| 2012/0101823 A1 | 4/2012 | Weng et al. |
| 2012/0108166 A1 | 5/2012 | Hymel |
| 2012/0108221 A1 | 5/2012 | Thomas et al. |
| 2012/0110456 A1 | 5/2012 | Larco et al. |
| 2012/0116770 A1 | 5/2012 | Chen et al. |
| 2012/0117499 A1 | 5/2012 | Mori et al. |

(56) References Cited

U.S. PATENT DOCUMENTS

| | | |
|---|---|---|
| 2012/0124126 A1 | 5/2012 | Alcazar et al. |
| 2012/0128322 A1 | 5/2012 | Shaffer et al. |
| 2012/0130709 A1 | 5/2012 | Bocchieri et al. |
| 2012/0136572 A1 | 5/2012 | Norton |
| 2012/0136649 A1 | 5/2012 | Freising et al. |
| 2012/0136855 A1 | 5/2012 | Ni et al. |
| 2012/0136985 A1 | 5/2012 | Popescu et al. |
| 2012/0137367 A1 | 5/2012 | Dupont et al. |
| 2012/0149342 A1 | 6/2012 | Cohen et al. |
| 2012/0149394 A1 | 6/2012 | Singh et al. |
| 2012/0150544 A1 | 6/2012 | McLoughlin et al. |
| 2012/0150580 A1 | 6/2012 | Norton |
| 2012/0158293 A1 | 6/2012 | Burnham |
| 2012/0158399 A1 | 6/2012 | Tremblay et al. |
| 2012/0158422 A1 | 6/2012 | Burnham et al. |
| 2012/0159380 A1 | 6/2012 | Kocienda et al. |
| 2012/0163710 A1 | 6/2012 | Skaff et al. |
| 2012/0166196 A1 | 6/2012 | Ju et al. |
| 2012/0173222 A1 | 7/2012 | Wang et al. |
| 2012/0173244 A1 | 7/2012 | Kwak et al. |
| 2012/0173464 A1 | 7/2012 | Tur et al. |
| 2012/0174121 A1 | 7/2012 | Treat et al. |
| 2012/0179457 A1 | 7/2012 | Newman et al. |
| 2012/0179467 A1 | 7/2012 | Williams |
| 2012/0185237 A1 | 7/2012 | Gajic et al. |
| 2012/0185480 A1 | 7/2012 | Ni et al. |
| 2012/0185781 A1 | 7/2012 | Guzman et al. |
| 2012/0191461 A1 | 7/2012 | Lin et al. |
| 2012/0192096 A1 | 7/2012 | Bowman et al. |
| 2012/0197743 A1 | 8/2012 | Grigg et al. |
| 2012/0197995 A1 | 8/2012 | Caruso |
| 2012/0197998 A1 | 8/2012 | Kessel et al. |
| 2012/0201362 A1 | 8/2012 | Crossan et al. |
| 2012/0209853 A1 | 8/2012 | Desai et al. |
| 2012/0209874 A1 | 8/2012 | Wong et al. |
| 2012/0210266 A1 | 8/2012 | Jiang et al. |
| 2012/0214141 A1 | 8/2012 | Raya et al. |
| 2012/0214517 A1 | 8/2012 | Singh et al. |
| 2012/0215762 A1 | 8/2012 | Hall et al. |
| 2012/0221339 A1 | 8/2012 | Wang et al. |
| 2012/0221552 A1 | 8/2012 | Reponen et al. |
| 2012/0223889 A1 | 9/2012 | Medlock et al. |
| 2012/0223936 A1 | 9/2012 | Aughey et al. |
| 2012/0232885 A1 | 9/2012 | Barbosa et al. |
| 2012/0232886 A1 | 9/2012 | Capuozzo et al. |
| 2012/0232906 A1 | 9/2012 | Lindahl et al. |
| 2012/0233207 A1 | 9/2012 | Mohajer |
| 2012/0233266 A1 | 9/2012 | Hassan et al. |
| 2012/0239661 A1 | 9/2012 | Giblin |
| 2012/0239761 A1 | 9/2012 | Linner et al. |
| 2012/0242482 A1 | 9/2012 | Elumalai et al. |
| 2012/0245719 A1 | 9/2012 | Story, Jr. et al. |
| 2012/0245939 A1 | 9/2012 | Braho et al. |
| 2012/0245941 A1 | 9/2012 | Cheyer |
| 2012/0245944 A1 | 9/2012 | Gruber et al. |
| 2012/0246064 A1 | 9/2012 | Balkow |
| 2012/0250858 A1 | 10/2012 | Iqbal et al. |
| 2012/0252367 A1 | 10/2012 | Gaglio et al. |
| 2012/0252540 A1 | 10/2012 | Kirigaya |
| 2012/0253785 A1 | 10/2012 | Hamid et al. |
| 2012/0253791 A1 | 10/2012 | Heck et al. |
| 2012/0254143 A1 | 10/2012 | Varma et al. |
| 2012/0254152 A1 | 10/2012 | Park et al. |
| 2012/0254290 A1 | 10/2012 | Naaman |
| 2012/0259615 A1 | 10/2012 | Morin et al. |
| 2012/0262296 A1 | 10/2012 | Bezar |
| 2012/0265528 A1 | 10/2012 | Gruber et al. |
| 2012/0265535 A1 | 10/2012 | Bryant-Rich et al. |
| 2012/0265806 A1 | 10/2012 | Blanchflower et al. |
| 2012/0271625 A1 | 10/2012 | Bernard |
| 2012/0271634 A1 | 10/2012 | Lenke |
| 2012/0271635 A1 | 10/2012 | Ljolje |
| 2012/0271640 A1 | 10/2012 | Basir |
| 2012/0271676 A1 | 10/2012 | Aravamudan et al. |
| 2012/0275377 A1 | 11/2012 | Lehane et al. |
| 2012/0284015 A1 | 11/2012 | Drewes |
| 2012/0284027 A1 | 11/2012 | Mallett et al. |
| 2012/0290291 A1 | 11/2012 | Shelley et al. |
| 2012/0290300 A1 | 11/2012 | Lee et al. |
| 2012/0295708 A1 | 11/2012 | Hernandez-Abrego et al. |
| 2012/0296638 A1 | 11/2012 | Patwa |
| 2012/0296649 A1 | 11/2012 | Bansal et al. |
| 2012/0296654 A1 | 11/2012 | Hendrickson et al. |
| 2012/0296891 A1 | 11/2012 | Rangan |
| 2012/0297348 A1 | 11/2012 | Santoro |
| 2012/0303369 A1 | 11/2012 | Brush et al. |
| 2012/0303371 A1 | 11/2012 | Labsky et al. |
| 2012/0304124 A1 | 11/2012 | Chen et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O'Sullivan |
| 2012/0310922 A1 | 12/2012 | Johnson et al. |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0316862 A1 | 12/2012 | Sultan et al. |
| 2012/0316875 A1 | 12/2012 | Nyquist et al. |
| 2012/0316878 A1 | 12/2012 | Singleton et al. |
| 2012/0317194 A1 | 12/2012 | Tian |
| 2012/0317498 A1 | 12/2012 | Logan et al. |
| 2012/0321112 A1 | 12/2012 | Schubert et al. |
| 2012/0324391 A1 | 12/2012 | Tocci et al. |
| 2012/0327009 A1 | 12/2012 | Fleizach |
| 2012/0329529 A1 | 12/2012 | van der Raadt |
| 2012/0330660 A1 | 12/2012 | Jaiswal |
| 2012/0330661 A1 | 12/2012 | Lindahl |
| 2012/0330990 A1 | 12/2012 | Chen et al. |
| 2013/0002716 A1 | 1/2013 | Walker et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0007648 A1 | 1/2013 | Gamon et al. |
| 2013/0009858 A1 | 1/2013 | Lacey |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0018659 A1 | 1/2013 | Chi |
| 2013/0024576 A1 | 1/2013 | Dishneau et al. |
| 2013/0027875 A1 | 1/2013 | Zhu et al. |
| 2013/0030787 A1 | 1/2013 | Cancedda et al. |
| 2013/0030789 A1 | 1/2013 | Dalce |
| 2013/0030804 A1 | 1/2013 | Zavaliagko et al. |
| 2013/0030815 A1 | 1/2013 | Madhvanath et al. |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0033643 A1 | 2/2013 | Kim et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041665 A1 | 2/2013 | Jang et al. |
| 2013/0041667 A1 | 2/2013 | Longe et al. |
| 2013/0041968 A1 | 2/2013 | Cohen et al. |
| 2013/0046544 A1 | 2/2013 | Kay et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054675 A1 | 2/2013 | Jenkins et al. |
| 2013/0054706 A1 | 2/2013 | Graham et al. |
| 2013/0055099 A1 | 2/2013 | Yao et al. |
| 2013/0055147 A1 | 2/2013 | Vasudev et al. |
| 2013/0063611 A1 | 3/2013 | Papakipos et al. |
| 2013/0066832 A1 | 3/2013 | Sheehan et al. |
| 2013/0067307 A1 | 3/2013 | Tian et al. |
| 2013/0073286 A1 | 3/2013 | Bastea-Forte et al. |
| 2013/0073346 A1 | 3/2013 | Chun et al. |

(56) References Cited

U.S. PATENT DOCUMENTS

| | | |
|---|---|---|
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0080251 A1 | 3/2013 | Dempski |
| 2013/0082967 A1 | 4/2013 | Hillis et al. |
| 2013/0085755 A1 | 4/2013 | Bringert et al. |
| 2013/0085761 A1 | 4/2013 | Bringert et al. |
| 2013/0090921 A1 | 4/2013 | Liu et al. |
| 2013/0091090 A1 | 4/2013 | Spivack et al. |
| 2013/0095805 A1 | 4/2013 | Lebeau et al. |
| 2013/0096909 A1 | 4/2013 | Brun et al. |
| 2013/0096917 A1 | 4/2013 | Edgar et al. |
| 2013/0097566 A1 | 4/2013 | Berglund |
| 2013/0097682 A1 | 4/2013 | Zeljkovic et al. |
| 2013/0100268 A1 | 4/2013 | Mihailidis et al. |
| 2013/0103391 A1 | 4/2013 | Millmore et al. |
| 2013/0103405 A1 | 4/2013 | Namba et al. |
| 2013/0106742 A1 | 5/2013 | Lee et al. |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0110943 A1 | 5/2013 | Menon et al. |
| 2013/0111330 A1 | 5/2013 | Staikos et al. |
| 2013/0111348 A1 | 5/2013 | Gruber et al. |
| 2013/0111365 A1 | 5/2013 | Chen et al. |
| 2013/0111487 A1 | 5/2013 | Cheyer et al. |
| 2013/0111581 A1 | 5/2013 | Griffin et al. |
| 2013/0115927 A1 | 5/2013 | Gruber et al. |
| 2013/0117022 A1 | 5/2013 | Chen et al. |
| 2013/0124189 A1 | 5/2013 | Baldwin et al. |
| 2013/0132084 A1 | 5/2013 | Stonehocker et al. |
| 2013/0132089 A1 | 5/2013 | Fanty et al. |
| 2013/0132871 A1 | 5/2013 | Zeng et al. |
| 2013/0141551 A1 | 6/2013 | Kim |
| 2013/0142317 A1 | 6/2013 | Reynolds |
| 2013/0142345 A1 | 6/2013 | Waldmann |
| 2013/0144594 A1 | 6/2013 | Bangalore et al. |
| 2013/0144616 A1 | 6/2013 | Bangalore et al. |
| 2013/0151339 A1 | 6/2013 | Kim et al. |
| 2013/0152092 A1 | 6/2013 | Yadgar et al. |
| 2013/0154811 A1 | 6/2013 | Ferren et al. |
| 2013/0157629 A1 | 6/2013 | Lee et al. |
| 2013/0158977 A1 | 6/2013 | Senior |
| 2013/0159847 A1 | 6/2013 | Banke et al. |
| 2013/0165232 A1 | 6/2013 | Nelson et al. |
| 2013/0166303 A1 | 6/2013 | Chang et al. |
| 2013/0166442 A1 | 6/2013 | Nakajima et al. |
| 2013/0170738 A1 | 7/2013 | Capuozzo et al. |
| 2013/0172022 A1 | 7/2013 | Seymour et al. |
| 2013/0176244 A1 | 7/2013 | Yamamoto et al. |
| 2013/0176592 A1 | 7/2013 | Sasaki |
| 2013/0179172 A1 | 7/2013 | Nakamura et al. |
| 2013/0179440 A1 | 7/2013 | Gordon |
| 2013/0183944 A1 | 7/2013 | Mozer et al. |
| 2013/0185059 A1 | 7/2013 | Riccardi et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0191117 A1 | 7/2013 | Atti et al. |
| 2013/0197911 A1 | 8/2013 | Wei et al. |
| 2013/0204813 A1 | 8/2013 | Master et al. |
| 2013/0204897 A1 | 8/2013 | McDougall |
| 2013/0207898 A1 | 8/2013 | Sullivan et al. |
| 2013/0218553 A1 | 8/2013 | Fujii et al. |
| 2013/0218560 A1 | 8/2013 | Hsiao et al. |
| 2013/0219333 A1 | 8/2013 | Palwe et al. |
| 2013/0222249 A1 | 8/2013 | Pasquero et al. |
| 2013/0225128 A1 | 8/2013 | Gomar |
| 2013/0226935 A1 | 8/2013 | Bai et al. |
| 2013/0231917 A1 | 9/2013 | Naik |
| 2013/0234947 A1 | 9/2013 | Kristensson et al. |
| 2013/0235987 A1 | 9/2013 | Arroniz-Escobar et al. |
| 2013/0238647 A1 | 9/2013 | Thompson |
| 2013/0244615 A1 | 9/2013 | Miller et al. |
| 2013/0246048 A1 | 9/2013 | Nagase et al. |
| 2013/0246050 A1 | 9/2013 | Yu et al. |
| 2013/0246329 A1 | 9/2013 | Pasquero et al. |
| 2013/0253911 A1 | 9/2013 | Petri et al. |
| 2013/0253912 A1 | 9/2013 | Medlock et al. |
| 2013/0268263 A1 | 10/2013 | Park et al. |
| 2013/0275117 A1 | 10/2013 | Winer |
| 2013/0275138 A1 | 10/2013 | Gruber et al. |
| 2013/0275164 A1* | 10/2013 | Gruber .................. G10L 17/22 705/5 |
| 2013/0275199 A1 | 10/2013 | Proctor, Jr. et al. |
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0282709 A1 | 10/2013 | Zhu et al. |
| 2013/0283168 A1 | 10/2013 | Brown et al. |
| 2013/0289991 A1 | 10/2013 | Eshwar et al. |
| 2013/0289993 A1 | 10/2013 | Rao et al. |
| 2013/0289994 A1 | 10/2013 | Newman et al. |
| 2013/0291015 A1 | 10/2013 | Pan |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0305119 A1 | 11/2013 | Kern et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311184 A1 | 11/2013 | Badavne et al. |
| 2013/0311997 A1 | 11/2013 | Gruber et al. |
| 2013/0316746 A1 | 11/2013 | Miller et al. |
| 2013/0322634 A1* | 12/2013 | Bennett .................. G10L 21/00 381/17 |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325481 A1 | 12/2013 | Van Os et al. |
| 2013/0325484 A1 | 12/2013 | Chakladar et al. |
| 2013/0325967 A1 | 12/2013 | Parks et al. |
| 2013/0325970 A1 | 12/2013 | Roberts et al. |
| 2013/0325979 A1 | 12/2013 | Mansfield et al. |
| 2013/0329023 A1 | 12/2013 | Suplee, III et al. |
| 2013/0331127 A1 | 12/2013 | Sabatelli et al. |
| 2013/0332159 A1 | 12/2013 | Federighi et al. |
| 2013/0332162 A1 | 12/2013 | Keen |
| 2013/0332164 A1 | 12/2013 | Nalk |
| 2013/0332168 A1 | 12/2013 | Kim et al. |
| 2013/0332172 A1 | 12/2013 | Prakash et al. |
| 2013/0332400 A1 | 12/2013 | González |
| 2013/0339256 A1 | 12/2013 | Shroff |
| 2013/0346068 A1 | 12/2013 | Solem et al. |
| 2013/0346347 A1 | 12/2013 | Patterson et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006030 A1 | 1/2014 | Fleizach et al. |
| 2014/0006153 A1 | 1/2014 | Thangam et al. |
| 2014/0012574 A1 | 1/2014 | Pasupalak et al. |
| 2014/0012580 A1 | 1/2014 | Ganong et al. |
| 2014/0012586 A1 | 1/2014 | Rubin et al. |
| 2014/0019116 A1 | 1/2014 | Lundberg et al. |
| 2014/0019133 A1 | 1/2014 | Bao et al. |
| 2014/0019460 A1 | 1/2014 | Sambrani et al. |
| 2014/0028735 A1 | 1/2014 | Williams et al. |
| 2014/0032453 A1 | 1/2014 | Eustice et al. |
| 2014/0033071 A1 | 1/2014 | Gruber et al. |
| 2014/0035823 A1 | 2/2014 | Khoe et al. |
| 2014/0039893 A1 | 2/2014 | Weiner |
| 2014/0039894 A1 | 2/2014 | Shostak |
| 2014/0040274 A1 | 2/2014 | Aravamudan et al. |

(56) References Cited

U.S. PATENT DOCUMENTS

| | | |
|---|---|---|
| 2014/0040748 A1 | 2/2014 | Lemay et al. |
| 2014/0040801 A1 | 2/2014 | Patel et al. |
| 2014/0040918 A1 | 2/2014 | Li et al. |
| 2014/0046934 A1 | 2/2014 | Zhou et al. |
| 2014/0047001 A1 | 2/2014 | Phillips et al. |
| 2014/0052680 A1 | 2/2014 | Nitz et al. |
| 2014/0052791 A1 | 2/2014 | Chakra et al. |
| 2014/0053082 A1 | 2/2014 | Park et al. |
| 2014/0053210 A1 | 2/2014 | Cheong et al. |
| 2014/0057610 A1 | 2/2014 | Olincy et al. |
| 2014/0059030 A1 | 2/2014 | Hakkani-Tur et al. |
| 2014/0067361 A1 | 3/2014 | Nikoulina et al. |
| 2014/0067371 A1 | 3/2014 | Liensberger |
| 2014/0067402 A1 | 3/2014 | Kim |
| 2014/0068751 A1 | 3/2014 | Last et al. |
| 2014/0074454 A1 | 3/2014 | Brown et al. |
| 2014/0074466 A1 | 3/2014 | Sharifi et al. |
| 2014/0074470 A1 | 3/2014 | Jansche et al. |
| 2014/0074472 A1 | 3/2014 | Lin et al. |
| 2014/0074483 A1 | 3/2014 | Van Os |
| 2014/0074815 A1 | 3/2014 | Plimton |
| 2014/0078065 A1 | 3/2014 | Akkok et al. |
| 2014/0079195 A1 | 3/2014 | Srivastava et al. |
| 2014/0080428 A1 | 3/2014 | Rhoads et al. |
| 2014/0081619 A1 | 3/2014 | Solntseva et al. |
| 2014/0081633 A1 | 3/2014 | Badaskar et al. |
| 2014/0082501 A1 | 3/2014 | Bae et al. |
| 2014/0086458 A1 | 3/2014 | Rogers et al. |
| 2014/0087711 A1 | 3/2014 | Geyer et al. |
| 2014/0088961 A1 | 3/2014 | Woodward et al. |
| 2014/0095171 A1 | 4/2014 | Lynch et al. |
| 2014/0095172 A1 | 4/2014 | Cabaco et al. |
| 2014/0095173 A1 | 4/2014 | Lynch et al. |
| 2014/0096209 A1 | 4/2014 | Saraf et al. |
| 2014/0098247 A1 | 4/2014 | Rao et al. |
| 2014/0108017 A1 | 4/2014 | Mason et al. |
| 2014/0114554 A1 | 4/2014 | Lagassey |
| 2014/0118155 A1 | 5/2014 | Bowers et al. |
| 2014/0122059 A1 | 5/2014 | Patel et al. |
| 2014/0122086 A1 | 5/2014 | Kapur et al. |
| 2014/0122136 A1 | 5/2014 | Jayanthi |
| 2014/0122153 A1 | 5/2014 | Truitt |
| 2014/0134983 A1 | 5/2014 | Jung et al. |
| 2014/0135036 A1 | 5/2014 | Bonanni et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0136987 A1 | 5/2014 | Rodriguez |
| 2014/0142922 A1 | 5/2014 | Liang et al. |
| 2014/0142923 A1 | 5/2014 | Jones et al. |
| 2014/0142935 A1 | 5/2014 | Lindahl et al. |
| 2014/0143550 A1 | 5/2014 | Ganong, III et al. |
| 2014/0143721 A1 | 5/2014 | Suzuki et al. |
| 2014/0146200 A1 | 5/2014 | Scott et al. |
| 2014/0152577 A1 | 6/2014 | Yuen et al. |
| 2014/0155031 A1 | 6/2014 | Lee et al. |
| 2014/0156262 A1 | 6/2014 | Yuen et al. |
| 2014/0156279 A1 | 6/2014 | Okamoto et al. |
| 2014/0157422 A1 | 6/2014 | Livshits et al. |
| 2014/0163951 A1 | 6/2014 | Nikoulina et al. |
| 2014/0163953 A1 | 6/2014 | Parikh |
| 2014/0163954 A1 | 6/2014 | Joshi et al. |
| 2014/0163977 A1 | 6/2014 | Hoffmeister et al. |
| 2014/0163981 A1 | 6/2014 | Cook et al. |
| 2014/0163995 A1 | 6/2014 | Burns et al. |
| 2014/0164476 A1 | 6/2014 | Thomson |
| 2014/0164532 A1 | 6/2014 | Lynch et al. |
| 2014/0164533 A1 | 6/2014 | Lynch et al. |
| 2014/0169795 A1 | 6/2014 | Clough |
| 2014/0172878 A1 | 6/2014 | Clark et al. |
| 2014/0173460 A1 | 6/2014 | Kim |
| 2014/0180499 A1 | 6/2014 | Cooper et al. |
| 2014/0180689 A1 | 6/2014 | Kim et al. |
| 2014/0180697 A1 | 6/2014 | Torok et al. |
| 2014/0181865 A1 | 6/2014 | Koganei |
| 2014/0188477 A1 | 7/2014 | Zhang |
| 2014/0195226 A1 | 7/2014 | Yun et al. |
| 2014/0195230 A1 | 7/2014 | Han et al. |
| 2014/0195233 A1 | 7/2014 | Bapat |
| 2014/0195244 A1 | 7/2014 | Cha et al. |
| 2014/0195251 A1 | 7/2014 | Zeinstra et al. |
| 2014/0195252 A1 | 7/2014 | Gruber et al. |
| 2014/0198048 A1 | 7/2014 | Unruh et al. |
| 2014/0203939 A1 | 7/2014 | Harrington et al. |
| 2014/0205076 A1 | 7/2014 | Kumar et al. |
| 2014/0207439 A1 | 7/2014 | Venkatapathy et al. |
| 2014/0207446 A1 | 7/2014 | Klein et al. |
| 2014/0207468 A1 | 7/2014 | Bartnik |
| 2014/0207582 A1 | 7/2014 | Flinn et al. |
| 2014/0214429 A1 | 7/2014 | Pantel |
| 2014/0214537 A1 | 7/2014 | Yoo et al. |
| 2014/0218372 A1 | 8/2014 | Missig et al. |
| 2014/0222436 A1 | 8/2014 | Binder et al. |
| 2014/0222678 A1 | 8/2014 | Sheets et al. |
| 2014/0223377 A1 | 8/2014 | Shaw et al. |
| 2014/0223481 A1 | 8/2014 | Fundament |
| 2014/0230055 A1 | 8/2014 | Boehl |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0244248 A1 | 8/2014 | Arisoy et al. |
| 2014/0244249 A1 | 8/2014 | Mohamed et al. |
| 2014/0244254 A1 | 8/2014 | Ju et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244266 A1 | 8/2014 | Brown et al. |
| 2014/0244268 A1 | 8/2014 | Abdelsamie et al. |
| 2014/0244271 A1 | 8/2014 | Lindahl |
| 2014/0244712 A1 | 8/2014 | Walters et al. |
| 2014/0245140 A1 | 8/2014 | Brown et al. |
| 2014/0247383 A1 | 9/2014 | Dave et al. |
| 2014/0247926 A1 | 9/2014 | Gainsboro et al. |
| 2014/0249817 A1 | 9/2014 | Hart et al. |
| 2014/0249821 A1 | 9/2014 | Kennewick et al. |
| 2014/0250046 A1 | 9/2014 | Winn et al. |
| 2014/0257809 A1 | 9/2014 | Goel et al. |
| 2014/0257815 A1 | 9/2014 | Zhao et al. |
| 2014/0258857 A1 | 9/2014 | Dykstra-Erickson et al. |
| 2014/0267022 A1 | 9/2014 | Kim |
| 2014/0267599 A1 | 9/2014 | Drouin et al. |
| 2014/0272821 A1 | 9/2014 | Pitschel et al. |
| 2014/0274005 A1 | 9/2014 | Luna et al. |
| 2014/0274203 A1 | 9/2014 | Ganong et al. |
| 2014/0274211 A1 | 9/2014 | Sejnoha et al. |
| 2014/0278343 A1 | 9/2014 | Tran |
| 2014/0278349 A1 | 9/2014 | Grieves et al. |
| 2014/0278379 A1 | 9/2014 | Coccaro et al. |
| 2014/0278390 A1 | 9/2014 | Kingsbury et al. |
| 2014/0278391 A1 | 9/2014 | Braho et al. |
| 2014/0278394 A1 | 9/2014 | Bastyr et al. |
| 2014/0278406 A1 | 9/2014 | Tsumura et al. |
| 2014/0278413 A1 | 9/2014 | Pitschel et al. |
| 2014/0278429 A1 | 9/2014 | Ganong, III |
| 2014/0278435 A1 | 9/2014 | Ganong et al. |
| 2014/0278436 A1 | 9/2014 | Khanna et al. |
| 2014/0278443 A1 | 9/2014 | Gunn et al. |
| 2014/0278513 A1 | 9/2014 | Prakash et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0280450 A1 | 9/2014 | Luna |
| 2014/0281983 A1 | 9/2014 | Xian et al. |
| 2014/0282003 A1 | 9/2014 | Gruber et al. |
| 2014/0282007 A1 | 9/2014 | Fleizach |
| 2014/0282045 A1 | 9/2014 | Ayanam et al. |
| 2014/0282201 A1 | 9/2014 | Pasquero et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0289508 A1 | 9/2014 | Wang |
| 2014/0297267 A1 | 10/2014 | Spencer et al. |

(56) References Cited

U.S. PATENT DOCUMENTS

| | | |
|---|---|---|
| 2014/0297281 A1 | 10/2014 | Togawa et al. |
| 2014/0297284 A1 | 10/2014 | Gruber et al. |
| 2014/0297288 A1 | 10/2014 | Yu et al. |
| 2014/0304605 A1 | 10/2014 | Ohmura et al. |
| 2014/0309996 A1 | 10/2014 | Zhang |
| 2014/0310001 A1 | 10/2014 | Kalns et al. |
| 2014/0310002 A1 | 10/2014 | Nitz et al. |
| 2014/0316585 A1 | 10/2014 | Boesveld et al. |
| 2014/0317030 A1 | 10/2014 | Shen et al. |
| 2014/0317502 A1 | 10/2014 | Brown et al. |
| 2014/0324884 A1 | 10/2014 | Lindahl et al. |
| 2014/0330569 A1 | 11/2014 | Kolavennu et al. |
| 2014/0337048 A1 | 11/2014 | Brown et al. |
| 2014/0337266 A1 | 11/2014 | Wolverton et al. |
| 2014/0337371 A1 | 11/2014 | Li |
| 2014/0337438 A1 | 11/2014 | Govande et al. |
| 2014/0337751 A1 | 11/2014 | Lim et al. |
| 2014/0337814 A1 | 11/2014 | Kalns et al. |
| 2014/0342762 A1 | 11/2014 | Hajdu et al. |
| 2014/0344627 A1 | 11/2014 | Schaub et al. |
| 2014/0344687 A1 | 11/2014 | Durham et al. |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |
| 2014/0358523 A1 | 12/2014 | Sheth et al. |
| 2014/0361973 A1 | 12/2014 | Raux et al. |
| 2014/0365209 A1 | 12/2014 | Evermann |
| 2014/0365214 A1 | 12/2014 | Bayley |
| 2014/0365216 A1 | 12/2014 | Gruber et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365880 A1 | 12/2014 | Bellegarda |
| 2014/0365885 A1 | 12/2014 | Carson et al. |
| 2014/0365895 A1 | 12/2014 | Paulson et al. |
| 2014/0365922 A1 | 12/2014 | Yang |
| 2014/0370817 A1 | 12/2014 | Luna |
| 2014/0370841 A1 | 12/2014 | Roberts et al. |
| 2014/0372112 A1 | 12/2014 | Xue et al. |
| 2014/0372356 A1 | 12/2014 | Bilal et al. |
| 2014/0372931 A1 | 12/2014 | Zhai et al. |
| 2014/0379334 A1 | 12/2014 | Fry |
| 2014/0379341 A1 | 12/2014 | Seo et al. |
| 2014/0380285 A1 | 12/2014 | Gabel et al. |
| 2015/0003797 A1 | 1/2015 | Schmidt |
| 2015/0006148 A1 | 1/2015 | Goldszmit et al. |
| 2015/0006157 A1 | 1/2015 | Andrade Silva et al. |
| 2015/0006176 A1 | 1/2015 | Pogue et al. |
| 2015/0006178 A1 | 1/2015 | Peng et al. |
| 2015/0006184 A1 | 1/2015 | Marti et al. |
| 2015/0006199 A1 | 1/2015 | Snider et al. |
| 2015/0012271 A1 | 1/2015 | Peng et al. |
| 2015/0019219 A1 | 1/2015 | Tzirkel-hancock et al. |
| 2015/0019221 A1 | 1/2015 | Lee et al. |
| 2015/0031416 A1 | 1/2015 | Wells et al. |
| 2015/0033219 A1 | 1/2015 | Breiner et al. |
| 2015/0033275 A1* | 1/2015 | Natani ............ H04N 21/42225 725/110 |
| 2015/0039292 A1 | 2/2015 | Suleman et al. |
| 2015/0039299 A1 | 2/2015 | Weinstein et al. |
| 2015/0039305 A1 | 2/2015 | Huang |
| 2015/0040012 A1 | 2/2015 | Faaborg et al. |
| 2015/0045003 A1 | 2/2015 | Vora et al. |
| 2015/0045068 A1 | 2/2015 | Soffer et al. |
| 2015/0046537 A1 | 2/2015 | Rakib |
| 2015/0050633 A1 | 2/2015 | Christmas et al. |
| 2015/0058013 A1 | 2/2015 | Pakhomov et al. |
| 2015/0058018 A1 | 2/2015 | Georges et al. |
| 2015/0058785 A1 | 2/2015 | Ookawara |
| 2015/0065200 A1 | 3/2015 | Namgung et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0067485 A1 | 3/2015 | Kim et al. |
| 2015/0067822 A1 | 3/2015 | Randall |
| 2015/0071121 A1 | 3/2015 | Patil et al. |
| 2015/0073788 A1 | 3/2015 | Allauzen et al. |
| 2015/0073804 A1 | 3/2015 | Senior et al. |
| 2015/0074524 A1 | 3/2015 | Nicholson et al. |
| 2015/0074615 A1 | 3/2015 | Han et al. |
| 2015/0082229 A1 | 3/2015 | Ouyang et al. |
| 2015/0088511 A1 | 3/2015 | Bharadwaj et al. |
| 2015/0088514 A1 | 3/2015 | Typrin |
| 2015/0088522 A1 | 3/2015 | Hendrickson et al. |
| 2015/0088523 A1 | 3/2015 | Schuster |
| 2015/0095031 A1 | 4/2015 | Conkie et al. |
| 2015/0095278 A1 | 4/2015 | Flinn et al. |
| 2015/0100316 A1 | 4/2015 | Williams et al. |
| 2015/0100537 A1 | 4/2015 | Grieves et al. |
| 2015/0100983 A1 | 4/2015 | Pan |
| 2015/0106093 A1 | 4/2015 | Weeks et al. |
| 2015/0113407 A1 | 4/2015 | Hoffert et al. |
| 2015/0120723 A1 | 4/2015 | Deshmukh et al. |
| 2015/0121216 A1 | 4/2015 | Brown et al. |
| 2015/0127348 A1 | 5/2015 | Follis |
| 2015/0127350 A1 | 5/2015 | Agiomyrgiannakis |
| 2015/0133109 A1 | 5/2015 | Freeman et al. |
| 2015/0134334 A1 | 5/2015 | Sachidanandam et al. |
| 2015/0135085 A1 | 5/2015 | Shoham et al. |
| 2015/0135123 A1 | 5/2015 | Carr et al. |
| 2015/0142420 A1 | 5/2015 | Sarikaya et al. |
| 2015/0142438 A1 | 5/2015 | Dai et al. |
| 2015/0142447 A1 | 5/2015 | Kennewick et al. |
| 2015/0142851 A1 | 5/2015 | Gupta et al. |
| 2015/0148013 A1 | 5/2015 | Baldwin et al. |
| 2015/0149177 A1 | 5/2015 | Kalns et al. |
| 2015/0149182 A1 | 5/2015 | Kalns et al. |
| 2015/0149354 A1 | 5/2015 | Mccoy |
| 2015/0149469 A1 | 5/2015 | Xu et al. |
| 2015/0154185 A1 | 6/2015 | Waibel |
| 2015/0154976 A1 | 6/2015 | Mutagi |
| 2015/0161370 A1 | 6/2015 | North et al. |
| 2015/0161521 A1 | 6/2015 | Shah et al. |
| 2015/0161989 A1 | 6/2015 | Hsu et al. |
| 2015/0162001 A1 | 6/2015 | Kar et al. |
| 2015/0163558 A1 | 6/2015 | Wheatley |
| 2015/0169284 A1 | 6/2015 | Quast et al. |
| 2015/0169336 A1 | 6/2015 | Harper et al. |
| 2015/0170664 A1 | 6/2015 | Doherty et al. |
| 2015/0172463 A1 | 6/2015 | Quest et al. |
| 2015/0178388 A1 | 6/2015 | Winnemoeller et al. |
| 2015/0179176 A1 | 6/2015 | Ryu et al. |
| 2015/0185964 A1 | 7/2015 | Stout |
| 2015/0186012 A1 | 7/2015 | Coleman et al. |
| 2015/0186110 A1 | 7/2015 | Kannan |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0186351 A1 | 7/2015 | Hicks et al. |
| 2015/0187355 A1 | 7/2015 | Parkinson et al. |
| 2015/0187369 A1 | 7/2015 | Dadu et al. |
| 2015/0189362 A1 | 7/2015 | Lee et al. |
| 2015/0193379 A1 | 7/2015 | Mehta |
| 2015/0193391 A1 | 7/2015 | Khvostichenko et al. |
| 2015/0193392 A1 | 7/2015 | Greenblatt et al. |
| 2015/0194152 A1 | 7/2015 | Katuri et al. |
| 2015/0195379 A1 | 7/2015 | Zhang et al. |
| 2015/0195606 A1 | 7/2015 | McDevitt |
| 2015/0199077 A1 | 7/2015 | Zuger et al. |
| 2015/0199960 A1 | 7/2015 | Huo et al. |
| 2015/0199965 A1 | 7/2015 | Leak et al. |
| 2015/0199967 A1 | 7/2015 | Reddy et al. |
| 2015/0201064 A1 | 7/2015 | Bells et al. |
| 2015/0205858 A1 | 7/2015 | Xie et al. |
| 2015/0208226 A1 | 7/2015 | Kuusilinna et al. |
| 2015/0212791 A1 | 7/2015 | Kumar et al. |
| 2015/0213796 A1 | 7/2015 | Waltermann et al. |
| 2015/0220507 A1 | 8/2015 | Mohajer et al. |
| 2015/0221304 A1 | 8/2015 | Stewart |
| 2015/0221307 A1 | 8/2015 | Shah et al. |
| 2015/0227505 A1 | 8/2015 | Morimoto |

(56) References Cited

U.S. PATENT DOCUMENTS

| | | |
|---|---|---|
| 2015/0227633 A1 | 8/2015 | Shapira |
| 2015/0228281 A1 | 8/2015 | Raniere |
| 2015/0230095 A1 | 8/2015 | Smith et al. |
| 2015/0234636 A1 | 8/2015 | Barnes, Jr. |
| 2015/0234800 A1 | 8/2015 | Patrick et al. |
| 2015/0242091 A1 | 8/2015 | Lu et al. |
| 2015/0243278 A1 | 8/2015 | Kibre et al. |
| 2015/0243283 A1 | 8/2015 | Halash et al. |
| 2015/0245154 A1 | 8/2015 | Dadu et al. |
| 2015/0248651 A1 | 9/2015 | Akutagawa et al. |
| 2015/0248886 A1 | 9/2015 | Sarikaya et al. |
| 2015/0254057 A1 | 9/2015 | Klein et al. |
| 2015/0254058 A1 | 9/2015 | Klein et al. |
| 2015/0254333 A1 | 9/2015 | Fife et al. |
| 2015/0255071 A1 | 9/2015 | Chiba |
| 2015/0256873 A1 | 9/2015 | Klein et al. |
| 2015/0261496 A1 | 9/2015 | Faaborg et al. |
| 2015/0261850 A1 | 9/2015 | Mittal |
| 2015/0269139 A1 | 9/2015 | McAteer et al. |
| 2015/0277574 A1 | 10/2015 | Jain et al. |
| 2015/0278370 A1 | 10/2015 | Stratvert et al. |
| 2015/0279358 A1 | 10/2015 | Kingsbury et al. |
| 2015/0279360 A1 | 10/2015 | Mengibar et al. |
| 2015/0281380 A1 | 10/2015 | Wang et al. |
| 2015/0286627 A1 | 10/2015 | Chang et al. |
| 2015/0287401 A1 | 10/2015 | Lee et al. |
| 2015/0287409 A1 | 10/2015 | Jang |
| 2015/0288629 A1 | 10/2015 | Choi et al. |
| 2015/0294086 A1 | 10/2015 | Kare et al. |
| 2015/0294377 A1 | 10/2015 | Chow |
| 2015/0294516 A1 | 10/2015 | Chiang |
| 2015/0295915 A1 | 10/2015 | Xiu |
| 2015/0302855 A1 | 10/2015 | Kim et al. |
| 2015/0302856 A1 | 10/2015 | Kim et al. |
| 2015/0302857 A1 | 10/2015 | Yamada |
| 2015/0309997 A1 | 10/2015 | Lee et al. |
| 2015/0310858 A1 | 10/2015 | Li et al. |
| 2015/0310862 A1 | 10/2015 | Dauphin et al. |
| 2015/0310879 A1 | 10/2015 | Buchanan et al. |
| 2015/0312182 A1 | 10/2015 | Langholz |
| 2015/0317069 A1 | 11/2015 | Clements et al. |
| 2015/0317310 A1 | 11/2015 | Eiche et al. |
| 2015/0324041 A1 | 11/2015 | Varley et al. |
| 2015/0324334 A1 | 11/2015 | Lee et al. |
| 2015/0331664 A1 | 11/2015 | Osawa et al. |
| 2015/0331711 A1 | 11/2015 | Huang et al. |
| 2015/0332667 A1 | 11/2015 | Mason |
| 2015/0339049 A1 | 11/2015 | Kasemset et al. |
| 2015/0339391 A1 | 11/2015 | Kang et al. |
| 2015/0340033 A1 | 11/2015 | Di Fabbrizio et al. |
| 2015/0340040 A1 | 11/2015 | Mun et al. |
| 2015/0340042 A1 | 11/2015 | Sejnoha et al. |
| 2015/0341717 A1* | 11/2015 | Song .................. H04R 1/08 381/110 |
| 2015/0347086 A1 | 12/2015 | Liedholm et al. |
| 2015/0347381 A1 | 12/2015 | Bellegarda |
| 2015/0347382 A1 | 12/2015 | Dolfing et al. |
| 2015/0347385 A1 | 12/2015 | Flor et al. |
| 2015/0347393 A1 | 12/2015 | Futrell et al. |
| 2015/0347733 A1 | 12/2015 | Tsou et al. |
| 2015/0347985 A1 | 12/2015 | Gross et al. |
| 2015/0348547 A1 | 12/2015 | Paulik et al. |
| 2015/0348548 A1 | 12/2015 | Piernot et al. |
| 2015/0348549 A1 | 12/2015 | Giuli et al. |
| 2015/0348551 A1 | 12/2015 | Gruber et al. |
| 2015/0348554 A1 | 12/2015 | Orr et al. |
| 2015/0350031 A1 | 12/2015 | Burks et al. |
| 2015/0352999 A1 | 12/2015 | Bando et al. |
| 2015/0355879 A1 | 12/2015 | Beckhardt et al. |
| 2015/0363587 A1 | 12/2015 | Ahn et al. |
| 2015/0364140 A1 | 12/2015 | Thorn |
| 2015/0370531 A1 | 12/2015 | Faaborg |
| 2015/0370780 A1 | 12/2015 | Wang et al. |
| 2015/0371639 A1 | 12/2015 | Foerster et al. |
| 2015/0371665 A1 | 12/2015 | Naik et al. |
| 2015/0373183 A1 | 12/2015 | Woolsey et al. |
| 2015/0382047 A1 | 12/2015 | Napolitano et al. |
| 2015/0382079 A1 | 12/2015 | Lister et al. |
| 2016/0004690 A1 | 1/2016 | Bangalore et al. |
| 2016/0005320 A1 | 1/2016 | deCharms et al. |
| 2016/0012038 A1 | 1/2016 | Edwards et al. |
| 2016/0014476 A1 | 1/2016 | Caliendo, Jr. et al. |
| 2016/0018900 A1 | 1/2016 | Tu et al. |
| 2016/0019886 A1 | 1/2016 | Hong |
| 2016/0026258 A1 | 1/2016 | Ou et al. |
| 2016/0027431 A1 | 1/2016 | Kurzweil et al. |
| 2016/0028666 A1 | 1/2016 | Li |
| 2016/0029316 A1 | 1/2016 | Mohan et al. |
| 2016/0034042 A1 | 2/2016 | Joo |
| 2016/0034811 A1 | 2/2016 | Paulik et al. |
| 2016/0042735 A1 | 2/2016 | Vibbert et al. |
| 2016/0042748 A1 | 2/2016 | Jain et al. |
| 2016/0048666 A1 | 2/2016 | Dey et al. |
| 2016/0055422 A1 | 2/2016 | Li |
| 2016/0062605 A1 | 3/2016 | Agarwal et al. |
| 2016/0063998 A1 | 3/2016 | Krishnamoorthy et al. |
| 2016/0070581 A1 | 3/2016 | Soon-Shiong |
| 2016/0071516 A1 | 3/2016 | Lee et al. |
| 2016/0071521 A1 | 3/2016 | Haughay |
| 2016/0072940 A1 | 3/2016 | Cronin |
| 2016/0077794 A1 | 3/2016 | Kim et al. |
| 2016/0078860 A1 | 3/2016 | Paulik et al. |
| 2016/0080165 A1 | 3/2016 | Ehsani et al. |
| 2016/0086116 A1 | 3/2016 | Rao et al. |
| 2016/0091967 A1 | 3/2016 | Prokofieva et al. |
| 2016/0092447 A1 | 3/2016 | Venkataraman et al. |
| 2016/0092766 A1 | 3/2016 | Sainath et al. |
| 2016/0093291 A1 | 3/2016 | Kim |
| 2016/0093298 A1 | 3/2016 | Naik et al. |
| 2016/0093301 A1 | 3/2016 | Bellegarda et al. |
| 2016/0093304 A1 | 3/2016 | Kim et al. |
| 2016/0094700 A1 | 3/2016 | Lee et al. |
| 2016/0094979 A1 | 3/2016 | Naik et al. |
| 2016/0098991 A1 | 4/2016 | Luo et al. |
| 2016/0104486 A1 | 4/2016 | Penilla et al. |
| 2016/0111091 A1 | 4/2016 | Bakish |
| 2016/0117386 A1 | 4/2016 | Ajmera et al. |
| 2016/0118048 A1 | 4/2016 | Heide |
| 2016/0119338 A1 | 4/2016 | Cheyer |
| 2016/0125048 A1 | 5/2016 | Hamada |
| 2016/0125071 A1 | 5/2016 | Gabbai |
| 2016/0132484 A1 | 5/2016 | Nauze et al. |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0147725 A1 | 5/2016 | Patten et al. |
| 2016/0148610 A1 | 5/2016 | Kennewick, Jr. et al. |
| 2016/0155442 A1* | 6/2016 | Kannan .................. G06F 3/167 704/275 |
| 2016/0155443 A1 | 6/2016 | Khan et al. |
| 2016/0162456 A1 | 6/2016 | Munro et al. |
| 2016/0163311 A1 | 6/2016 | Crook et al. |
| 2016/0163312 A1 | 6/2016 | Naik et al. |
| 2016/0170966 A1 | 6/2016 | Kolo |
| 2016/0173578 A1 | 6/2016 | Sharma et al. |
| 2016/0173960 A1 | 6/2016 | Snibbe et al. |
| 2016/0179462 A1 | 6/2016 | Bjorkengren |
| 2016/0180844 A1 | 6/2016 | Vanblon et al. |
| 2016/0182410 A1 | 6/2016 | Janakiraman et al. |
| 2016/0182709 A1 | 6/2016 | Kim et al. |
| 2016/0188181 A1 | 6/2016 | Smith |
| 2016/0188738 A1 | 6/2016 | Gruber et al. |
| 2016/0189717 A1* | 6/2016 | Kannan .................. G10L 17/22 704/275 |
| 2016/0198319 A1 | 7/2016 | Huang et al. |
| 2016/0210981 A1 | 7/2016 | Lee |
| 2016/0212488 A1 | 7/2016 | Os et al. |
| 2016/0217784 A1 | 7/2016 | Gelfenbeyn et al. |
| 2016/0224540 A1 | 8/2016 | Stewart et al. |
| 2016/0224774 A1 | 8/2016 | Pender |
| 2016/0225372 A1 | 8/2016 | Cheung et al. |
| 2016/0240187 A1 | 8/2016 | Fleizach et al. |
| 2016/0247061 A1 | 8/2016 | Trask et al. |
| 2016/0253312 A1 | 9/2016 | Rhodes |

(56) References Cited

U.S. PATENT DOCUMENTS

| | | |
|---|---|---|
| 2016/0253528 A1 | 9/2016 | Gao et al. |
| 2016/0259623 A1 | 9/2016 | Sumner et al. |
| 2016/0259656 A1 | 9/2016 | Sumner et al. |
| 2016/0259779 A1 | 9/2016 | Labsk et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0266871 A1 | 9/2016 | Schmid et al. |
| 2016/0267904 A1 | 9/2016 | Biadsy et al. |
| 2016/0275941 A1 | 9/2016 | Bellegarda et al. |
| 2016/0275947 A1 | 9/2016 | Li et al. |
| 2016/0282956 A1 | 9/2016 | Ouyang et al. |
| 2016/0284005 A1 | 9/2016 | Daniel et al. |
| 2016/0284199 A1 | 9/2016 | Dotan-Cohen et al. |
| 2016/0286045 A1 | 9/2016 | Shaltiel et al. |
| 2016/0299685 A1 | 10/2016 | Zhai et al. |
| 2016/0299882 A1 | 10/2016 | Hegerty et al. |
| 2016/0299883 A1 | 10/2016 | Zhu et al. |
| 2016/0307566 A1 | 10/2016 | Bellegarda |
| 2016/0313906 A1 | 10/2016 | Kilchenko et al. |
| 2016/0314788 A1 | 10/2016 | Jitkoff et al. |
| 2016/0314792 A1* | 10/2016 | Alvarez Guevara ... G10L 15/08 |
| 2016/0321261 A1 | 11/2016 | Spasojevic et al. |
| 2016/0322045 A1 | 11/2016 | Hatfeild et al. |
| 2016/0322050 A1 | 11/2016 | Wang et al. |
| 2016/0328205 A1 | 11/2016 | Agrawal et al. |
| 2016/0328893 A1 | 11/2016 | Cordova et al. |
| 2016/0336007 A1 | 11/2016 | Hanazawa |
| 2016/0336010 A1 | 11/2016 | Lindahl |
| 2016/0336024 A1 | 11/2016 | Choi et al. |
| 2016/0337299 A1 | 11/2016 | Lane et al. |
| 2016/0337301 A1 | 11/2016 | Rollins et al. |
| 2016/0342685 A1 | 11/2016 | Basu et al. |
| 2016/0342781 A1 | 11/2016 | Jeon |
| 2016/0351190 A1 | 12/2016 | Binder et al. |
| 2016/0352567 A1 | 12/2016 | Robbins et al. |
| 2016/0357304 A1 | 12/2016 | Hatori et al. |
| 2016/0357728 A1 | 12/2016 | Bellegarda et al. |
| 2016/0357861 A1 | 12/2016 | Carlhian et al. |
| 2016/0357870 A1 | 12/2016 | Hentschel et al. |
| 2016/0358598 A1 | 12/2016 | Williams et al. |
| 2016/0358600 A1 | 12/2016 | Nallasamy et al. |
| 2016/0358619 A1 | 12/2016 | Ramprashad et al. |
| 2016/0359771 A1 | 12/2016 | Sridhar |
| 2016/0360039 A1 | 12/2016 | Sanghavi et al. |
| 2016/0360336 A1 | 12/2016 | Gross et al. |
| 2016/0360382 A1 | 12/2016 | Gross et al. |
| 2016/0364378 A1 | 12/2016 | Futrell et al. |
| 2016/0365101 A1 | 12/2016 | Foy et al. |
| 2016/0371250 A1 | 12/2016 | Rhodes |
| 2016/0372112 A1 | 12/2016 | Miller et al. |
| 2016/0378747 A1 | 12/2016 | Orr et al. |
| 2016/0379091 A1 | 12/2016 | Lin et al. |
| 2016/0379626 A1 | 12/2016 | Deisher et al. |
| 2016/0379633 A1 | 12/2016 | Lehman et al. |
| 2016/0379641 A1 | 12/2016 | Liu et al. |
| 2017/0004824 A1 | 1/2017 | Yoo et al. |
| 2017/0011303 A1 | 1/2017 | Annapureddy et al. |
| 2017/0011742 A1 | 1/2017 | Jing et al. |
| 2017/0018271 A1 | 1/2017 | Khan et al. |
| 2017/0019987 A1 | 1/2017 | Dragone et al. |
| 2017/0025124 A1 | 1/2017 | Mixter et al. |
| 2017/0031576 A1 | 2/2017 | Saoji et al. |
| 2017/0032783 A1 | 2/2017 | Lord et al. |
| 2017/0032791 A1 | 2/2017 | Elson et al. |
| 2017/0040002 A1 | 2/2017 | Basson et al. |
| 2017/0055895 A1 | 3/2017 | Des Jardins et al. |
| 2017/0060853 A1 | 3/2017 | Lee et al. |
| 2017/0068423 A1 | 3/2017 | Napolitano et al. |
| 2017/0068513 A1 | 3/2017 | Stasior et al. |
| 2017/0068550 A1 | 3/2017 | Zeitlin |
| 2017/0068670 A1 | 3/2017 | Orr et al. |
| 2017/0076720 A1 | 3/2017 | Gopalan et al. |
| 2017/0076721 A1 | 3/2017 | Bargetzi et al. |
| 2017/0083179 A1 | 3/2017 | Gruber et al. |
| 2017/0083285 A1 | 3/2017 | Meyers et al. |
| 2017/0090569 A1 | 3/2017 | Levesque |
| 2017/0091168 A1 | 3/2017 | Bellegarda et al. |
| 2017/0092270 A1 | 3/2017 | Newendorp et al. |
| 2017/0092278 A1 | 3/2017 | Evermann et al. |
| 2017/0102915 A1 | 4/2017 | Kuscher et al. |
| 2017/0103749 A1 | 4/2017 | Zhao et al. |
| 2017/0105190 A1 | 4/2017 | Logan et al. |
| 2017/0116989 A1 | 4/2017 | Yadgar et al. |
| 2017/0124190 A1 | 5/2017 | Wang et al. |
| 2017/0125016 A1 | 5/2017 | Wang |
| 2017/0127124 A9 | 5/2017 | Wilson et al. |
| 2017/0131778 A1 | 5/2017 | Iyer |
| 2017/0132199 A1 | 5/2017 | Vescovi et al. |
| 2017/0140644 A1 | 5/2017 | Hwang et al. |
| 2017/0154033 A1 | 6/2017 | Lee |
| 2017/0154055 A1 | 6/2017 | Dimson et al. |
| 2017/0161018 A1 | 6/2017 | Lemay et al. |
| 2017/0161268 A1 | 6/2017 | Badaskar |
| 2017/0169818 A1 | 6/2017 | VanBlon et al. |
| 2017/0169819 A1 | 6/2017 | Mese et al. |
| 2017/0178619 A1 | 6/2017 | Naik et al. |
| 2017/0178626 A1 | 6/2017 | Gruber et al. |
| 2017/0180499 A1 | 6/2017 | Gelfenbeyn et al. |
| 2017/0185375 A1 | 6/2017 | Martel et al. |
| 2017/0185581 A1 | 6/2017 | Bojja et al. |
| 2017/0186429 A1 | 6/2017 | Giuli et al. |
| 2017/0193083 A1 | 7/2017 | Bhatt et al. |
| 2017/0199874 A1 | 7/2017 | Patel et al. |
| 2017/0200066 A1 | 7/2017 | Wang et al. |
| 2017/0221486 A1 | 8/2017 | Kurata et al. |
| 2017/0227935 A1 | 8/2017 | Su et al. |
| 2017/0228382 A1 | 8/2017 | Haviv et al. |
| 2017/0230709 A1 | 8/2017 | Van Os et al. |
| 2017/0242653 A1 | 8/2017 | Lang et al. |
| 2017/0243468 A1 | 8/2017 | Dotan-Cohen et al. |
| 2017/0256256 A1 | 9/2017 | Wang et al. |
| 2017/0263247 A1 | 9/2017 | Kang et al. |
| 2017/0263248 A1 | 9/2017 | Gruber et al. |
| 2017/0263249 A1 | 9/2017 | Akbacak et al. |
| 2017/0264451 A1 | 9/2017 | Yu et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0295446 A1 | 10/2017 | Thagadur Shivappa |
| 2017/0316775 A1 | 11/2017 | Le et al. |
| 2017/0316782 A1 | 11/2017 | Haughey et al. |
| 2017/0323637 A1 | 11/2017 | Naik |
| 2017/0345411 A1 | 11/2017 | Raitio et al. |
| 2017/0346949 A1 | 11/2017 | Sanghavi et al. |
| 2017/0352346 A1 | 12/2017 | Paulik et al. |
| 2017/0352350 A1 | 12/2017 | Booker et al. |
| 2017/0357478 A1 | 12/2017 | Piersol et al. |
| 2017/0357632 A1 | 12/2017 | Pagallo et al. |
| 2017/0357633 A1 | 12/2017 | Wang et al. |
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358302 A1 | 12/2017 | Orr et al. |
| 2017/0358303 A1 | 12/2017 | Walker, II et al. |
| 2017/0358304 A1 | 12/2017 | Castillo et al. |
| 2017/0358305 A1 | 12/2017 | Kudurshian et al. |
| 2017/0371885 A1 | 12/2017 | Aggarwal et al. |
| 2018/0007060 A1 | 1/2018 | Leblang et al. |
| 2018/0007538 A1 | 1/2018 | Naik et al. |
| 2018/0012596 A1 | 1/2018 | Piernot et al. |
| 2018/0033431 A1 | 2/2018 | Newendorp et al. |
| 2018/0054505 A1 | 2/2018 | Hart et al. |
| 2018/0060312 A1 | 3/2018 | Won |
| 2018/0063624 A1 | 3/2018 | Boesen |
| 2018/0067914 A1 | 3/2018 | Chen et al. |
| 2018/0090143 A1 | 3/2018 | Saddler et al. |
| 2018/0107945 A1 | 4/2018 | Gao et al. |
| 2018/0108346 A1 | 4/2018 | Paulik et al. |
| 2018/0137856 A1 | 5/2018 | Gilbert |
| 2018/0137857 A1 | 5/2018 | Zhou et al. |

(56) References Cited

U.S. PATENT DOCUMENTS

| | | | |
|---|---|---|---|
| 2018/0144748 A1 | 5/2018 | Leong | |
| 2018/0190273 A1 | 7/2018 | Karimli et al. | |
| 2018/0213448 A1 | 7/2018 | Segal et al. | |
| 2018/0308485 A1 | 10/2018 | Kudurshian et al. | |
| 2018/0322112 A1 | 11/2018 | Bellegarda et al. | |
| 2018/0329982 A1 | 11/2018 | Patel et al. | |
| 2018/0330737 A1 | 11/2018 | Paulik et al. | |
| 2018/0336275 A1 | 11/2018 | Graham et al. | |
| 2018/0336894 A1 | 11/2018 | Graham et al. | |

FOREIGN PATENT DOCUMENTS

| | | |
|---|---|---|
| CA | 2792412 A1 | 7/2011 |
| CA | 2666438 C | 6/2013 |
| CN | 101162153 A | 4/2008 |
| CN | 101174366 A | 5/2008 |
| CN | 101179754 A | 5/2008 |
| CN | 101183525 A | 5/2008 |
| CN | 101188644 A | 5/2008 |
| CN | 101228503 A | 7/2008 |
| CN | 101233741 A | 7/2008 |
| CN | 101246020 A | 8/2008 |
| CN | 101247301 A | 8/2008 |
| CN | 101271689 A | 9/2008 |
| CN | 101277501 A | 10/2008 |
| CN | 101281745 A | 10/2008 |
| CN | 101292282 A | 10/2008 |
| CN | 101297541 A | 10/2008 |
| CN | 101325756 A | 12/2008 |
| CN | 101416471 A | 4/2009 |
| CN | 101427244 A | 5/2009 |
| CN | 101448340 A | 6/2009 |
| CN | 101453498 A | 6/2009 |
| CN | 101499156 A | 8/2009 |
| CN | 101500041 A | 8/2009 |
| CN | 101515952 A | 8/2009 |
| CN | 101535983 A | 9/2009 |
| CN | 101547396 A | 9/2009 |
| CN | 101557432 A | 10/2009 |
| CN | 101601088 A | 12/2009 |
| CN | 101604521 A | 12/2009 |
| CN | 101632316 A | 1/2010 |
| CN | 101636736 A | 1/2010 |
| CN | 101673544 A | 3/2010 |
| CN | 101751387 A | 6/2010 |
| CN | 101833286 A | 9/2010 |
| CN | 101847405 A | 9/2010 |
| CN | 101894547 A | 11/2010 |
| CN | 101939740 A | 1/2011 |
| CN | 101951553 A | 1/2011 |
| CN | 102137193 A | 7/2011 |
| CN | 102160043 A | 8/2011 |
| CN | 102246136 A | 11/2011 |
| CN | 202035047 U | 11/2011 |
| CN | 102282609 A | 12/2011 |
| CN | 202092650 U | 12/2011 |
| CN | 102368256 A | 3/2012 |
| CN | 102405463 A | 4/2012 |
| CN | 102498457 A | 6/2012 |
| CN | 102629246 A | 8/2012 |
| CN | 102682769 A | 9/2012 |
| CN | 102682771 A | 9/2012 |
| CN | 102685295 A | 9/2012 |
| CN | 102693725 A | 9/2012 |
| CN | 102792320 A | 11/2012 |
| CN | 102801853 A | 11/2012 |
| CN | 102870065 A | 1/2013 |
| CN | 102917004 A | 2/2013 |
| CN | 102918493 A | 2/2013 |
| CN | 103035240 A | 4/2013 |
| CN | 103038728 A | 4/2013 |
| CN | 103093334 A | 5/2013 |
| CN | 103135916 A | 6/2013 |
| CN | 103365279 A | 10/2013 |
| CN | 103744761 A | 4/2014 |
| CN | 103795850 A | 5/2014 |
| CN | 103930945 A | 7/2014 |
| CN | 104038621 A | 9/2014 |
| CN | 104090652 A | 10/2014 |
| CN | 104144377 A | 11/2014 |
| CN | 104284257 A | 1/2015 |
| CN | 104423625 A | 3/2015 |
| CN | 104463552 A | 3/2015 |
| CN | 104516522 A | 4/2015 |
| CN | 104854583 A | 8/2015 |
| CN | 104951077 A | 9/2015 |
| CN | 105247511 A | 1/2016 |
| CN | 105264524 A | 1/2016 |
| CN | 105471705 A | 4/2016 |
| CN | 107919123 A | 4/2018 |
| DE | 102008024258 A1 | 11/2009 |
| DE | 202016008226 U1 | 5/2017 |
| EP | 1892700 A1 | 2/2008 |
| EP | 1912205 A2 | 4/2008 |
| EP | 1939860 A1 | 7/2008 |
| EP | 1944997 A2 | 7/2008 |
| EP | 651543 B1 | 9/2008 |
| EP | 1909263 B1 | 1/2009 |
| EP | 1335620 B1 | 3/2009 |
| EP | 2069895 A1 | 6/2009 |
| EP | 2081185 A1 | 7/2009 |
| EP | 2094032 A1 | 8/2009 |
| EP | 2096840 A1 | 9/2009 |
| EP | 2107553 A1 | 10/2009 |
| EP | 2109295 A1 | 10/2009 |
| EP | 1720375 B1 | 7/2010 |
| EP | 2205010 A1 | 7/2010 |
| EP | 2309491 A1 | 4/2011 |
| EP | 2329348 | 6/2011 |
| EP | 2339576 A2 | 6/2011 |
| EP | 2400373 A1 | 12/2011 |
| EP | 2431842 A2 | 3/2012 |
| EP | 2523188 A1 | 11/2012 |
| EP | 2551784 A1 | 1/2013 |
| EP | 2555536 A1 | 2/2013 |
| EP | 2575128 A2 | 4/2013 |
| EP | 2632129 A1 | 8/2013 |
| EP | 2683175 A1 | 1/2014 |
| EP | 2733598 A2 | 5/2014 |
| EP | 2760015 A1 | 7/2014 |
| EP | 2801890 A1 | 11/2014 |
| EP | 2801972 A1 | 11/2014 |
| EP | 2849177 A1 | 3/2015 |
| EP | 2930715 A1 | 10/2015 |
| EP | 2938022 A1 | 10/2015 |
| EP | 2940556 A1 | 11/2015 |
| EP | 2950307 A1 | 12/2015 |
| EP | 3035329 A1 | 6/2016 |
| EP | 3224708 A1 | 10/2017 |
| EP | 3246916 A1 | 11/2017 |
| EP | 3300074 A1 | 3/2018 |
| EP | 2983065 B1 | 8/2018 |
| FR | 2911201 A1 | 7/2008 |
| GB | 2445436 A | 7/2008 |
| GB | 2445667 A | 7/2008 |
| JP | 2008-009120 A | 1/2008 |
| JP | 2008-21002 A | 1/2008 |
| JP | 2008-26381 A | 2/2008 |
| JP | 2008-39928 A | 2/2008 |
| JP | 2008-58813 A | 3/2008 |
| JP | 2008-064687 A | 3/2008 |
| JP | 2008-90545 A | 4/2008 |
| JP | 2008-97003 A | 4/2008 |
| JP | 2008-134949 A | 6/2008 |
| JP | 2008-158510 A | 7/2008 |
| JP | 2008-526101 A | 7/2008 |
| JP | 2008-185693 A | 8/2008 |
| JP | 2008-198022 A | 8/2008 |
| JP | 2008-217468 A | 9/2008 |
| JP | 2008-228129 A | 9/2008 |
| JP | 2008-233678 A | 10/2008 |
| JP | 2008-236448 A | 10/2008 |
| JP | 2008-252161 A | 10/2008 |
| JP | 2008-268684 A | 11/2008 |

(56) References Cited

FOREIGN PATENT DOCUMENTS

| | | |
|---|---|---|
| JP | 2008-269480 A | 11/2008 |
| JP | 2008-271481 A | 11/2008 |
| JP | 2008-275731 A | 11/2008 |
| JP | 2008-299221 A | 12/2008 |
| JP | 2009-2850 A | 1/2009 |
| JP | 2009-503623 A | 1/2009 |
| JP | 2009-36999 A | 2/2009 |
| JP | 2009-505142 A | 2/2009 |
| JP | 2009-47920 A | 3/2009 |
| JP | 2009-069062 A | 4/2009 |
| JP | 2009-98490 A | 5/2009 |
| JP | 2009-110300 A | 5/2009 |
| JP | 2009-134409 A | 6/2009 |
| JP | 2009-140444 A | 6/2009 |
| JP | 2009-186989 A | 8/2009 |
| JP | 2009-193448 A | 8/2009 |
| JP | 2009-193457 A | 8/2009 |
| JP | 2009-193532 A | 8/2009 |
| JP | 2009-205367 A | 9/2009 |
| JP | 2009-223840 A | 10/2009 |
| JP | 2009-294913 A | 12/2009 |
| JP | 2009-294946 A | 12/2009 |
| JP | 2009-543166 A | 12/2009 |
| JP | 2010-66519 A | 3/2010 |
| JP | 2010-78979 A | 4/2010 |
| JP | 2010-108378 A | 5/2010 |
| JP | 2010-518475 A | 5/2010 |
| JP | 2010-518526 A | 5/2010 |
| JP | 2010-146347 A | 7/2010 |
| JP | 2010-157207 A | 7/2010 |
| JP | 2010-205111 A | 9/2010 |
| JP | 2010-224236 A | 10/2010 |
| JP | 4563106 B2 | 10/2010 |
| JP | 2010-535377 A | 11/2010 |
| JP | 2010-287063 A | 12/2010 |
| JP | 2011-33874 A | 2/2011 |
| JP | 2011-41026 A | 2/2011 |
| JP | 2011-45005 A | 3/2011 |
| JP | 2011-59659 A | 3/2011 |
| JP | 2011-81541 A | 4/2011 |
| JP | 2011-525045 A | 9/2011 |
| JP | 2011-238022 A | 11/2011 |
| JP | 2011-250027 A | 12/2011 |
| JP | 2012-014394 A | 1/2012 |
| JP | 2012-33997 A | 2/2012 |
| JP | 2012-508530 A | 4/2012 |
| JP | 2012-089020 A | 5/2012 |
| JP | 2012-116442 A | 6/2012 |
| JP | 2012-142744 A | 7/2012 |
| JP | 2012-147063 A | 8/2012 |
| JP | 2012-518847 A | 8/2012 |
| JP | 2013-37688 A | 2/2013 |
| JP | 2013-511214 A | 3/2013 |
| JP | 2013-65284 A | 4/2013 |
| JP | 2013-73240 A | 4/2013 |
| JP | 2013-513315 A | 4/2013 |
| JP | 2013-080476 A | 5/2013 |
| JP | 2013-517566 A | 5/2013 |
| JP | 2013-134430 A | 7/2013 |
| JP | 2013/140520 A | 7/2013 |
| JP | 2013-527947 A | 7/2013 |
| JP | 2013-528012 A | 7/2013 |
| JP | 2013-156349 A | 8/2013 |
| JP | 2013-200423 A | 10/2013 |
| JP | 2013-205999 A | 10/2013 |
| JP | 2013-238936 A | 11/2013 |
| JP | 2014-10688 A | 1/2014 |
| JP | 2014-026629 A | 2/2014 |
| JP | 2014-60600 A | 4/2014 |
| JP | 2014-72586 A | 4/2014 |
| JP | 2014-077969 A | 5/2014 |
| JP | 2014/109889 A | 6/2014 |
| JP | 2014-124332 A | 7/2014 |
| JP | 2014-145842 A | 8/2014 |
| JP | 2014-150323 A | 8/2014 |
| JP | 2014-222514 A | 11/2014 |
| JP | 2015-8001 A | 1/2015 |
| JP | 2015-501022 A | 1/2015 |
| JP | 2015-41845 A | 3/2015 |
| JP | 2015-94848 A | 5/2015 |
| JP | 2015-519675 A | 7/2015 |
| JP | 2015-524974 A | 8/2015 |
| JP | 2015-526776 A | 9/2015 |
| JP | 2015-528140 A | 9/2015 |
| JP | 2015-528918 A | 10/2015 |
| JP | 2016-119615 A | 6/2016 |
| KR | 10-0801227 B1 | 2/2008 |
| KR | 10-0810500 B1 | 3/2008 |
| KR | 10-2008-0033070 A | 4/2008 |
| KR | 10-0819928 B1 | 4/2008 |
| KR | 10-2008-0049647 A | 6/2008 |
| KR | 10-2008-0059332 A | 6/2008 |
| KR | 10-2008-0109322 A | 12/2008 |
| KR | 10-2009-0001716 A | 1/2009 |
| KR | 10-2009-0028464 A | 3/2009 |
| KR | 10-2009-0030117 A | 3/2009 |
| KR | 10-2009-0086805 A | 8/2009 |
| KR | 10-0920267 B1 | 10/2009 |
| KR | 10-2009-0122944 A | 12/2009 |
| KR | 10-2009-0127961 A | 12/2009 |
| KR | 10-2009-0129192 A | 12/2009 |
| KR | 10-2010-0015958 A | 2/2010 |
| KR | 10-2010-0048571 A | 5/2010 |
| KR | 10-2010-0053149 A | 5/2010 |
| KR | 10-2010-0119519 A | 11/2010 |
| KR | 10-2011-0043644 A | 4/2011 |
| KR | 10-1032792 B1 | 5/2011 |
| KR | 10-2011-0068490 A | 6/2011 |
| KR | 10-2011-0072847 A | 6/2011 |
| KR | 10-2011-0086492 A | 7/2011 |
| KR | 10-2011-0100620 A | 9/2011 |
| KR | 10-2011-0113414 A | 10/2011 |
| KR | 10-2011-0115134 A | 10/2011 |
| KR | 10-2012-0020164 A | 3/2012 |
| KR | 10-2012-0031722 A | 4/2012 |
| KR | 10-1178310 B1 | 8/2012 |
| KR | 10-2012-0120316 A | 11/2012 |
| KR | 10-2012-0137435 A | 12/2012 |
| KR | 10-2012-0137440 A | 12/2012 |
| KR | 10-2012-0138826 A | 12/2012 |
| KR | 10-2012-0139827 A | 12/2012 |
| KR | 10-1193668 B1 | 12/2012 |
| KR | 10-2013-0035983 A | 4/2013 |
| KR | 10-2013-0108563 A | 10/2013 |
| KR | 10-1334342 B1 | 11/2013 |
| KR | 10-2013-0131252 A | 12/2013 |
| KR | 10-2013-0133629 A | 12/2013 |
| KR | 10-2014-0031283 A | 3/2014 |
| KR | 10-2014-0033574 A | 3/2014 |
| KR | 10-2014-0147557 A | 12/2014 |
| KR | 10-2015-0043512 A | 4/2015 |
| KR | 10-2016-0010523 A | 1/2016 |
| RU | 2349970 C2 | 3/2009 |
| RU | 2353068 C2 | 4/2009 |
| RU | 2364917 C2 | 8/2009 |
| TW | 200801988 A | 1/2008 |
| TW | I301373 B | 9/2008 |
| TW | M348993 U | 1/2009 |
| TW | 200943903 A | 10/2009 |
| TW | 201018258 A | 5/2010 |
| TW | 201027515 A1 | 7/2010 |
| TW | 201028996 A1 | 8/2010 |
| TW | 201110108 A1 | 3/2011 |
| TW | 2011-42823 A1 | 12/2011 |
| TW | 201227715 A1 | 7/2012 |
| TW | 201245989 A1 | 11/2012 |
| TW | 201312548 A1 | 3/2013 |
| WO | 2008/030970 A2 | 3/2008 |
| WO | 2008/071231 A1 | 6/2008 |
| WO | 2008/085742 A2 | 7/2008 |
| WO | 2008/098900 A2 | 8/2008 |
| WO | 2008/109835 A2 | 8/2008 |
| WO | 2008/120036 A1 | 10/2008 |
| WO | 2008/130095 A1 | 10/2008 |

(56) References Cited

FOREIGN PATENT DOCUMENTS

| | | |
|---|---|---|
| WO | 2008/140236 A1 | 11/2008 |
| WO | 2008/142472 A1 | 11/2008 |
| WO | 2008/153639 A1 | 12/2008 |
| WO | 2009/009240 A2 | 1/2009 |
| WO | 2009/016631 A2 | 2/2009 |
| WO | 2009/017280 A1 | 2/2009 |
| WO | 2009/034686 A1 | 3/2009 |
| WO | 2009/075912 A1 | 6/2009 |
| WO | 2009/104126 A1 | 8/2009 |
| WO | 2009/156438 A1 | 12/2009 |
| WO | 2009/156978 A1 | 12/2009 |
| WO | 2010/054373 A2 | 5/2010 |
| WO | 2010/075623 A1 | 7/2010 |
| WO | 2010/100937 A1 | 9/2010 |
| WO | 2010/141802 A1 | 12/2010 |
| WO | 2011/057346 A1 | 5/2011 |
| WO | 2011/060106 A1 | 5/2011 |
| WO | 2011/088053 A2 | 7/2011 |
| WO | 2011/093025 A1 | 8/2011 |
| WO | 2011/116309 A1 | 9/2011 |
| WO | 2011/133543 A1 | 10/2011 |
| WO | 2011/150730 A1 | 12/2011 |
| WO | 2011/163350 A1 | 12/2011 |
| WO | 2011/088053 A3 | 1/2012 |
| WO | 2012/019637 A1 | 2/2012 |
| WO | 2012/129231 A1 | 9/2012 |
| WO | 2012/135157 A2 | 10/2012 |
| WO | 2012/154317 A1 | 11/2012 |
| WO | 2012/155079 A2 | 11/2012 |
| WO | 2012/167168 A2 | 12/2012 |
| WO | 2013/009578 A2 | 1/2013 |
| WO | 2013/022135 A1 | 2/2013 |
| WO | 2013/022223 A2 | 2/2013 |
| WO | 2013/048880 A1 | 4/2013 |
| WO | 2013/049358 A1 | 4/2013 |
| WO | 2013/163113 A1 | 10/2013 |
| WO | 2013/169842 A2 | 11/2013 |
| WO | 2013/173504 A1 | 11/2013 |
| WO | 2013/173511 A2 | 11/2013 |
| WO | 2013/176847 A1 | 11/2013 |
| WO | 2013/184953 A1 | 12/2013 |
| WO | 2013/184990 A1 | 12/2013 |
| WO | 2014/003138 A1 | 1/2014 |
| WO | 2014/021967 A1 | 2/2014 |
| WO | 2014/022148 A1 | 2/2014 |
| WO | 2014/028797 A1 | 2/2014 |
| WO | 2014/031505 A1 | 2/2014 |
| WO | 2014/047047 A1 | 3/2014 |
| WO | 2014/066352 A1 | 5/2014 |
| WO | 2014/078965 A1 | 5/2014 |
| WO | 2014/096506 A1 | 6/2014 |
| WO | 2014/124332 A2 | 8/2014 |
| WO | 2014/137074 A1 | 9/2014 |
| WO | 2014/138604 A1 | 9/2014 |
| WO | 2014/143959 A2 | 9/2014 |
| WO | 2014/144579 A1 | 9/2014 |
| WO | 2014/159581 A1 | 10/2014 |
| WO | 2014/197336 A1 | 12/2014 |
| WO | 2014/200728 A1 | 12/2014 |
| WO | 2014/204659 A2 | 12/2014 |
| WO | 2015/018440 A1 | 2/2015 |
| WO | 2015/030796 A1 | 3/2015 |
| WO | 2015/041892 A1 | 3/2015 |
| WO | 2015/084659 A1 | 6/2015 |
| WO | 2015/092943 A1 | 6/2015 |
| WO | 2015/094169 A1 | 6/2015 |
| WO | 2015/094369 A1 | 6/2015 |
| WO | 2015/099939 A1 | 7/2015 |
| WO | 2015/116151 A1 | 8/2015 |
| WO | 2015/151133 A1 | 10/2015 |
| WO | 2015/157013 A1 | 10/2015 |
| WO | 2015/183401 A1 | 12/2015 |
| WO | 2015/183699 A1 | 12/2015 |
| WO | 2015/184186 A1 | 12/2015 |
| WO | 2015/200207 A1 | 12/2015 |
| WO | 2016/027933 A1 | 2/2016 |
| WO | 2016/028946 A1 | 2/2016 |
| WO | 2016/033257 A1 | 3/2016 |
| WO | 2016/054230 A1 | 4/2016 |
| WO | 2016/057268 A1 | 4/2016 |
| WO | 2016/075081 A1 | 5/2016 |
| WO | 2016/085775 A2 | 6/2016 |
| WO | 2016/100139 A1 | 6/2016 |
| WO | 2016/111881 A1 | 7/2016 |
| WO | 2016/144840 A1 | 9/2016 |
| WO | 2016/144982 A1 | 9/2016 |
| WO | 2016/175354 A1 | 11/2016 |
| WO | 2016/209444 A1 | 12/2016 |
| WO | 2017/044260 A1 | 3/2017 |
| WO | 2017/044629 A1 | 3/2017 |
| WO | 2017/053311 A1 | 3/2017 |

OTHER PUBLICATIONS

Office Action received for Australian Patent Application No. 2016409888, dated Feb. 20, 2019, 4 pages.

Extended European Search Report (includes Supplementary European Search Report and Search Opinion) received for European Patent Application No. 16904828.7, dated Mar. 19, 2019, 9 pages.

"Alexa, Turn Up the Heat!", Smartthings Samsung [online], Available online at https://web.archive.org/web/20160329142041/https://blog.smartthings.com/news/smartthingsupdates/alexa-turn-up-the-heat/, Mar. 3, 2016, 3 pages.

"Galaxy S7: How to Adjust Screen Timeout & Lock Screen Timeout", Available online at:—"https://www.youtube.com/watch?v=n6e1WKUS2ww", Jun. 9, 2016, 1 page.

"Hey Google: How to Create a Shopping List with Your Google Assistant", Available online at:—https://www.youtube.com/watch?v=w9NCsElax1Y, May 25, 2018, 1 page.

"How to Enable Google Assistant on Galaxy 57 and other Android Phones (No Root)", Available online at:—"https://www.youtube.com/watch?v=HeklQbWyksE", Mar. 20, 2017, 1 page.

"How to Use Ok Google Assistant Even Phone is Locked", Available online at:—"https://www.youtube.com/watch?v=9B_gP4j_SP8", Mar. 12, 2018, 1 page.

"SmartThings +Amazon Echo", Smartthings Samsung [online], Available online at <https://web.archive.org/web/20160509231428/https://blog.smartthings.com/featured/alexa-turn-on-my-smartthings/>, Aug. 21, 2015, 3 pages.

"Ask Alexa—Things That Are Smart Wiki", Available online at <URL:http://thingsthataresmart.wiki/index.php?title=Ask_Alexa&oldid=4283>, [retrieved from internet on Aug. 2, 2017], Jun. 8, 2016, pp. 1-31.

"DIRECTV™ Voice", Now Part of the DIRECTTV Mobile App for Phones, Sep. 18, 2013, 5 pages.

"Northern Telecom", Meridian Mail PC User Guide, 1988, 17 Pages.

"The world of Virtual Assistants—more SemTech . . . ", End of Business as Usual—Glenn's External blog, Online Available at <https://web.archive.org/web/20091101840940/http://glennas.wordpress.com/2009/10/17/the-world-of-virtual-assistants-more-semtech/>, Oct. 17, 2009, 5 pages.

Anania, Peter, "Amazon Echo with Home Automation (Smartthings)", Available online at https://www.youtube.com/watch?v=LMW6aXmsWNE, Dec. 20, 2015, 1 page.

Arons, Barry Michael., "The Audio-Graphical Interface to a Personal Integrated Telecommunications System", Thesis Submitted to the Department of Architecture at the Massachusetts Institute of Technology, Jun. 1984, 88 pages.

Asakura et al., "What LG thinks; How the TV should be in the Living Room", HiVi, vol. 31, No. 7 (Jul. 2013), Stereo Sound Publishing, Inc., Jun. 17, 2013, pp. 68-71 (Official Copy Only). (See Communication under 37 CFR § 1.98(a) (3)).

Ashbrook, Daniel L.., "Enabling Mobile Microinteractions", Retrieved from the Internet: URL: "http://danielashbrook.com/wp-content/uploads/2012/06/2009-Ashbrook-Thesis.pdf", May 2010, 186 pages.

(56) References Cited

OTHER PUBLICATIONS

AshingtonDCTech & Gaming, "SwipeStatusBar—Reveal the Status Bar in a Fullscreen App", Online Available at: <https://www.youtube.com/watch?v=wA_tT9lAreQ>, Jul. 1, 2013, 3 pages.
Cambria et al., "Jumping NLP Curves: A Review of Natural Language Processing Research", IEEE Computational Intelligence Magazine, 2014, vol. 9, May 2014, pp. 48-57.
Coleman, David W., "Meridian Mail Voice Mail System Integrates Voice Processing and Personal Computing", Speech Technology, vol. 4, No. 2, Mar./Apr. 1988, pp. 84-87.
Deedeevuu, "Amazon Echo Alarm Feature", Available online at https://www.youtube.com/watch?v=fdjU8eRLk7c, Feb. 16, 2015, 1 page.
EARTHLING1984, "Samsung Galaxy Smart Stay Feature Explained", Available online at:—"https://www.youtube.com/watch?v=RpjBNtSjupl", May 29, 2013, 1 page.
Filipowicz, Luke, "How to use the Quick Type Keyboard in iOS 8", available online at <https://www.imore.com/comment/568232>, Oct. 11, 2014, pp. 1-17.
Finkel et al., "Joint Parsing and Named Entity Recognition", Human Language Technologies: The 2009 Annual Conference of the North American Chapter of the ACL, Jun. 2009, pp. 326-334.
Gomez et al., "Mouth Gesture and Voice Command Based Robot Command Interface", IEEE International Conference on Robotics and Automation, May 12-17, 2009, pp. 333-338.
Google Developers, "Voice Search in Your App", Available online at:—https://www.youtube.com/watch?v=PS1FbB5qWEI, Nov. 12, 2014, 1 page.
Haga et al., "A Usability Survey of a Contents-Based Video Retrieval System by Combining Digital Video and an Electronic Bulletin Board", The Internet and Higher Education, vol. 8, 2005, pp. 251-262.
INews and Tech, "How to Use the QuickType Keyboard in iOS 8", Available online at:—"http://www.inewsandtech.com/how-to-use-the-quicktype-keyboard-in-ios-8/", Sep. 17, 2014, 6 pages.
Jonsson et al, "Proximity-based Reminders Using Bluetooth", 2014 IEEE International Conference on Pervasive Computing and Communications Demonstrations, 2014, pp. 151-153.
Karn, Ujjwal, "An Intuitive Explanation of Convolutional Neural Networks", The Data Science Blog, Aug. 11, 2016, 23 pages.
Liou et al., "Autoencoder for Words", Neurocomputing, vol. 139, Sep. 2014, pp. 84-96.
Majerus, Wesley, "Cell Phone Accessibility for your Blind Child", Retrieved from the Internet <URL:https://web.archive.org/web/20100210001100/https://nfb.org/images/nfb/publications/fr/fr28/3/fr280314.htm>, 2010, pp. 1-5.
Manning et al., "Introduction to Information Retrieval", New York, Cambridge University Press, 2008, 504 pages.
Marketing Land, "Amazon Echo: Play Music", Online Available at: <https://www.youtube.com/watch?v=A7V5NPbsXi4>, Apr. 27, 2015, 3 pages.
Mhatre et al., "Donna Interactive Chat-bot acting as a Personal Assistant", International Journal of Computer Applications (0975-8887), vol. 140, No. 10, Apr. 2016, 6 pages.
Mikolov et al., "Linguistic Regularities in Continuous Space Word Representations", Proceedings of NAACL-HLT, Jun. 9-14, 2013, pp. 746-751.
Morrison, Jonathan, "iPhone 5 Siri Demo", Online Available at <https://www.youtube.com/watch?v=_wHWwG5IhWc>, Sep. 21, 2012, 3 pages.
Nakamura, Satoshi, "Overcoming the Language Barrier with Speech Translation Technology, Science & Technology Trends", Quarterly Review No. 31, Apr. 2009, pp. 36-49.
Nakazawa et al., "Detection and Labeling of Significant Scenes from TV program based on Twitter Analysis", Proceedings of the 3rd Forum on Data Engineering and Information Management (DEIM 2011 proceedings), IEICE Data Engineering Technical Group. Available online at: http://db-event.jpn.org/deim2011/proceedings/pdf/f5-6.pdf, Feb. 28, 2011, 10 pages (Official Copy Only). (See Communication under 37 CFR § 1.98(a) (3)).
Nozawa, Naoki et al., "iPhone 4S Perfect Manual", vol. 1, First Edition, Nov. 11, 2011, 5 pages (Official Copy Only) (See Communication under 37 CFR § 1.98(a) (3)).
Okuno et al., "System for Japanese Input Method based on the Internet", Technical Report of Information Processing Society of Japan, Natural Language Processing, Japan, Information Processing Society of Japan, vol. 2009, No. 36, Mar. 18, 2009, 8 pages (Official Copy Only) (See Communication under 37 CFR § 1.98(a) (3)).
Patra et al., "A Kernel-Based Approach for Biomedical Named Entity Recognition", Scientific World Journal, vol. 2013, 2013, pp. 1-7.
Pennington et al., "GloVe: Global Vectors for Word Representation", Proceedings of the Conference on Empirical Methods Natural Language Processing (EMNLP), Oct. 25-29, 2014, pp. 1532-1543.
Perlow, Jason, "Alexa Loop Mode With Playlist for Sleep Noise", Online Available at: <https://www.youtube.com/watch?v=nSkSuXziJSg>, Apr. 11, 2016, 3 pages.
Routines, "SmartThings Support", Available online at <https://web.archive.org/web/20151207165701/https://support.smartthings.com/hc/en-us/articles/205380034-Routines>, 2015, 2 pages.
Samsung, "SGH-a885 Series—Portable Quad-Band Mobile Phone—User Manual", Retrieved from the Internet: URL: "http://web.archive.org/web/20100106113758/http://www.comparecellular.com/images/phones/userguide1896.pdf", Jan. 1, 2009, 144 pages.
Schmandt et al., "A Conversational Telephone Messaging System", IEEE Transactions on Consumer Electronics, vol. CE-30, Aug. 1984, pp. xxi-xxiv.
Schmandt et al., "Phone Slave: A Graphical Telecommunications Interface", Proceedings of the SID, vol. 26, No. 1, 1985, 4 pages.
Schmandt et al., "Phone Slave: A Graphical Telecommunications Interface", Society for Information Display, International Symposium Digest of Technical Papers, Jun. 1984, 4 pages.
Seehafer, Brent, "Activate google assistant on Galaxy S7 with screen off", Available online at:—"https://productforums.google.com/forum/#!topic/websearch/lp3qIGBHLVI", Mar. 8, 2017, 4 pages.
Selfrifge et al., "Interact: Tightly-coupling Multimodal Dialog with an Interactive Virtual Assistant", International Conference on Multimodal Interaction, ACM, Nov. 9, 2015, pp. 381-382.
Spivack, Nova, "Sneak Preview of Siri—Part Two—Technical Foundations—Interview with Tom Gruber, CTO of Siri", Online Available at <https://web.archive.org/web/20100114234454/http://www.twine.com/item/12vhy39k4-22m/interview-with-tom-gruber-of-siri>, Jan. 14, 2010, 5 pages.
Sundermeyer et al., "From Feedforward to Recurrent LSTM Neural Networks for Language Modeling", IEEE Transactions to Audio, Speech, and Language Processing, 2015, vol. 23, Mar. 2015, pp. 517-529.
Sundermeyer et al., "LSTM Neural Networks for Language Modeling", INTERSPEECH 2012, ISCA's 13 Annual Conference, Sep. 9-13, 2012, pp. 194-197.
Tanaka, Tatsuo, "Next Generation IT Channel Strategy Through "Experience Technology"", Intellectual Resource Creation, Japan, Nomura Research Institute Ltd. vol. 19, No. 1, Dec. 20, 2010, 17 pages. (Official Copy only) (See Communication under 37 CFR § 1.98(a) (3)).
Vodafone Deutschland, "Samsung Galaxy S3 Tastatur Spracheingabe", Available online at—"https://www.youtube.com/watch?v=6kOd6Gr8uFE", Aug. 22, 2012, 1 page.
X.AI, "How it Works", May 2016, 6 pages.
Xu, Yuhong, "Policy optimization of dialogue management in spoken dialogue system for out-of-domain utterances", 2016 International Conference on Asian Language Processing (IALP), IEEE, Nov. 21, 2016, pp. 10-13.
Yan et al., "A Scalable Approach to Using DNN-Derived Features in GMM-HMM Based Acoustic Modeling for LVCSR", InInterspeech, 2013, pp. 104-108.
Yates, Michael C., "How can I exit Google Assistant after I'm finished with it", Available online at:—"https://productforums.google.com/forum/#!msg/phone-by-google/faECnR2RJwA/gKNtOkQgAQAJ", Jan. 11, 2016, 2 pages.
Young et al., "The Hidden Information State model: A practical framework for POMDP-based spoken dialogue management", Computer Speech & Language, vol. 24, Issue 2, 2010, pp. 150-174.

(56) References Cited

OTHER PUBLICATIONS

Zangerle et al., "Recommending #-Tag in Twitter", Proceedings of the Workshop on Semantic Adaptive Socail Web, 2011, pp. 1-12.
Adium, "AboutAdium—Adium X—Trac", available at <http://web.archive.org/web/20070819113247/http://trac.adiumx.com/wiki/AboutAdium>, retrieved on Nov. 25, 2011, 2 pages.
Alfred App, "Alfred", available at <http://www.alfredapp.com/>, retrieved on Feb. 8, 2012, 5 pages.
API.AI, "Android App Review—Speaktoit Assistant", Available at <https://www.youtube.com/watch?v=myE498nyfGw>, Mar. 30, 2011, 3 pages.
Apple Computer, "Knowledge Navigator", published by Apple Computer no later than 2008, as depicted in Exemplary Screenshots from video entitled 'Knowledge Navigator', 2008, 7 pages.
Apple, "VoiceOver", available at <http://www.apple.com/accessibility/voiceover/>, May 19, 2014, 3 pages.
Berry et al., "PTIME: Personalized Assistance for Calendaring", ACM Transactions on Intelligent Systems and Technology, vol. 2, No. 4, Article 40, Jul. 2011, pp. 1-22.
Bertulucci, Jeff, "Google Adds Voice Search to Chrome Browser", PC World, Jun. 14, 2011, 5 pages.
Bocchieri et al., "Use of Geographical Meta-Data in ASR Language and Acoustic Models", IEEE International Conference on Acoustics Speech and Signal Processing, 2010, pp. 5118-5121.
Butcher, Mike, "EVI Arrives in Town to go Toe-to-Toe with Siri", TechCrunch, Jan. 23, 2012, 2 pages.
Caraballo et al., "Language Identification Based on a Discriminative Text Categorization Technique", Iberspeech 2012—Vii Jornadas En Tecnologia Del Habla and Iii Iberiansl Tech Workshop, Nov. 21, 2012, pp. 1-10.
Castleos, "Whole House Voice Control Demonstration", available online at : https://www.youtube.com/watch?v=9SRCoxrZ_W4, Jun. 2, 2012, 26 pages.
Certificate of Examination received for Australian Patent Application No. 2017100586, dated Feb. 19, 2018, 2 pages.
Certificate of Examination received for Australian Patent Application No. 2017100636, dated Feb. 19, 2018, 2 pages.
Chamberlain, Kim, "Quick Start Guide Natural Reader", available online at <http://atrc.colostate.edu/files/guickstarts/Natural_Reader_Quick_Start_Guide.>, Apr. 2008, 5 pages.
Chen, Yi, "Multimedia Siri Finds and Plays Whatever You Ask For", PSFK Report, Feb. 9, 2012, 9 pages.
Cheyer, Adam, "About Adam Cheyer", available at <http://www.adam.cheyer.com/about.html>, retrieved on Sep. 17, 2012, 2 pages.
Choi et al., "Acoustic and Visual Signal based Context Awareness System for Mobile Application", IEEE Transactions on Consumer Electronics, vol. 57, No. 2, May 2011, pp. 738-746.
Colt, Sam, "Here's One Way Apple's Smartwatch Could Be Better Than Anything Else", Business Insider, Aug. 21, 2014, pp. 1-4.
Corrected Notice of Allowance received for U.S. Appl. No. 15/269,728, dated Sep. 27, 2018, 2 pages.
Decision to Grant received for Danish Patent Application No. PA201670564, dated Feb. 13, 2018, 2 pages.
Dragon Naturally Speaking Version 11 Users Guide, Nuance Communications, Inc., Copyright @2002-2010, 132 pages.
Elliott et al., "Annotation Suggestion and Search for Personal Multimedia Objects on the Web", CIVR, Jul. 7-9, 2008, pp. 75-84.
Erol et al., "Multimedia Clip Generation From Documents for Browsing on Mobile Devices", IEEE Transactions on Multimedia, vol. 10, No. 5, Aug. 2008, 13 pages.
Evi, "Meet Evi: The One Mobile Application that Provides Solutions for your Everyday Problems", Feb. 2012, 3 pages.
Exhibit 1, "Natural Language Interface Using Constrained Intermediate Dictionary of Results", List of Publications Manually Reviewed for the Search of U.S. Pat. No. 7,177,798, Mar. 22, 2013, 1 page.
Final Office Action received for U.S. Appl. No. 15/269,728, dated Mar. 9, 2018, 20 pages.
Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Gannes, Liz, "Alfred App Gives Personalized Restaurant Recommendations", AllThingsD, Jul. 18, 2011, pp. 1-3.
Gruber, Thomas R., et al., U.S. Appl. No. 61/186,414, filed Jun. 12, 2009 titled "System and Method for Semantic Auto-Completion" 13 pages.
Gruber, Thomas R., et al., U.S. Appl. No. 61/493,201, filed Jun. 3, 2011 titled "Generating and Processing Data Items That Represent Tasks to Perform", 68 pages.
Gruber, Thomas R., et al., U.S. Appl. No. 61/657,744, filed Jun. 9, 2012 titled "Automatically Adapting User Interfaces for Hands-Free Interaction", 40 pages.
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.
Gruber, Tom, "Siri, A Virtual Personal Assistant-Bringing Intelligence to the Interface", Semantic Technologies Conference, Jun. 16, 2009, 21 pages.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guim, Mark, "How to Set a Person-Based Reminder with Cortana", available at <http://www.wpcentral.com/how-to-person-based-reminder-cortana>, Apr. 26, 2014, 15 pages.
Hardwar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Hashimoto, Yoshiyuki, "Simple Guide for iPhone Siri, Which Can Be Operated with Your Voice", Shuwa System Co., Ltd., vol. 1, Jul. 5, 2012, pp. 8, 130, 131.
Headset Button Controller v7.3 APK Full APP Download for Android, Blackberry, iPhone, Jan. 27, 2014, 11 pages.
Hear voice from Google translate, Available on URL:https://www.youtube.com/watch?v=18AvMhFgD28, Jan. 28, 2011, 1 page.
id3.org, "id3v2.4.0—Frames", available at <http://id3.org/id3v2.4.0-frames?action=print>, retrieved on Jan. 22, 2015, 41 pages.
Intention to Grant received for Danish Patent Application No. PA201670564, dated Nov. 17, 2017, 3 pages.
Interactive Voice, available at <http://www.helloivee.com/company/>, retrieved on Feb. 10, 2014, 2 pages.
International Preliminary Report on Patentability received for PCT Patent Application No. PCT/US2016/056510, dated Aug. 1, 2018, 10 pages.
International Search Report and Written Opinion received for PCT Patent Application No. PCT/US2016/056510, dated Jan. 9, 2017, 9 pages.
Iowegian International, "FIR Filter Properties, DSPGuru, Digital Signal Processing Central", available at <http://www.dspguru.com/dsp/faq/fir/properties> retrieved on Jul. 28, 2010, 6 pages.
Jawaid et al., "Machine Translation with Significant Word Reordering and Rich Target-Side Morphology", WDS'11 Proceedings of Contributed Papers, Part I, 2011, pp. 161-166.
Jiang et al., "A Syllable-based Name Transliteration System", Proc. of the 2009 Named Entities Workshop, Aug. 7, 2009, pp. 96-99.
Jouvet et al., "Evaluating Grapheme-to-phoneme Converters in Automatic Speech Recognition Context", IEEE, 2012, pp. 4821-4824.
Kane et al., "Slide Rule: Making Mobile Touch Screens Accessible to Blind People Using Multi-Touch Interaction Techniques", ASSETS, Oct. 13-15, 2008, pp. 73-80.

(56) References Cited

OTHER PUBLICATIONS

Kazmucha, Allyson, "How to Send Map Locations Using iMessage", iMore.com, Available at <http://www.imore.com/how-use-imessage-share-your-location-your-iphone>, Aug. 2, 2012, 6 pages.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
KnowNav, "Knowledge Navigator", YouTube Video available at <http://www.youtube.com/watch?v=QRH8eimU_20>, Apr. 29, 2008, 1 page.
Lewis, Cameron, "Task Ave for iPhone Review", Mac Life, Available at <http://www.maclife.com/article/reviews/task_ave_iphone_review>, Mar. 3, 2011, 5 pages.
MacTech, "KeyStrokes 3.5 for Mac OS X Boosts Word Prediction", available at <http://www.mactech.com/news/?p=1007129>, retrieved on Jan. 7, 2008, 3 pages.
Martins et al., "Extracting and Exploring the Geo-Temporal Semantics of Textual Resources", Semantic Computing, IEEE International Conference, 2008, pp. 1-9.
Meet Ivee, "Your Wi-Fi Voice Activated Assistant", available at <http://www.helloivee.com/>, retrieved on Feb. 10, 2014, 8 pages.
Mel Scale, "Wikipedia the Free Encyclopedia", Last modified on Oct. 13, 2009 and retrieved on Jul. 28, 2010, available at <http://en.wikipedia.org/wiki/Mel_scale>, 2 pages.
Microsoft, "Turn On and Use Magnifier", available at <http://www.microsoft.com/windowsxp/using/accessibility/magnifierturnon.mspx>, retrieved on Jun. 6, 2009.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Minimum Phase, "Wikipedia the free Encyclopedia", Last modified on Jan. 12, 2010 and retrieved on Jul. 28, 2010, available at <http://en.wikipedia.org/wiki/Minimum_phase>, 8 pages.
"Mobile Speech Solutions", Mobile Accessibility, SVOX AG Product Information Sheet, available at <http://www.svox.com/site/bra840604/con782768/mob965831936.aSQ?osLang=1>, Sep. 27, 2012, 1 page.
Morton, Philip, "Checking If an Element Is Hidden", StackOverflow, Available at <http://stackoverflow.com/guestions/178325/checking-if-an-element-is-hidden>, Oct. 7, 2008, 12 pages.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
Naone, Erica, "TR10: Intelligent Software Assistant", Technology Review, Mar.-Apr. 2009, 2 pages.
Navigli, Roberto, "Word Sense Disambiguation: A Survey", ACM Computing Surveys, vol. 41, No. 2, Feb. 2009, 69 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Ng, Simon, "Google's Task List Now Comes to Iphone", SimonBlog, Available at <http://www.simonblog.com/2009/02/04/googles-task-list-now-comes-to-iphone/>, Feb. 4, 2009, 3 pages.
Non Final Office Action received for U.S. Appl. No. 15/269,728, dated Aug. 15, 2017, 22 pages.
Non Final Office Action received for U.S. Appl. No. 15/269,728, dated May 4, 2018, 22 pages.
Notice of Allowance received for U.S. Appl. No. 15/269,728, dated Sep. 13, 2018, 18 pages.
Office Action received for Australian Patent Application No. 2017100586, dated Aug. 18, 2017, 5 pages.
Office Action received for Australian Patent Application No. 2017100586, dated Feb. 8, 2018, 3 pages.
Office Action received for Australian Patent Application No. 2017100586, dated Sep. 20, 2018, 7 pages.
Office Action received for Australian Patent Application No. 2017100636, dated Aug. 18, 2017, 4 pages.
Office Action received for Australian Patent Application No. 2017100636, dated Feb. 8, 2018, 3 pages.
Office Action received for Australian Patent Application No. 2017100636, dated Sep. 20, 2018, 7 pages.
Office Action received for Australian Patent Application No. 2018100403, dated Jul. 30, 2018, 7 pages.
Office Action received for Chinese Patent Application No. 201710386931.3, dated Aug. 8, 2018, 11 pages.
Office Action received for Danish Patent Application No. PA201670540, dated May 1, 2018, 6 pages.
Office Action received for Danish Patent Application No. PA201670540, dated Apr. 25, 2017, 4 pages.
Office Action received for Danish Patent Application No. PA201670540, dated Nov. 3, 2017, 4 pages.
Office Action received for Danish Patent Application No. PA201670562, dated May 2, 2018, 4 pages.
Office Action received for Danish Patent Application No. PA201670562, dated May 8, 2017, 5 pages.
Office Action received for Danish Patent Application No. PA201670562, dated Nov. 17, 2017, 5 pages.
Office Action received for Danish Patent Application No. PA201670563, dated May 2, 2018, 7 pages.
Office Action received for Danish Patent Application No. PA201670563, dated May 8, 2017, 4 pages.
Office Action received for Danish Patent Application No. PA201670563, dated Nov. 30, 2017, 5 pages.
Office Action received for Danish Patent Application No. PA201670564, dated Apr. 25, 2017, 2 pages.
Office Action received for Danish Patent Application No. PA201670564, dated Oct. 13, 2016, 6 pages.
OSXDaily, "Get a List of Siri Commands Directly from Siri", Available at <http://osxdaily.com/2013/02/05/list-siri-commands/>, Feb. 5, 2013, 15 pages.
Pan et al., "Natural Language Aided Visual Query Building for Complex Data Access", In proceeding of: Proceedings of the Twenty-Second Conference on Innovative Applications of Artificial Intelligence, XP055114607, Jul. 11, 2010, pp. 1821-1826.
Pathak et al., "Privacy-preserving Speech Processing: Cryptographic and String-matching Frameworks Show Promise", In: IEEE signal processing magazine, retrieved from <http://www.merl.com/publications/docs/TR2013-063.pdf>, Feb. 13, 2013, 16 pages.
Phoenix Solutions, Inc., "Declaration of Christopher Schmandt Regarding the MIT Galaxy System", West Interactive Corp., A Delaware Corporation, Document 40, Jul. 2, 2010, 162 pages.
Powell, Josh, "Now You See Me . . . Show/Hide Performance", available at http://www.learningjquery.com/2010/05/now-you-see-me-showhide-performance, May 4, 2010, 3 pages.
Reddi, "The Parser".
Sarawagi, Sunita, "CRF Package Page", available at <http://crf.sourceforge.net/>, retrieved on Apr. 6, 2011, 2 pages.
Search Report and Opinion received for Danish Patent Application No. PA201670540, dated Oct. 20, 2016, 7 pages.
Search Report and Opinion received for Danish Patent Application No. PA201670562, dated Oct. 12, 2016, 9 pages.
Search Report and Opinion received for Danish Patent Application No. PA201670563, dated Oct. 17, 2016, 6 pages.
Simonite, Tom, "One Easy Way to Make Siri Smarter", Technology Review, Oct. 18, 2011, 2 pages.
Speaker Recognition, "Wikipedia, The Free Enclyclopedia", Nov. 2, 2010, 4 pages.
SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, 2 pages.
Stent et al., "Geo-Centric Language Models for Local Business Voice Search", AT&T Labs—Research, 2009, pp. 389-396.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Sundaram et al., "Latent Perceptual Mapping with Data-Driven Variable-Length Acoustic Units for Template-Based Speech Recognition", ICASSP 2012, Mar. 2012, pp. 4125-4128.

(56) References Cited

OTHER PUBLICATIONS

TextnDrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.
Tofel, Kevin C., "SpeakToIt: A Personal Assistant for Older iPhones, iPads", Apple News, Tips and Reviews, Feb. 9, 2012, 7 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Vlingo InCar, "Distracted Driving Solution with Vlingo InCar", YouTube Video, Available online at <http://www.youtube.com/watch?v=Vgs8XfXxgz4>, Oct. 2010, 2 pages.
Vlingo, "Vlingo Launches Voice Enablement Application on Apple App Store", Press Release, Dec. 3, 2008, 2 pages.
VoiceAssist, "Send Text, Listen to and Send E-Mail by Voice", YouTube Video, Available online at <http://www.youtube.com/watch?v=0tEU61nHHA4>, Jul. 30, 2009, 1 page.
VoiceontheGo, "Voice on the Go (BlackBerry)", YouTube Video, available online at <http://www.youtube.com/watch?v=pJgpWgQS98w>, Jul. 27, 2009, 1 page.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 4 pages.
Wikipedia, "Speech Recognition", available at <http://en.wikipedia.org/wiki/Speech_recognition>, retrieved on Sep. 14, 2011, 12 pages.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 12 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
YouTube, "New bar search for Facebook", available at "https://www.youtube.com/watch?v=vwgN1WbvCas", 2 pages.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Zhong et al., "JustSpeak: Enabling Universal Voice Control on Android", W4A'14, Proceedings of the 11th Web for All Conference, No. 36, Apr. 7-9, 2014, 8 pages.
Notice of Allowance received for U.S. Appl. No. 15/269,728, dated Jan. 31, 2019, 11 pages.
Office Action received for Australian Patent Application No. 2017100636, dated Feb. 4, 2019, 4 pages.
Office Action received for Australian Patent Application No. 2016409888, dated Aug. 16, 2019, 3 pages.
Office Action received for Chinese Patent Application No, 201710395240.X, dated Jul. 24, 2019, 18 pages (10 pages of English Translation and 8 pages of Official Copy).
Office Action received for Australian Patent Application No. 2017100586, dated Oct. 1, 2019, 3 pages.
Office Action received for Australian Patent Application No. 2017100636, dated Oct. 1, 2019, 3 pages.
Office Action received for Australian Patent Application No. 2016409888, dated Dec. 13, 2019, 3 pages.
Office Action received for Chinese Patent Application No. 201710386931.3, dated Dec. 3, 2019, 14 pages. (7 pages of English Translation and 7 pages of Official Copy).
Office Action received for European Patent Application No. 16904828.7, dated Dec. 6, 2019, 7 pages.

\* cited by examiner

APPLICATION INTEGRATION WITH A DIGITAL ASSISTANT

CROSS-REFERENCE TO RELATED APPLICATIONS

This application is a continuation of U.S. application Ser. No. 15/269,728, "APPLICATION INTEGRATION WITH A DIGITAL ASSISTANT," filed on Sep. 19, 2016, which claims priority to U.S. Provisional Patent Application Ser. No. 62/348,929, "APPLICATION INTEGRATION WITH A DIGITAL ASSISTANT," filed on Jun. 11, 2016, which is hereby incorporated by reference in its entirety for all purposes.

FIELD

The present disclosure relates generally to interfacing with applications, and more specifically to techniques for application integration with a digital assistant.

BACKGROUND

Digital assistants can help a user perform various functions on a user device. For example, digital assistants can set alarms, provide weather updates, and perform searches both locally and on the Internet, all while providing a natural-language interface to a user. Existing digital assistants, however, cannot effectively integrate with applications, such as those locally stored on the user device, and in particular, third-party applications. Accordingly, existing digital assistants cannot provide a natural-language interface with such applications.

BRIEF SUMMARY

Example methods are disclosed herein. An example method includes, at an electronic device having one or more processors, receiving a natural-language user input, and identifying, with the one or more processors, an intent of a set of intents and a parameter associated with the intent, where the intent and the parameter are derived from the natural-language user input. The method further includes identifying a software application associated with the intent of the set of intents and providing the intent and the parameter to the software application.

An example method includes, at one or more electronic devices, each having one or more processors, receiving a natural-language user input; determining, based on the natural-language user input, an intent of a set of intents and a parameter associated with the intent; identifying a software application based on at least one of the intent or the parameter; and providing the intent and the parameter to the software application.

An example method includes, at one or more electronic devices, each having one or more processors, receiving a natural-language user input; identifying, based on the natural-language user input, an intent of a set of an intents and a parameter associated with the intent; and determining, based on at least one of the intent or the parameter, whether a task corresponding to the intent can be fulfilled. The method further includes, in accordance with a determination that the task corresponding to the intent can be fulfilled, providing the intent and the parameter to a software application associated with the intent, and, in accordance with a determination that the task corresponding to the intent cannot be fulfilled, providing a list of one or more software applications associated with the intent.

An example method includes, at a first electronic device having one or more processors, receiving a natural-language user input, where the natural-language user input is indicative of an intent of a set of intents; providing the natural-language user input to a second electronic device; and receiving, from the second electronic device, an indication that a software application associated with the intent is not located on the first electronic device. The method further includes, responsive to the notification, obtaining the list of applications associated with the intent; displaying, with a touch-sensitive display of the first electronic device, the list of applications associated with the intent in a user interface; receiving a user input indicative of a selection of an application of the list of applications; and providing the intent of the set of intents to the application.

Example non-transitory computer-readable media are disclosed herein. An example non-transitory computer-readable storage medium stores one or more programs. The one or more programs comprise instructions, which when executed by one or more processors of an electronic device, cause the electronic device to receive a natural-language user input; identify, with the one or more processors, an intent of a set of intents and a parameter associated with the intent, wherein the intent and the parameter are derived from the natural-language user input; identify a software application associated with the intent of the set of intents; and provide the intent and the parameter to the software application.

Example non-transitory computer-readable storage media store one or more programs. The one or more programs comprise instructions, which when executed by one or more processors of one or more electronic devices, cause the one or more electronic devices to receive a natural-language user input; determine, based on the natural-language user input, an intent of a set of intents and a parameter associated with the intent; identify a software application based on at least one of the intent or the parameter; and provide the intent and the parameter to the software application.

Example non-transitory computer-readable storage media store one or more programs. The one or more programs comprise instructions, which when executed by one or more processors of one or more electronic devices, cause the one or more electronic devices to receive a natural-language user input; identify, based on the natural-language user input, an intent of a set of an intents and a parameter associated with the intent; determine, based on at least one of the intent or the parameter, whether a task corresponding to the intent can be fulfilled; in accordance with a determination that the task corresponding to the intent can be fulfilled, provide the intent and the parameter to a software application associated with the intent; and in accordance with a determination that the task corresponding to the intent cannot be fulfilled, provide a list of one or more software applications associated with the intent.

An example non-transitory computer-readable storage medium stores one or more programs. The one or more programs comprise instructions, which when executed by one or more processors of an electronic device, cause the electronic device to receive a natural-language user input, wherein the natural-language user input is indicative of an intent of a set of intents; provide the natural-language user input to a second electronic device; receive, from the second electronic device, an indication that a software application associated with the intent is not located on the first electronic device; responsive to the notification, obtain the list of applications associated with the intent; display, with a touch-sensitive display of the first electronic device, the list of applications associated with the intent in a user interface; receive a user input indicative of a selection of an application of the list of applications; and provide the intent of the set of intents to the application.

Example electronic devices and systems are disclosed herein. An example electronic device comprises one or more processors; a memory; and one or more programs, where the one or more programs are stored in the memory and configured to be executed by the one or more processors, the one or more programs including instructions for receiving a natural-language user input; identifying, with the one or more processors, an intent of a set of intents and a parameter associated with the intent, wherein the intent and the parameter are derived from the natural-language user input; identifying a software application associated with the intent of the set of intents; and providing the intent and the parameter to the software application.

An example system includes one or more processors of one or more electronic devices; one or more memories of the one or more electronic devices; and one or more programs, where the one or more programs are stored in the one or more memories and configured to be executed by the one or more processors, the one or more programs including instructions for receiving a natural-language user input; determining, based on the natural-language user input, an intent of a set of intents and a parameter associated with the intent; identifying a software application based on at least one of the intent or the parameter; and providing the intent and the parameter to the software application.

An example system includes one or more processors of one or more electronic devices; one or more memories of the one or more electronic devices; and one or more programs, where the one or more programs are stored in the one or more memories and configured to be executed by the one or more processors, the one or more programs including instructions for receiving a natural-language user input; identifying, based on the natural-language user input, an intent of a set of an intents and a parameter associated with the intent determining, based on at least one of the intent or the parameter, whether a task corresponding to the intent can be fulfilled; in accordance with a determination that the task corresponding to the intent can be fulfilled, providing the intent and the parameter to a software application associated with the intent; and in accordance with a determination that the task corresponding to the intent cannot be fulfilled, providing a list of one or more software applications associated with the intent.

An example electronic device comprises one or more processors; a memory; and one or more programs, where the one or more programs are stored in the memory and configured to be executed by the one or more processors, the one or more programs including instructions for receiving a natural-language user input, wherein the natural-language user input is indicative of an intent of a set of intents; providing the natural-language user input to a second electronic device; receiving, from the second electronic device, an indication that a software application associated with the intent is not located on the first electronic device; responsive to the notification, obtaining the list of applications associated with the intent; displaying, with a touch-sensitive display of the first electronic device, the list of applications associated with the intent in a user interface; receiving a user input indicative of a selection of an application of the list of applications; and providing the intent of the set of intents to the application.

An example electronic device comprises means for receiving a natural-language user input; means for identifying an intent of a set of intents and a parameter associated with the intent, where the intent and the parameter are derived from the natural-language user input; means for identifying a software application associated with the intent of the set of intents; and means for providing the intent and the parameter to the software application.

An example system comprises means for receiving a natural-language user input; means for determining, based on the natural-language user input, an intent of a set of intents and a parameter associated with the intent; means for identifying a software application based on at least one of the intent or the parameter; and means for providing the intent and the parameter to the software application.

An example system comprises means for receiving a natural-language user input; means for identifying, based on the natural-language user input, an intent of a set of an intents and a parameter associated with the intent; means for determining, based on at least one of the intent or the parameter, whether a task corresponding to the intent can be fulfilled; means for, in accordance with a determination that the task corresponding to the intent can be fulfilled, providing the intent and the parameter to a software application associated with the intent; and means for, in accordance with a determination that the task corresponding to the intent cannot be fulfilled, providing a list of one or more software applications associated with the intent.

An example electronic device includes means for receiving a natural-language user input, wherein the natural-language user input is indicative of an intent of a set of intents; means for providing the natural-language user input to a second electronic device; means for receiving, from the second electronic device, an indication that a software application associated with the intent is not located on the first electronic device; means for, responsive to the notification, obtaining the list of applications associated with the intent; means for displaying, with a touch-sensitive display of the first electronic device, the list of applications associated with the intent in a user interface; means for receiving a user input indicative of a selection of an application of the list of applications; and means for providing the intent of the set of intents to the application.

BRIEF DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

In the following description of the disclosure and embodiments, reference is made to the accompanying drawings in which it is shown by way of illustration of specific embodiments that can be practiced. It is to be understood that other embodiments and examples can be practiced and changes can be made without departing from the scope of the disclosure.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input can both be outputs and, in some cases, can be separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

Figure 1:
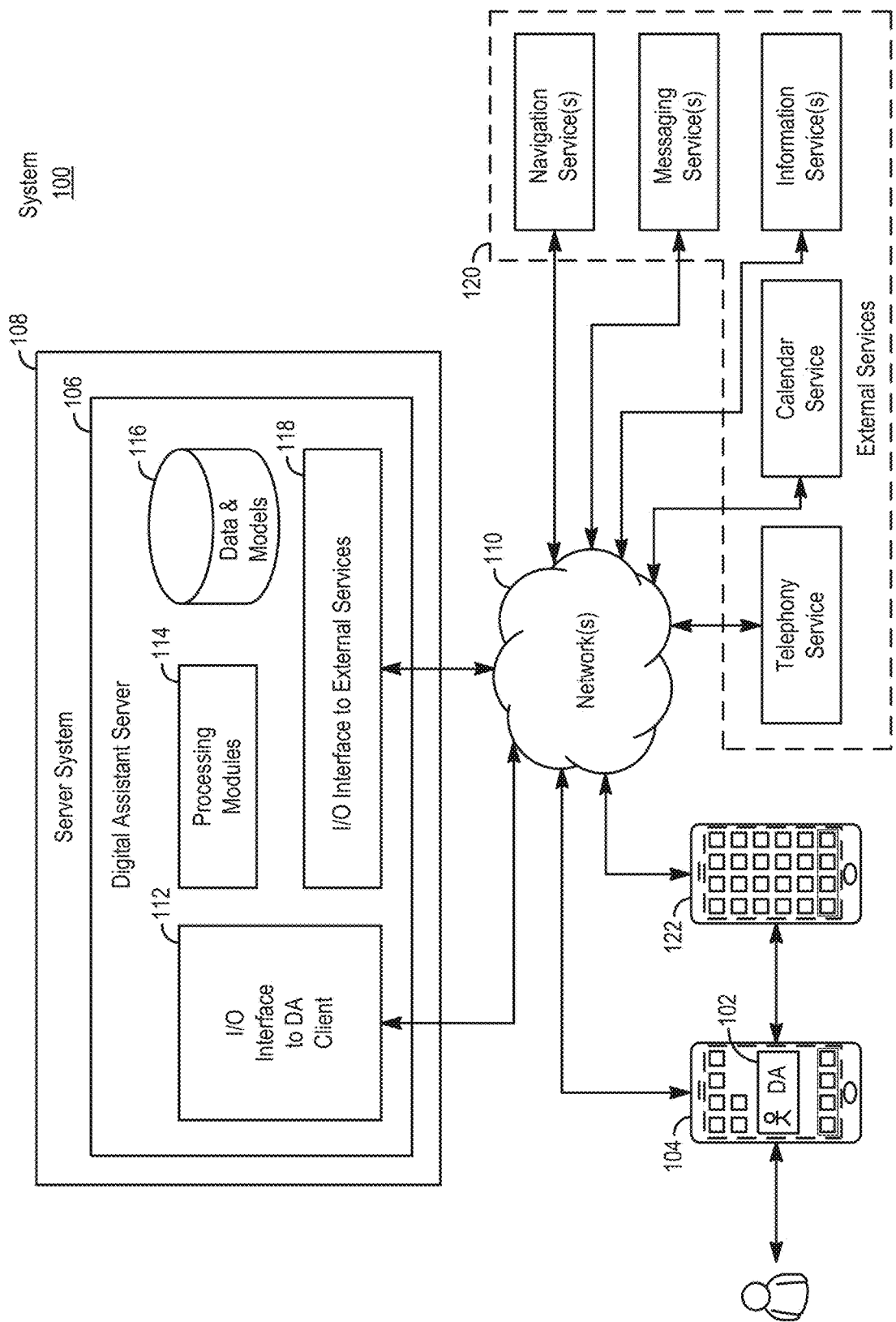
FIG. 1 is a block diagram illustrating a system and environment for implementing a digital assistant according to various examples.

FIG. 1 illustrates a block diagram of system 100 according to various examples. In some examples, system 100 can implement a digital assistant. The terms "digital assistant," "virtual assistant," "intelligent automated assistant," or "automatic digital assistant" can refer to any information processing system that interprets natural language input in spoken and/or textual form to infer user intent, and performs actions (e.g., tasks) based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant can be capable of accepting a user request at least partially in the form of a natural language command, request, statement, narrative, and/or inquiry. Typically, the user request can seek either an informational answer or performance of a task by the digital assistant. A satisfactory response to the user request can be a provision of the requested informational answer, a performance of the requested task, or a combination of the two. For example, a user can ask the digital assistant a question, such as "Where am I right now?" Based on the user's current location, the digital assistant can answer, "You are in Central Park near the west gate." The user can also request the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant can sometimes interact with the user in a continuous dialogue involving multiple exchanges of information over an extended period of time. There are numerous other ways of interacting with a digital assistant to request information or performance of various tasks. In addition to providing verbal responses and taking programmed actions, the digital assistant can also provide responses in other visual or audio forms, e.g., as text, alerts, music, videos, animations, etc.

As shown in FIG. 1, in some examples, a digital assistant can be implemented according to a client-server model. The digital assistant can include client-side portion 102 (hereafter "DA client 102") executed on user device 104 and server-side portion 106 (hereafter "DA server 106") executed on server system 108. DA client 102 can communicate with DA server 106 through one or more networks 110. DA client 102 can provide client-side functionalities such as user-facing input and output processing and communication with DA server 106. DA server 106 can provide server-side functionalities for any number of DA clients 102 each residing on a respective user device 104.

In some examples, DA server 106 can include client-facing I/O interface 112, one or more processing modules 114, data and models 116, and I/O interface to external services 118. The client-facing I/O interface 112 can facilitate the client-facing input and output processing for DA server 106. One or more processing modules 114 can utilize data and models 116 to process speech input and determine the user's intent based on natural language input. Further, one or more processing modules 114 perform task execution based on inferred user intent. In some examples, DA server 106 can communicate with external services 120 through network(s) 110 for task completion or information acquisition. I/O interface to external services 118 can facilitate such communications.

User device 104 can be any suitable electronic device. For example, user devices can be a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B.) A portable multifunctional device can be, for example, a mobile telephone that also contains other functions, such as PDA and/or music player functions. Specific examples of portable multifunction devices can include the iPhone®, iPod Touch®, and iPad® devices from Apple Inc. of Cupertino, Calif. Other examples of portable multifunction devices can include, without limitation, laptop or tablet computers. Further, in some examples, user device 104 can be a non-portable multifunctional device. In particular, user device 104 can be a desktop computer, a game console, a television, or a television set-top box. In some examples, user device 104 can include a touch-sensitive surface (e.g., touch screen displays and/or touchpads). Further, user device 104 can optionally include one or more other physical user-interface devices, such as a physical keyboard, a mouse, and/or a joystick. Various examples of electronic devices, such as multifunctional devices, are described below in greater detail.

Examples of communication network(s) 110 can include local area networks (LAN) and wide area networks (WAN), e.g., the Internet. Communication network(s) 110 can be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 can be implemented on one or more standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

In some examples, user device 104 can communicate with DA server 106 via second user device 122. Second user device 122 can be similar or identical to user device 104. For example, second user device 122 can be similar to devices 200, 400, or 600 described below with reference to FIGS. 2A, 4, and 6A-B. User device 104 can be configured to communicatively couple to second user device 122 via a direct communication connection, such as Bluetooth, NFC, BTLE, or the like, or via a wired or wireless network, such as a local Wi-Fi network. In some examples, second user device 122 can be configured to act as a proxy between user device 104 and DA server 106. For example, DA client 102 of user device 104 can be configured to transmit information (e.g., a user request received at user device 104) to DA server 106 via second user device 122. DA server 106 can process the information and return relevant data (e.g., data content responsive to the user request) to user device 104 via second user device 122.

In some examples, user device 104 can be configured to communicate abbreviated requests for data to second user device 122 to reduce the amount of information transmitted from user device 104. Second user device 122 can be configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100 can include any number and type of user devices configured in this proxy configuration to communicate with DA server system 106.

Although the digital assistant shown in FIG. 1 can include both a client-side portion (e.g., DA client 102) and a server-side portion (e.g., DA server 106), in some examples, the functions of a digital assistant can be implemented as a standalone application installed on a user device. In addition, the divisions of functionalities between the client and server portions of the digital assistant can vary in different implementations. For instance, in some examples, the DA client can be a thin-client that provides only user-facing input and output processing functions, and delegates all other functionalities of the digital assistant to a backend server.

2. Electronic Devices

Figure 2A:
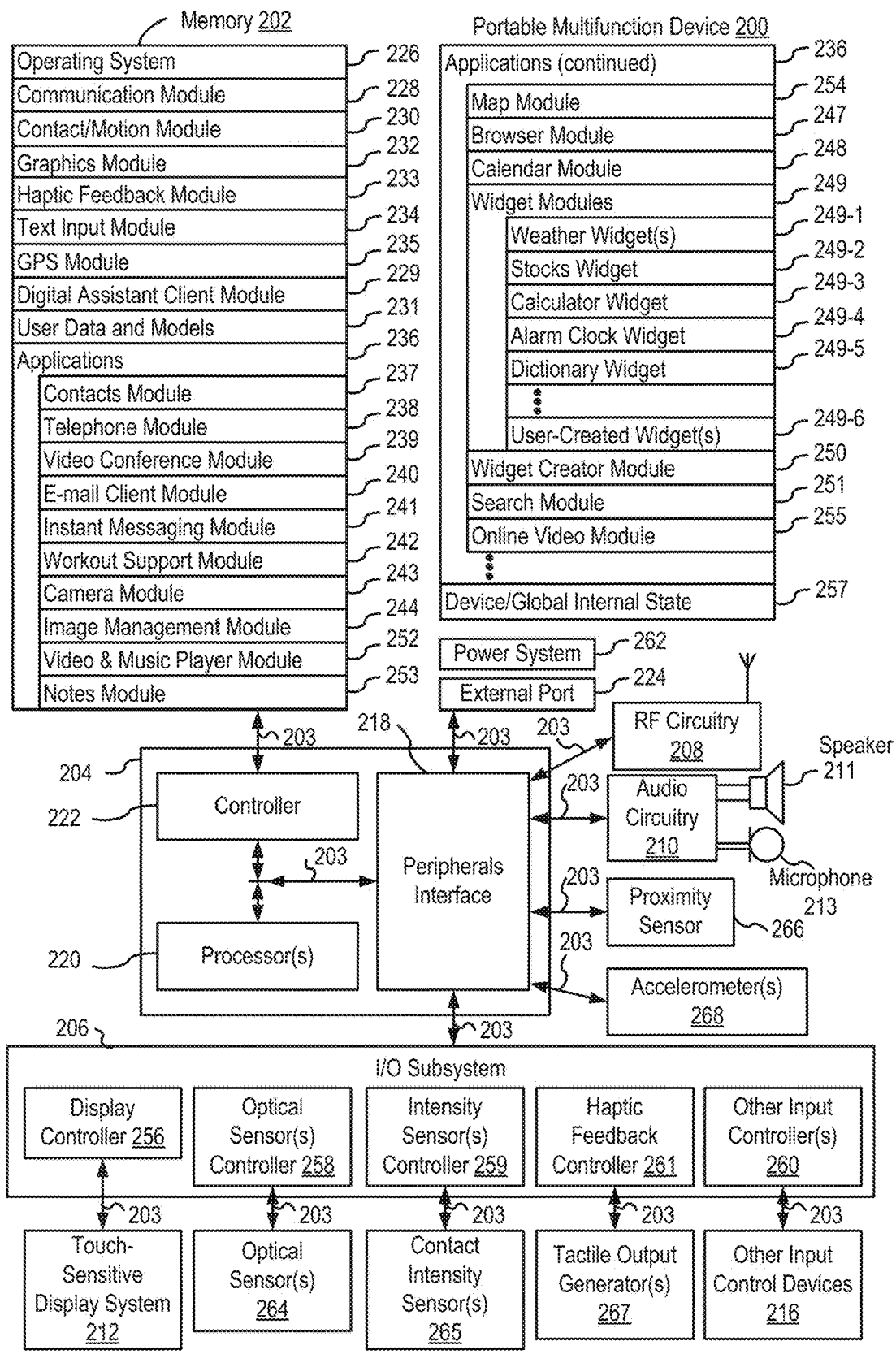
FIG. 2A is a block diagram illustrating a portable multifunction device implementing the client-side portion of a digital assistant in accordance with some embodiments.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 may include one or more computer-readable storage mediums. The computer-readable storage mediums may be tangible and non-transitory. Memory 202 may include high-speed random access memory and may also include non-volatile memory, such as one or more magnetic disk storage devices, flash memory devices, or other non-volatile solid-state memory devices. Memory controller 222 may control access to memory 202 by other components of device 200.

In some examples, a non-transitory computer-readable storage medium of memory 202 can be used to store instructions (e.g., for performing aspects of process 1100, described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of process 1100, described below) can be stored on a non-transitory computer-readable storage medium (not shown) of the server system 108 or can be divided between the non-transitory computer-readable storage medium of memory 202 and the non-transitory computer-readable storage medium of server system 108. In the context of this document, a "non-transitory computer-readable storage medium" can be any medium that can contain or store the program for use by or in connection with the instruction execution system, apparatus, or device.

Peripherals interface 218 can be used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 may be implemented on a single chip, such as chip 204. In some other embodiments, they may be implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11 ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data may be retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button may disengage a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) may turn power to device 200 on or off. The user may be able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output may include graphics, text, icons, video, and any combination thereof (collectively termed "graphics"). In some embodiments, some or all of the visual output may correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 may use LCD (liquid crystal display) technology, LPD (light emitting polymer display) technology, or LED (light emitting diode) technology, although other display technologies may be used in other embodiments. Touch screen 212 and display controller 256 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 may have a video resolution in excess of 100 dpi. In some embodiments, the touch screen has a video resolution of approximately 160 dpi. The user may make contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 212 or an extension of the touch-sensitive surface formed by the touch screen.

Device 200 also includes power system 262 for powering the various components. Power system 262 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 may also include one or more optical sensors 264. FIG. 2A shows an optical sensor coupled to optical sensor controller 258 in I/O subsystem 206. Optical sensor 264 may include charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 may capture still images or video. In some embodiments, an optical sensor is located on the back of device 200, opposite touch screen display 212 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 264 can be changed by the user (e.g., by rotating the lens and the sensor in the device housing) so that a single optical sensor 264 may be used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 may also include one or more proximity sensors 266. FIG. 2A shows proximity sensor 266 coupled to peripherals interface 218. Alternately, proximity sensor 266 may be coupled to input controller 260 in I/O subsystem 206. Proximity sensor 266 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 may also include one or more accelerometers 268. FIG. 2A shows accelerometer 268 coupled to peripherals interface 218. Alternately, accelerometer 268 may be coupled to an input controller 260 in I/O subsystem 206. Accelerometer 268 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
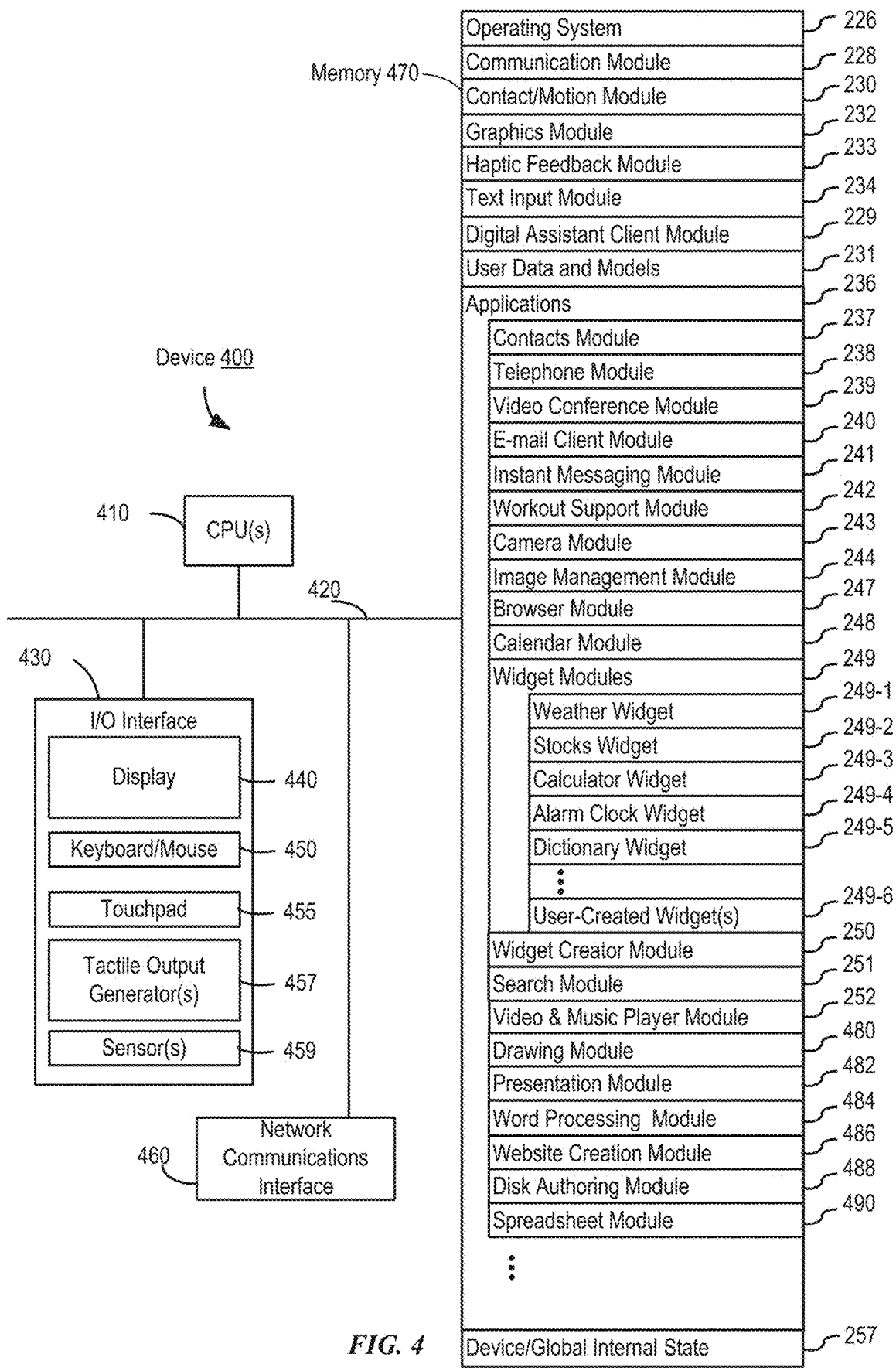
FIG. 4 is a block diagram of an exemplary multifunction device with a display and a touch-sensitive surface according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 can store data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216, and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which may be a component of graphics module 232, provides soft keyboards for entering text in various applications (e.g., contacts 237, e mail 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 can include various client-side digital assistant instructions to provide the client-side functionalities of the digital assistant. For example, digital assistant client module 229 can be capable of accepting voice input (e.g., speech input), text input, touch input, and/or gestural input through various user interfaces (e.g., microphone 213, accelerometer(s) 268, touch-sensitive display system 212, optical sensor(s) 229, other input control devices 216, etc.) of portable multifunction device 200. Digital assistant client module 229 can also be capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output can be provided as voice, sound, alerts, text messages, menus, graphics, videos, animations, vibrations, and/or combinations of two or more of the above. During operation, digital assistant client module 229 can communicate with DA server 106 using RF circuitry 208.

User data and models 231 can include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 can includes various models (e.g., speech recognition models, statistical language models, natural language processing models, ontology, task flow models, service models, etc.) for processing user input and determining user intent.

In some examples, digital assistant client module 229 can utilize the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 can provide the contextual information or a subset thereof with the user input to DA server 106 to help infer the user's intent. In some examples, the digital assistant can also use the contextual information to determine how to prepare and deliver outputs to the user. Contextual information can be referred to as context data.

In some examples, the contextual information that accompanies the user input can include sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 can be provided to DA server 106 as contextual information associated with a user input.

In some examples, the digital assistant client module 229 can selectively provide information (e.g., user data 231) stored on the portable multifunction device 200 in response to requests from DA server 106. In some examples, digital assistant client module 229 can also elicit additional input from the user via a natural language dialogue or other user interfaces upon request by DA server 106. Digital assistant client module 229 can pass the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 may include the following modules (or sets of instructions), or a subset or superset thereof:
- Contacts module 237 (sometimes called an address book or contact list);
- Telephone module 238;
- Video conference module 239;
- Email client module 240;
- Instant messaging (IM) module 241;
- Workout support module 242;
- Camera module 243 for still and/or video images;
- Image management module 244;
- Video player module;
- Music player module;
- Browser module 247;
- Calendar module 248;
- Widget modules 249, which may include one or more of: weather widget 249-1, stocks widget 249-2, calculator widget 249-3, alarm clock widget 249-4, dictionary widget 249-5, and other widgets obtained by the user, as well as user-created widgets 249-6;
- Widget creator module 250 for making user-created widgets 249-6;
- Search module 251;
- Video and music player module 252, which merges video player module and music player module;
- Notes module 253;
- Map module 254; and/or
- Online video module 255.

Examples of other applications 236 that may be stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 may be used to manage an address book or contact list (e.g., stored in application internal state 292 of contacts module 237 in memory 202 or memory 470), including: adding name(s) to the address book; deleting name(s) from the address book; associating telephone number(s), email address(es), physical address(es) or other information with a name; associating an image with a name; categorizing and sorting names; providing telephone numbers or email addresses to initiate and/or facilitate communications by telephone 238, video conference module 239, email 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 may be used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, email client module 240 includes executable instructions to create, send, receive, and manage email in response to user instructions. In conjunction with image management module 244, email client module 240 makes it very easy to create and send emails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, email client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that may be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 may be used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 may be used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, email client module 240, and browser module 247, online video module 255 includes instructions that allow the user to access, browse, receive (e.g., by streaming and/or download), play back (e.g., on the touch screen or on an external, connected display via external port 224), send an email with a link to a particular online video, and otherwise manage online videos in one or more file formats, such as H.264. In some embodiments, instant messaging module 241, rather than email client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 252, FIG. 2A). In some embodiments, memory 202 may store a subset of the modules and data structures identified above. Furthermore, memory 202 may store additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 may be reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
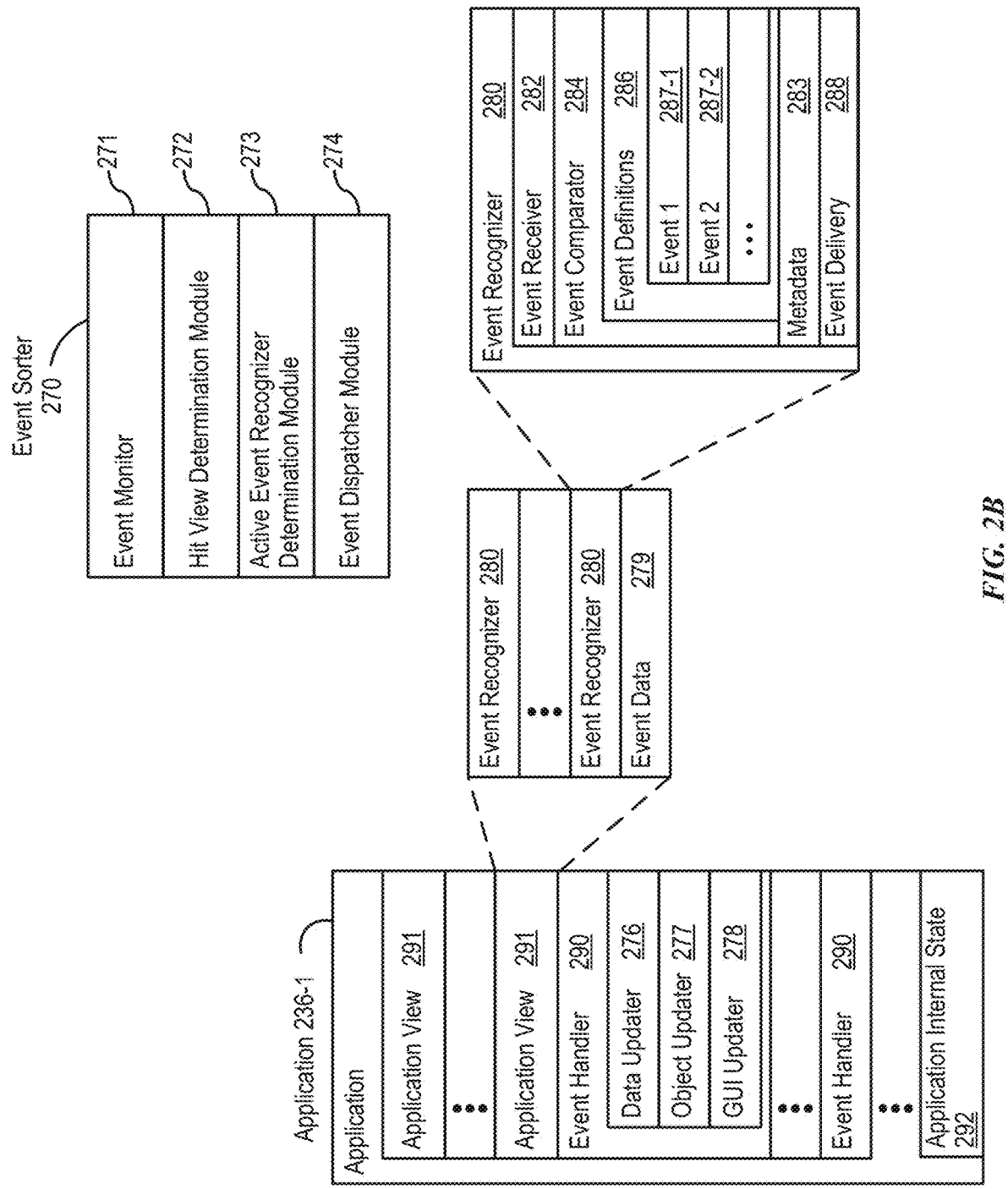
FIG. 2B is a block diagram illustrating exemplary components for event handling according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 may utilize or call data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which may include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers may interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
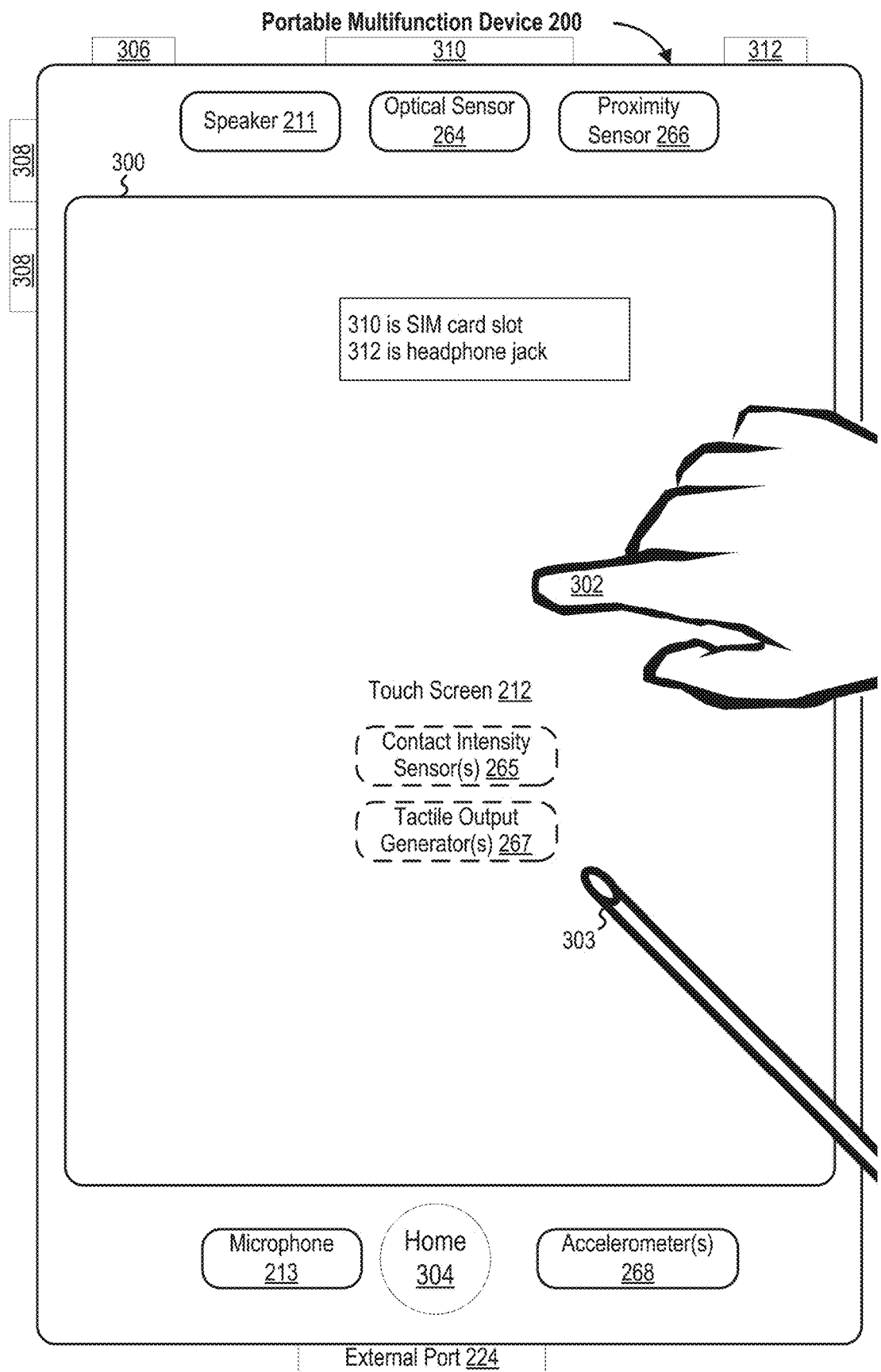
FIG. 3 illustrates a portable multifunction device implementing the client-side portion of a digital assistant according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 may also include one or more physical buttons, such as "home" or menu button 304. As described previously, menu button 304 may be used to navigate to any application 236 in a set of applications that may be executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 470 may store a subset of the modules and data structures identified above. Furthermore, memory 470 may store additional modules and data structures not described above.

Attention is now directed towards embodiments of user interfaces that may be implemented on, for example, portable multifunction device 200.

Figure 5A:
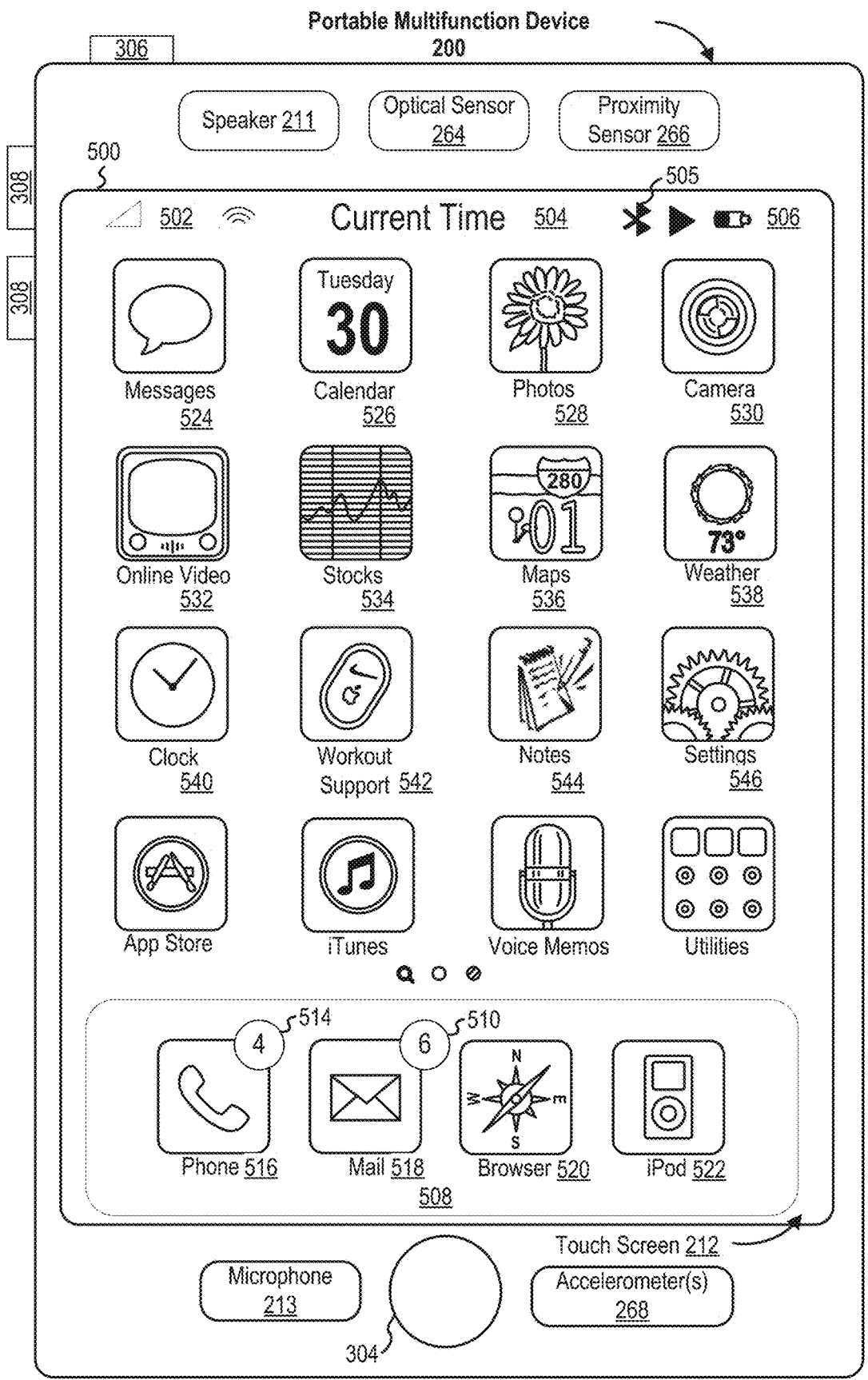
FIG. 5A illustrates an exemplary user interface for a menu of applications on a portable multifunction device according to various examples.

FIG. 5A illustrates an exemplary user interface for a menu of applications on portable multifunction device 200 in accordance with some embodiments. Similar user interfaces may be implemented on device 400. In some embodiments, user interface 500 includes the following elements, or a subset or superset thereof:

Signal strength indicator(s) 502 for wireless communication(s), such as cellular and Wi-Fi signals
Time 504;
Bluetooth indicator 505;
Battery status indicator 506;
Tray 508 with icons for frequently used applications, such as:
  Icon 516 for telephone module 238, labeled "Phone," which optionally includes an indicator 514 of the number of missed calls or voicemail messages;
  Icon 518 for email client module 240, labeled "Mail," which optionally includes an indicator 510 of the number of unread emails;
  Icon 520 for browser module 247, labeled "Browser;" and
  Icon 522 for video and music player module 252, also referred to as iPod (trademark of Apple Inc.) module 252, labeled "iPod;" and
Icons for other applications, such as:
  Icon 524 for IM module 241, labeled "Messages;"
  Icon 526 for calendar module 248, labeled "Calendar;"
  Icon 528 for image management module 244, labeled "Photos;"
  Icon 530 for camera module 243, labeled "Camera;"
  Icon 532 for online video module 255, labeled "Online Video;"
  Icon 534 for stocks widget 249-2, labeled "Stocks;"
  Icon 536 for map module 254, labeled "Maps;"
  Icon 538 for weather widget 249-1, labeled "Weather;"
  Icon 540 for alarm clock widget 249-4, labeled "Clock;"
  Icon 542 for workout support module 242, labeled "Workout Support;"
  Icon 544 for notes module 253, labeled "Notes;" and
  Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
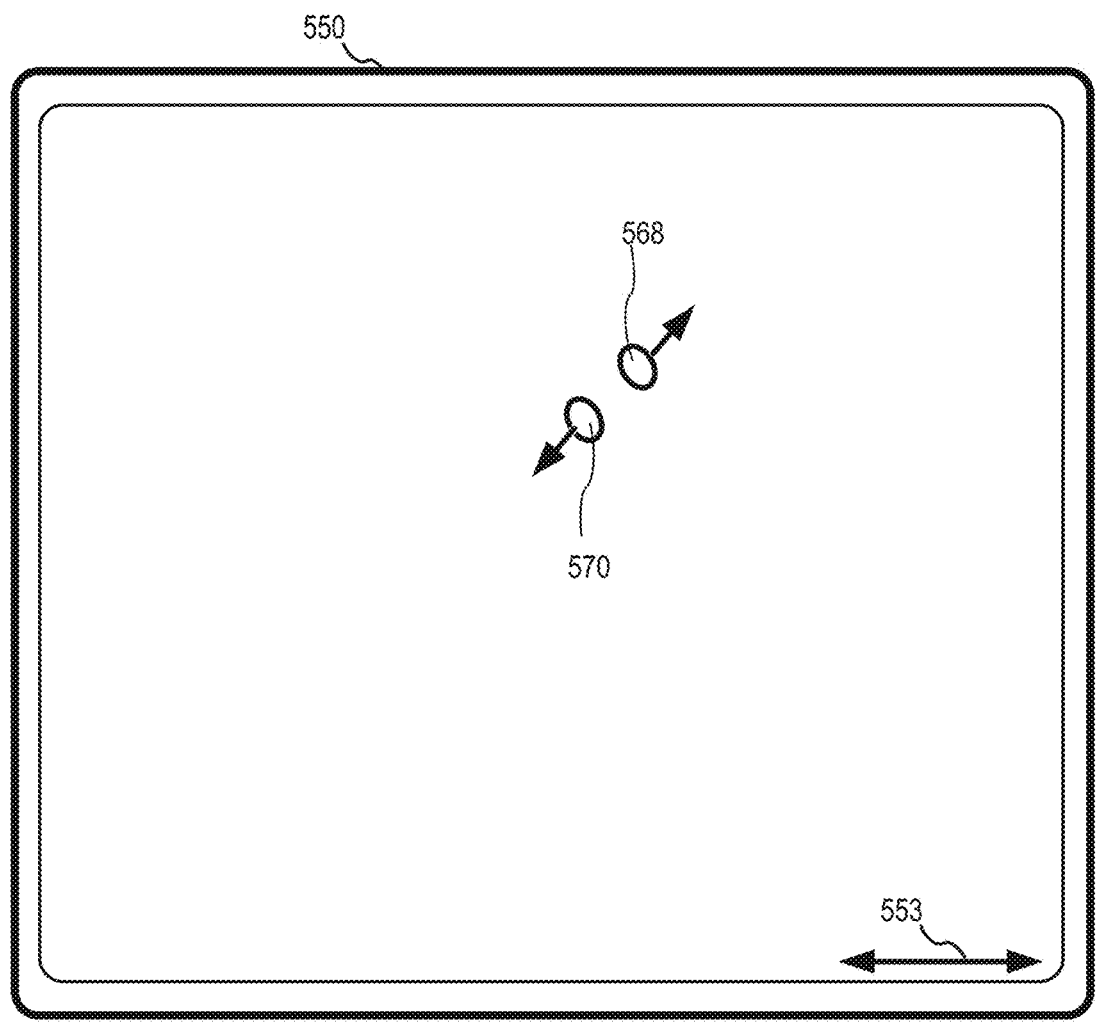
FIG. 5B illustrates an exemplary user interface for a multifunction device with a touch-sensitive surface that is separate from the display according to various examples.
Figure 5B:
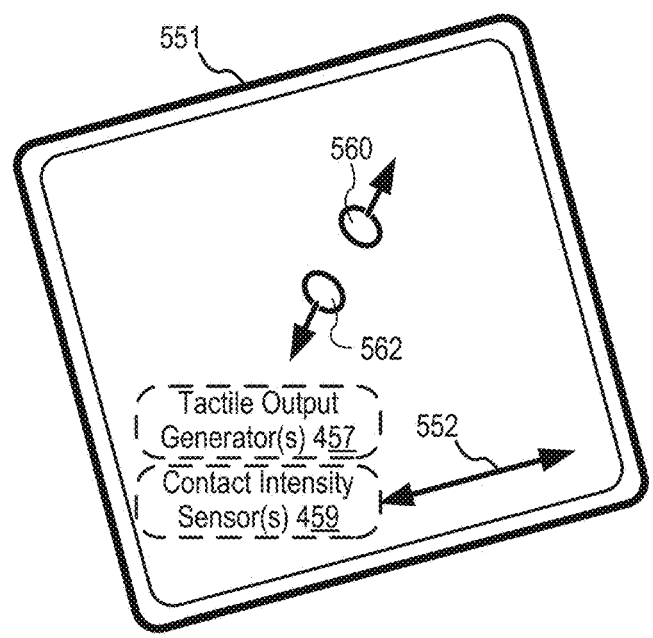

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
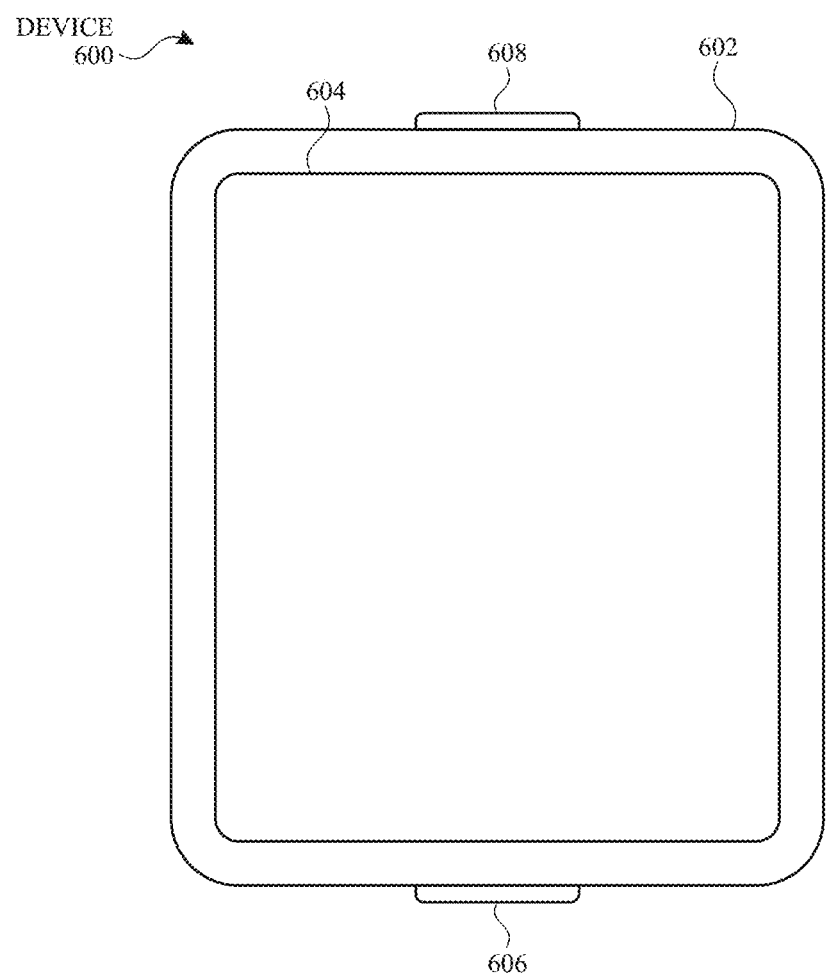
FIG. 6A illustrates a personal electronic device according to various examples.

FIG. 6A illustrates exemplary personal electronic device 600. Device 600 includes body 602. In some embodiments, device 600 can include some or all of the features described with respect to devices 200 and 400 (e.g., FIGS. 2A-4B). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) may have one or more intensity sensors for detecting intensity of contacts (e.g., touches) being applied. The one or more intensity sensors of touch screen 604 (or the touch-sensitive surface) can provide output data that represents the intensity of touches. The user interface of device 600 can respond to touches based on their intensity, meaning that touches of different intensities can invoke different user interface operations on device 600.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, can be physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms may permit device 600 to be worn by a user.

Figure 6B:
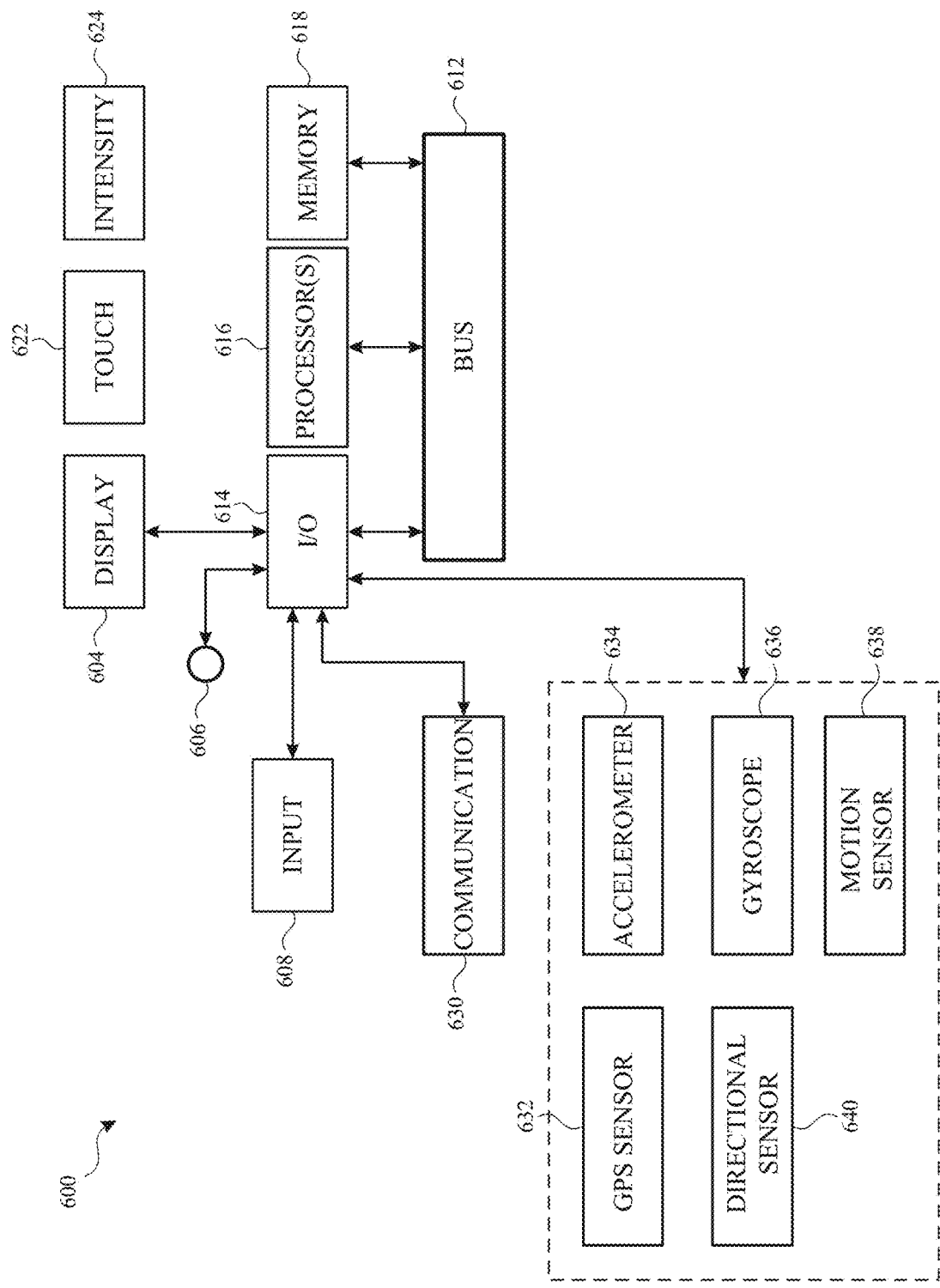
FIG. 6B is a block diagram illustrating a personal electronic device according to various examples.

FIG. 6B depicts exemplary personal electronic device 600. In some embodiments, device 600 can include some or all of the components described with respect to FIGS. 2A, 2B, and 4. Device 600 has bus 612 that operatively couples I/O section 614 with one or more computer processors 616 and memory 618. I/O section 614 can be connected to display 604, which can have touch-sensitive component 622 and, optionally, touch-intensity sensitive component 624. In addition, I/O section 614 can be connected with communication unit 630 for receiving application and operating system data, using Wi-Fi, Bluetooth, near field communication (NFC), cellular, and/or other wireless communication techniques. Device 600 can include input mechanisms 606 and/or 608. Input mechanism 606 may be a rotatable input device or a depressible and rotatable input device, for example. Input mechanism 608 may be a button, in some examples.

Input mechanism 608 may be a microphone, in some examples. Personal electronic device 600 can include various sensors, such as GPS sensor 632, accelerometer 634, directional sensor 640 (e.g., compass), gyroscope 636, motion sensor 638, and/or a combination thereof, all of which can be operatively connected to I/O section 614.

Figure 8:
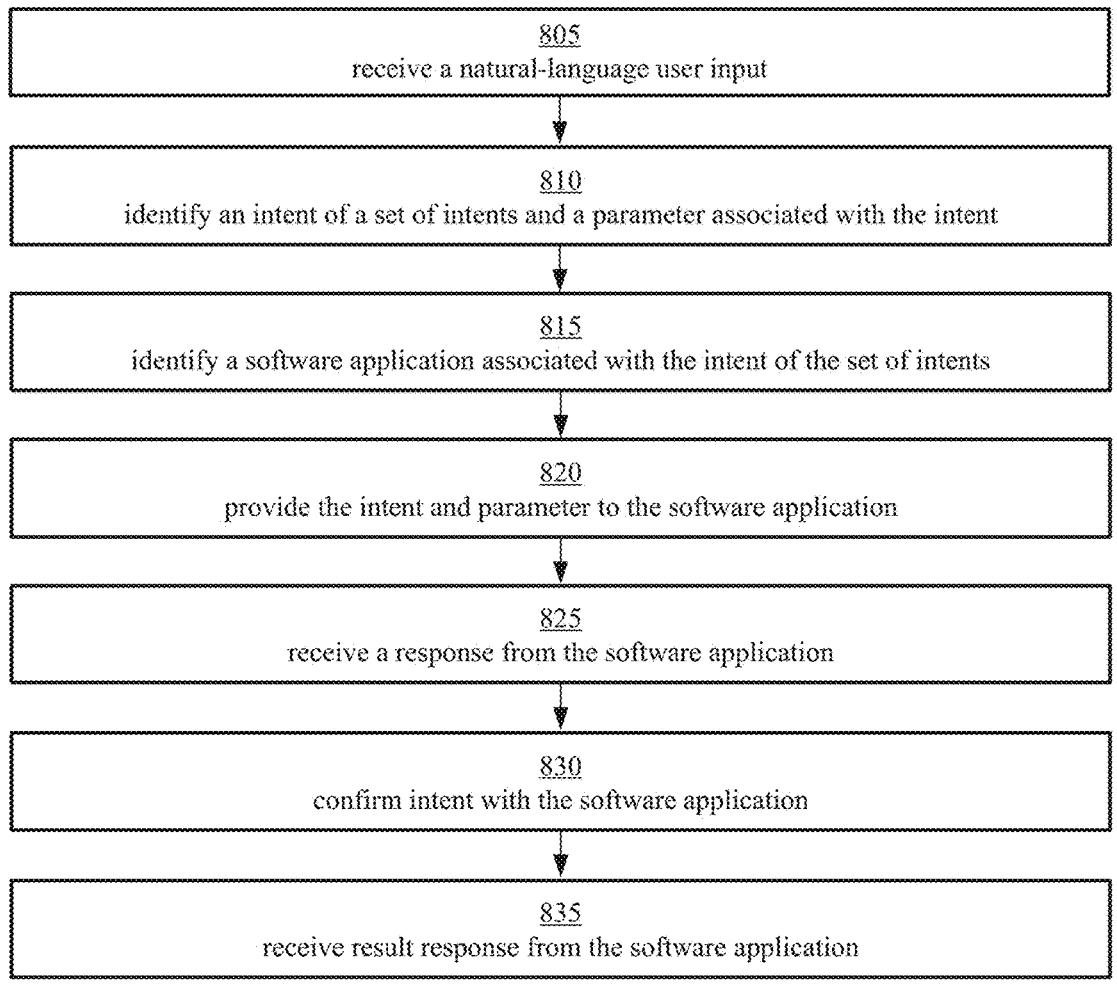
FIG. 8 illustrates a flow diagram of a process for operating a digital assistant in accordance with some embodiments.
Figure 9:
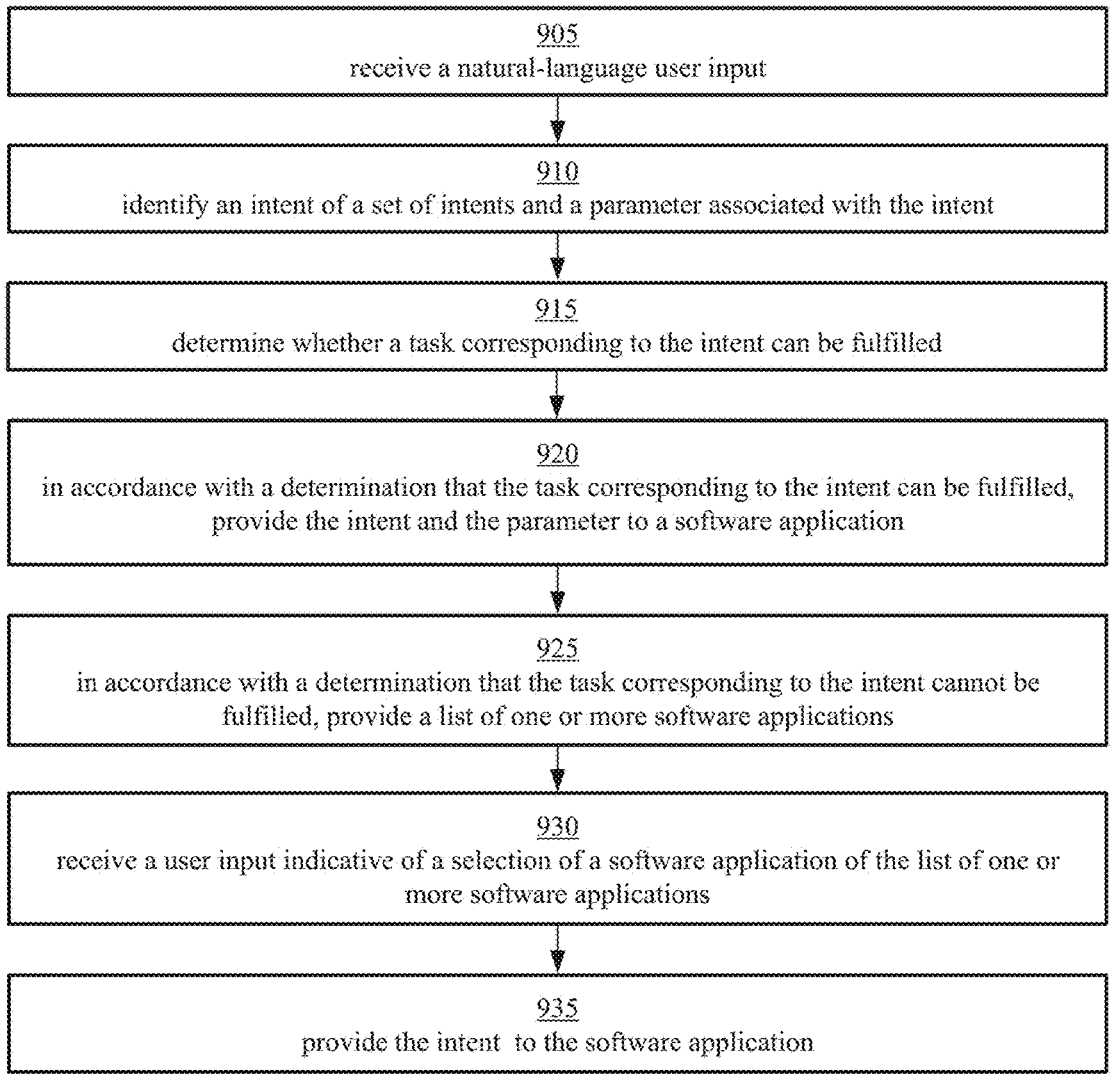
FIG. 9 illustrates a flow diagram of a process for operating a digital assistant in accordance with some embodiments.

Memory 618 of personal electronic device 600 can be a non-transitory computer-readable storage medium, for storing computer-executable instructions, which, when executed by one or more computer processors 616, for example, can cause the computer processors to perform the techniques described below, including processes 800-900 (FIGS. 8-9). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that may be displayed on the display screen of devices 200, 400, and/or 600 (FIGS. 2, 4, and 6). For example, an image (e.g., icon), a button, and text (e.g., link) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
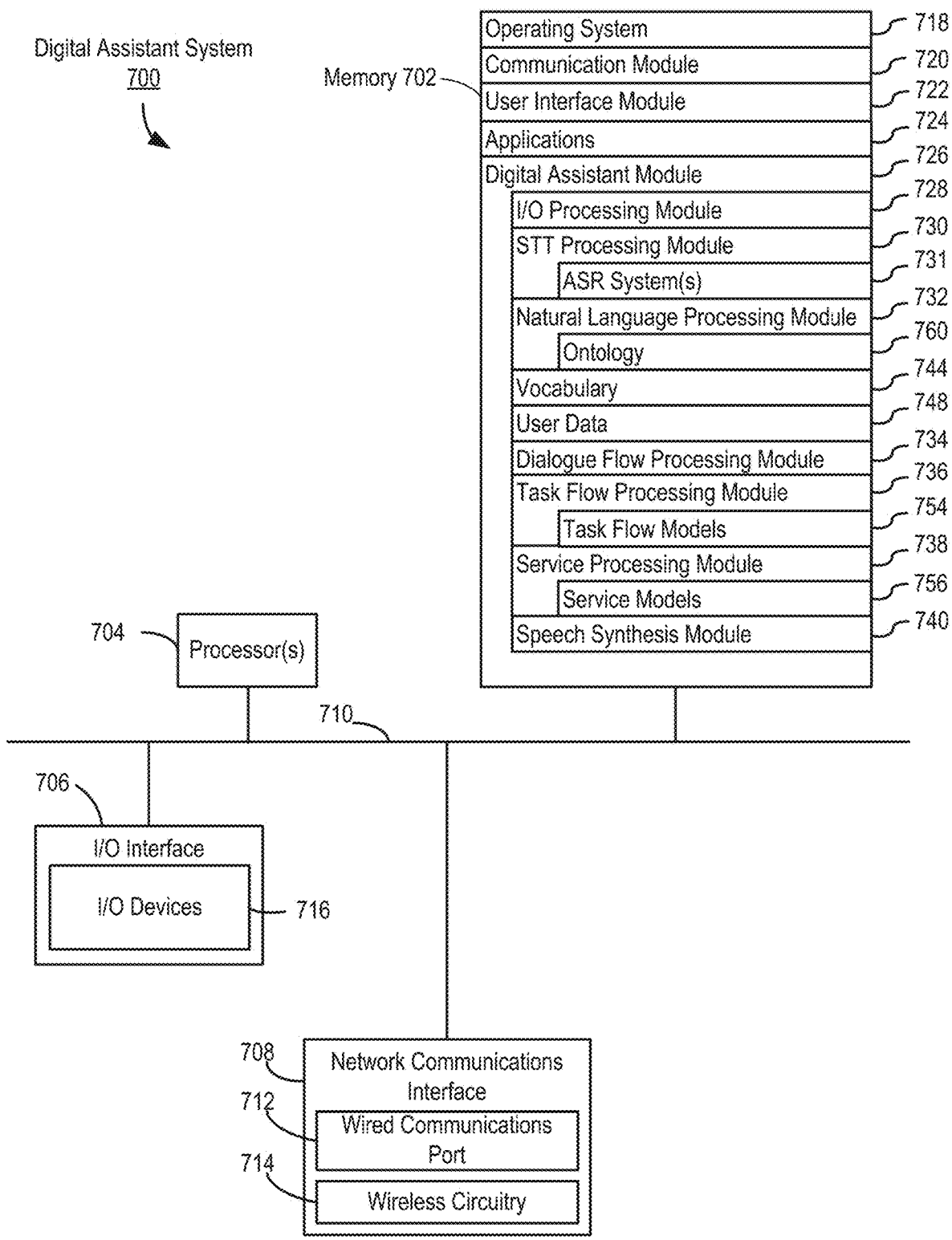
FIG. 7A is a block diagram illustrating a digital assistant system or a server portion thereof according to various examples.

FIG. 7A illustrates a block diagram of digital assistant system 700 in accordance with various examples. In some examples, digital assistant system 700 can be implemented on a standalone computer system. In some examples, digital assistant system 700 can be distributed across multiple computers. In some examples, some of the modules and functions of the digital assistant can be divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 can be an implementation of server system 108 (and/or DA server 106) shown in FIG. 1. It should be noted that digital assistant system 700 is only one example of a digital assistant system, and that digital assistant system 700 can have more or fewer components than shown, may combine two or more components, or may have a different configuration or arrangement of the components. The various components shown in FIG. 7A can be implemented in hardware, software instructions for execution by one or more processors, firmware, including one or more signal processing and/or application specific integrated circuits, or a combination thereof.

Digital assistant system 700 can include memory 702, one or more processors 704, input/output (I/O) interface 706, and network communications interface 708. These components can communicate with one another over one or more communication buses or signal lines 710.

In some examples, memory 702 can include a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 can couple input/output devices 716 of digital assistant system 700, such as displays, keyboards, touch screens, and microphones, to user interface module 722. I/O interface 706, in conjunction with user interface module 722, can receive user inputs (e.g., voice input, keyboard inputs, touch inputs, etc.) and processes them accordingly. In some examples, e.g., when the digital assistant is implemented on a standalone user device, digital assistant system 700 can include any of the components and I/O communication interfaces described with respect to devices 200, 400, or 600 in FIGS. 2A, 4, 6A-B, respectively. In some examples, digital assistant system 700 can represent the server portion of a digital assistant implementation, and can interact with the user through a client-side portion residing on a user device (e.g., devices 104, 200, 400, or 600).

In some examples, the network communications interface 708 can include wired communication port(s) 712 and/or wireless transmission and reception circuitry 714. The wired communication port(s) can receive and send communication signals via one or more wired interfaces, e.g., Ethernet, Universal Serial Bus (USB), FIREWIRE, etc. The wireless circuitry 714 can receive and send RF signals and/or optical signals from/to communications networks and other communications devices. The wireless communications can use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 can enable communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, can store programs, modules, instructions, and data structures including all or a subset of: operating system 718, communications module 720, user interface module 722, one or more applications 724, and digital assistant module 726. In particular, memory 702, or the computer-readable storage media of memory 702, can store instructions for performing processes 800, 900, described below. One or more processors 704 can execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) can include various software components and/or drivers for controlling and managing general system tasks (e.g., memory management, storage device control, power management, etc.) and facilitates communications between various hardware, firmware, and software components.

Communications module 720 can facilitate communications between digital assistant system 700 with other devices over network communications interface 708. For example, communications module 720 can communicate with RF circuitry 208 of electronic devices such as devices 200, 400, and 600 shown in FIG. 2A, 4, 6A-B, respectively. Communications module 720 can also include various components for handling data received by wireless circuitry 714 and/or wired communications port 712.

User interface module 722 can receive commands and/or inputs from a user via I/O interface 706 (e.g., from a keyboard, touch screen, pointing device, controller, and/or microphone), and generate user interface objects on a display. User interface module 722 can also prepare and deliver outputs (e.g., speech, sound, animation, text, icons, vibrations, haptic feedback, light, etc.) to the user via the I/O interface 706 (e.g., through displays, audio channels, speakers, touch-pads, etc.).

Applications 724 can include programs and/or modules that are configured to be executed by one or more processors 704. For example, if the digital assistant system is implemented on a standalone user device, applications 724 can include user applications, such as games, a calendar application, a navigation application, or an email application. If digital assistant system 700 is implemented on a server, applications 724 can include resource management applications, diagnostic applications, or scheduling applications, for example.

Memory 702 can also store digital assistant module 726 (or the server portion of a digital assistant). In some examples, digital assistant module 726 can include the following sub-modules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules can have access to one or more of the following systems or data and models of the digital assistant module 726, or a subset or superset thereof: ontology 760, vocabulary index 744, user data 748, task flow models 754, service models 756, and ASR systems.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
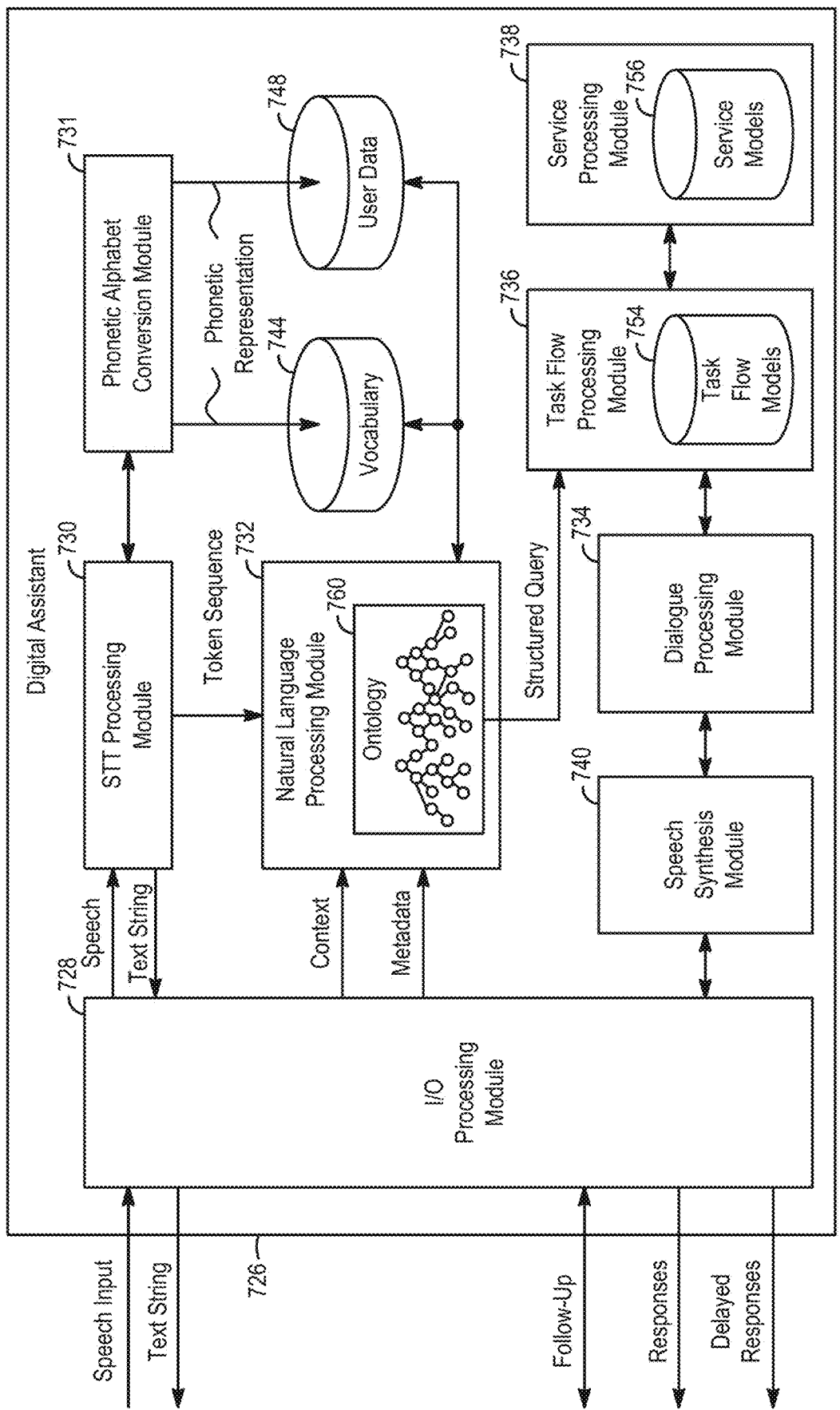
FIG. 7B illustrates the functions of the digital assistant shown in FIG. 7A according to various examples.

In some examples, as shown in FIG. 7B, I/O processing module 728 can interact with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 can optionally obtain contextual information associated with the user input from the user device, along with or shortly after the receipt of the user input. The contextual information can include user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 can also send follow-up questions to, and receive answers from, the user regarding the user request. When a user request is received by I/O processing module 728 and the user request can include speech input, I/O processing module 728 can forward the speech input to STT processing module 730 (or speech recognizer) for speech-to-text conversions.

STT processing module 730 can include one or more ASR systems. The one or more ASR systems can process the speech input that is received through I/O processing module 728 to produce a recognition result. Each ASR system can include a front-end speech pre-processor. The front-end speech pre-processor can extract representative features from the speech input. For example, the front-end speech pre-processor can perform a Fourier transform on the speech input to extract spectral features that characterize the speech input as a sequence of representative multi-dimensional vectors. Further, each ASR system can include one or more speech recognition models (e.g., acoustic models and/or language models) and can implement one or more speech recognition engines. Examples of speech recognition models can include Hidden Markov Models, Gaussian-Mixture Models, Deep Neural Network Models, n-gram language models, and other statistical models. Examples of speech recognition engines can include the dynamic time warping based engines and weighted finite-state transducers (WFST) based engines. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input can be processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result can be passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 can include and/or access a vocabulary of recognizable words via phonetic alphabet conversion module 731. Each vocabulary word can be associated with one or more candidate pronunciations of the word represented in a speech recognition phonetic alphabet. In particular, the vocabulary of recognizable words can include a word that is associated with a plurality of candidate pronunciations. For example, the vocabulary may include the word "tomato" that is associated with the candidate pronunciations of /tə'meiroʊ/ and /tə'matoʊ/. Further, vocabulary words can be associated with custom candidate pronunciations that are based on previous speech inputs from the user. Such custom candidate pronunciations can be stored in STT processing module 730 and can be associated with a particular user via the user's profile on the device. In some examples, the candidate pronunciations for words can be determined based on the spelling of the word and one or more linguistic and/or phonetic rules. In some examples, the candidate pronunciations can be manually generated, e.g., based on known canonical pronunciations.

In some examples, the candidate pronunciations can be ranked based on the commonness of the candidate pronunciation. For example, the candidate pronunciation /tə'meiroʊ/ can be ranked higher than /tə'matoʊ/, because the former is a more commonly used pronunciation (e.g., among all users, for users in a particular geographical region, or for any other appropriate subset of users). In some examples, candidate pronunciations can be ranked based on whether the candidate pronunciation is a custom candidate pronunciation associated with the user. For example, custom candidate pronunciations can be ranked higher than canonical candidate pronunciations. This can be useful for recognizing proper nouns having a unique pronunciation that deviates from canonical pronunciation. In some examples, candidate pronunciations can be associated with one or more speech characteristics, such as geographic origin, nationality, or ethnicity. For example, the candidate pronunciation /tə'meiroʊ/ can be associated with the United States, whereas the candidate pronunciation /tʊ'matoʊ/ can be associated with Great Britain. Further, the rank of the candidate pronunciation can be based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meiroʊ/ (associated with the United States)

can be ranked higher than the candidate pronunciation /təˈmatoʊ/ (associated with Great Britain). In some examples, one of the ranked candidate pronunciations can be selected as a predicted pronunciation (e.g., the most likely pronunciation).

When a speech input is received, STT processing module 730 can be used to determine the phonemes corresponding to the speech input (e.g., using an acoustic model), and then attempt to determine words that match the phonemes (e.g., using a language model). For example, if STT processing module 730 can first identify the sequence of phonemes /təˈmeiroʊ/ corresponding to a portion of the speech input, it can then determine, based on vocabulary index 744, that this sequence corresponds to the word "tomato."

In some examples, STT processing module 730 can use approximate matching techniques to determine words in an utterance. Thus, for example, the STT processing module 730 can determine that the sequence of phonemes /təˈmeiroʊ/ corresponds to the word "tomato," even if that particular sequence of phonemes is not one of the candidate sequence of phonemes for that word.

Natural language processing module 732 ("natural language processor") of the digital assistant can take the sequence of words or tokens ("token sequence") generated by STT processing module 730, and attempt to associate the token sequence with one or more "actionable intents" recognized by the digital assistant. An "actionable intent" can represent a task that can be performed by the digital assistant, and can have an associated task flow implemented in task flow models 754. The associated task flow can be a series of programmed actions and steps that the digital assistant takes in order to perform the task. The scope of a digital assistant's capabilities can be dependent on the number and variety of task flows that have been implemented and stored in task flow models 754, or in other words, on the number and variety of "actionable intents" that the digital assistant recognizes. The effectiveness of the digital assistant, however, can also be dependent on the assistant's ability to infer the correct "actionable intent(s)" from the user request expressed in natural language.

In some examples, in addition to the sequence of words or tokens obtained from STT processing module 730, natural language processing module 732 can also receive contextual information associated with the user request, e.g., from I/O processing module 728. The natural language processing module 732 can optionally use the contextual information to clarify, supplement, and/or further define the information contained in the token sequence received from STT processing module 730. The contextual information can include, for example, user preferences, hardware, and/or software states of the user device, sensor information collected before, during, or shortly after the user request, prior interactions (e.g., dialogue) between the digital assistant and the user, and the like. As described herein, contextual information can be dynamic, and can change with time, location, content of the dialogue, and other factors.

In some examples, the natural language processing can be based on, e.g., ontology 760. Ontology 760 can be a hierarchical structure containing many nodes, each node representing either an "actionable intent" or a "property" relevant to one or more of the "actionable intents" or other "properties." As noted above, an "actionable intent" can represent a task that the digital assistant is capable of performing, i.e., it is "actionable" or can be acted on. A "property" can represent a parameter associated with an actionable intent or a sub-aspect of another property. A linkage between an actionable intent node and a property node in ontology 760 can define how a parameter represented by the property node pertains to the task represented by the actionable intent node.

In some examples, ontology 760 can be made up of actionable intent nodes and property nodes. Within ontology 760, each actionable intent node can be linked to one or more property nodes either directly or through one or more intermediate property nodes. Similarly, each property node can be linked to one or more actionable intent nodes either directly or through one or more intermediate property nodes. For example, as shown in FIG. 7C, ontology 760 can include a "restaurant reservation" node (i.e., an actionable intent node). Property nodes "restaurant," "date/time" (for the reservation), and "party size" can each be directly linked to the actionable intent node (i.e., the "restaurant reservation" node).

Figure 7C:
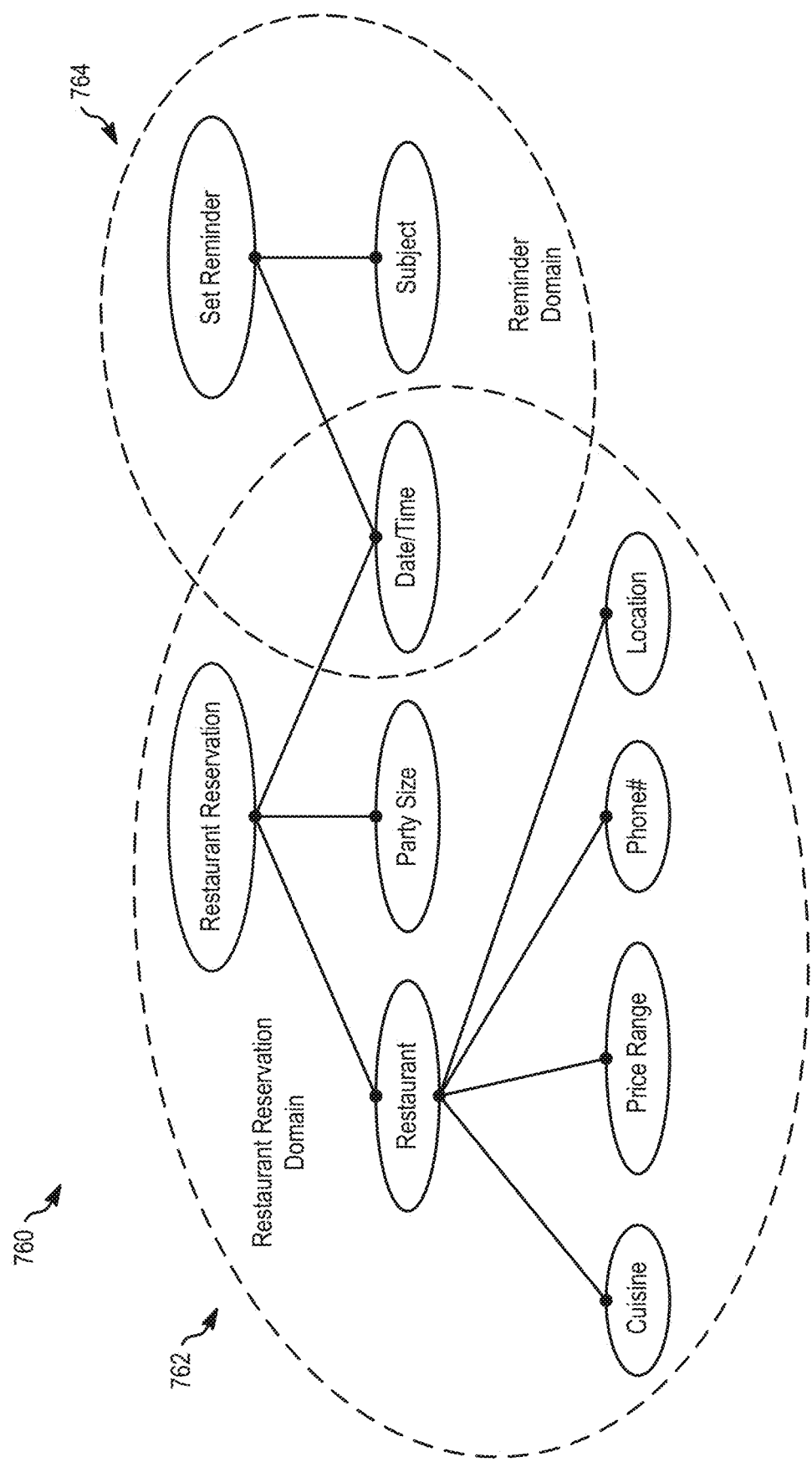
FIG. 7C illustrates a portion of an ontology according to various examples.

In addition, property nodes "cuisine," "price range," "phone number," and "location" can be sub-nodes of the property node "restaurant," and can each be linked to the "restaurant reservation" node (i.e., the actionable intent node) through the intermediate property node "restaurant." For another example, as shown in FIG. 7C, ontology 760 can also include a "set reminder" node (i.e., another actionable intent node). Property nodes "date/time" (for setting the reminder) and "subject" (for the reminder) can each be linked to the "set reminder" node. Since the property "date/time" can be relevant to both the task of making a restaurant reservation and the task of setting a reminder, the property node "date/time" can be linked to both the "restaurant reservation" node and the "set reminder" node in ontology 760.

An actionable intent node, along with its linked concept nodes, can be described as a "domain." In the present discussion, each domain can be associated with a respective actionable intent, and refers to the group of nodes (and the relationships there between) associated with the particular actionable intent. For example, ontology 760 shown in FIG. 7C can include an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 can include the actionable intent node "set reminder," and property nodes "subject" and "date/time." In some examples, ontology 760 can be made up of many domains. Each domain can share one or more property nodes with one or more other domains. For example, the "date/time" property node can be associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains can include, for example, "find a movie," "initiate a phone call," "find directions," "schedule a meeting," "send a message," and "provide an answer to a question," "read a list," "providing navigation instructions," "provide instructions for a task" and so on. A "send a message" domain can be associated with a "send a message" actionable intent node, and may further include property nodes such as "recipient(s)," "message type," and "message body." The property node "recipient" can be further defined, for example, by the sub-property nodes such as "recipient name" and "message address."

In some examples, ontology 760 can include all the domains (and hence actionable intents) that the digital assistant is capable of understanding and acting upon. In some examples, ontology 760 can be modified, such as by adding or removing entire domains or nodes, or by modifying relationships between the nodes within the ontology 760.

In some examples, nodes associated with multiple related actionable intents can be clustered under a "super domain" in ontology 760. For example, a "travel" super-domain can include a cluster of property nodes and actionable intent nodes related to travel. The actionable intent nodes related to travel can include "airline reservation," "hotel reservation," "car rental," "get directions," "find points of interest," and so on. The actionable intent nodes under the same super domain (e.g., the "travel" super domain) can have many property nodes in common. For example, the actionable intent nodes for "airline reservation," "hotel reservation," "car rental," "get directions," and "find points of interest" can share one or more of the property nodes "start location," "destination," "departure date/time," "arrival date/time," and "party size."

In some examples, each node in ontology 760 can be associated with a set of words and/or phrases that are relevant to the property or actionable intent represented by the node. The respective set of words and/or phrases associated with each node can be the so-called "vocabulary" associated with the node. The respective set of words and/or phrases associated with each node can be stored in vocabulary index 744 in association with the property or actionable intent represented by the node. For example, returning to FIG. 7B, the vocabulary associated with the node for the property of "restaurant" can include words such as "food," "drinks," "cuisine," "hungry," "eat," "pizza," "fast food," "meal," and so on. For another example, the vocabulary associated with the node for the actionable intent of "initiate a phone call" can include words and phrases such as "call," "phone," "dial," "ring," "call this number," "make a call to," and so on. The vocabulary index 744 can optionally include words and phrases in different languages.

Natural language processing module 732 can receive the token sequence (e.g., a text string) from STT processing module 730, and determine what nodes are implicated by the words in the token sequence. In some examples, if a word or phrase in the token sequence is found to be associated with one or more nodes in ontology 760 (via vocabulary index 744), the word or phrase can "trigger" or "activate" those nodes. Based on the quantity and/or relative importance of the activated nodes, natural language processing module 732 can select one of the actionable intents as the task that the user intended the digital assistant to perform. In some examples, the domain that has the most "triggered" nodes can be selected. In some examples, the domain having the highest confidence value (e.g., based on the relative importance of its various triggered nodes) can be selected. In some examples, the domain can be selected based on a combination of the number and the importance of the triggered nodes. In some examples, additional factors are considered in selecting the node as well, such as whether the digital assistant has previously correctly interpreted a similar request from a user.

User data 748 can include user-specific information, such as user-specific vocabulary, user preferences, user address, user's default and secondary languages, user's contact list, and other short-term or long-term information for each user. In some examples, natural language processing module 732 can use the user-specific information to supplement the information contained in the user input to further define the user intent. For example, for a user request "invite my friends to my birthday party," natural language processing module 732 can be able to access user data 748 to determine who the "friends" are and when and where the "birthday party" would be held, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 can generate a structured query to represent the identified actionable intent. In some examples, the structured query can include parameters for one or more nodes within the domain for the actionable intent, and at least some of the parameters are populated with the specific information and requirements specified in the user request. For example, the user may say "Make me a dinner reservation at a sushi place at 7." In this case, natural language processing module 732 can be able to correctly identify the actionable intent to be "restaurant reservation" based on the user input. According to the ontology, a structured query for a "restaurant reservation" domain may include parameters such as (Cuisine), (Time), (Date), (Party Size), and the like. In some examples, based on the speech input and the text derived from the speech input using STT processing module 730, natural language processing module 732 can generate a partial structured query for the restaurant reservation domain, where the partial structured query includes the parameters (Cuisine="Sushi") and (Time="7 pm"). However, in this example, the user's utterance contains insufficient information to complete the structured query associated with the domain. Therefore, other necessary parameters such as (Party Size) and (Date) may not be specified in the structured query based on the information currently available. In some examples, natural language processing module 732 can populate some parameters of the structured query with received contextual information. For example, in some examples, if the user requested a sushi restaurant "near me," natural language processing module 732 can populate a (location) parameter in the structured query with GPS coordinates from the user device.

In some examples, natural language processing module 732 can pass the generated structured query (including any completed parameters) to task flow processing module 736 ("task flow processor"). Task flow processing module 736 can be configured to receive the structured query from natural language processing module 732, complete the structured query, if necessary, and perform the actions required to "complete" the user's ultimate request. In some examples, the various procedures necessary to complete these tasks can be provided in task flow models 754. In some examples, task flow models 754 can include procedures for obtaining additional information from the user and task flows for performing actions associated with the actionable intent.

As described above, in order to complete a structured query, task flow processing module 736 may need to initiate additional dialogue with the user in order to obtain additional information, and/or disambiguate potentially ambiguous utterances. When such interactions are necessary, task flow processing module 736 can invoke dialogue flow processing module 734 to engage in a dialogue with the user. In some examples, dialogue flow processing module 734 can determine how (and/or when) to ask the user for the additional information and receives and processes the user responses. The questions can be provided to and answers can be received from the users through I/O processing module 728. In some examples, dialogue flow processing module 734 can present dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 can generate questions such as "For how many people?" and "On which day?" to pass to the user. Once answers are received from the user, dialogue flow processing module 734 can then populate the structured query with the missing information, or pass the information to task flow processing module 736 to complete the missing information from the structured query.

Once task flow processing module 736 has completed the structured query for an actionable intent, task flow processing module 736 can proceed to perform the ultimate task associated with the actionable intent. Accordingly, task flow processing module 736 can execute the steps and instructions in the task flow model according to the specific parameters contained in the structured query. For example, the task flow model for the actionable intent of "restaurant reservation" can include steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 can perform the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 can employ the assistance of service processing module 738 ("service processing module") to complete a task requested in the user input or to provide an informational answer requested in the user input. For example, service processing module 738 can act on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service can be specified by a respective service model among service models 756. Service processing module 738 can access the appropriate service model for a service and generate requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by task flow processing module 736, service processing module 738 can establish a network connection with the online reservation service using the web address stored in the service model, and send the necessary parameters of the reservation (e.g., time, date, party size) to the online reservation interface in a format according to the API of the online reservation service.

In some examples, natural language processing module 732, dialogue flow processing module 734, and task flow processing module 736 can be used collectively and iteratively to infer and define the user's intent, obtain information to further clarify and refine the user intent, and finally generate a response (i.e., an output to the user, or the completion of a task) to fulfill the user's intent. The generated response can be a dialogue response to the speech input that at least partially fulfills the user's intent. Further, in some examples, the generated response can be output as a speech output. In these examples, the generated response can be sent to speech synthesis module 740 (e.g., speech synthesizer) where it can be processed to synthesize the dialogue response in speech form. In yet other examples, the generated response can be data content relevant to satisfying a user request in the speech input.

Speech synthesis module 740 can be configured to synthesize speech outputs for presentation to the user. Speech synthesis module 740 synthesizes speech outputs based on text provided by the digital assistant. For example, the generated dialogue response can be in the form of a text string. Speech synthesis module 740 can convert the text string to an audible speech output. Speech synthesis module 740 can use any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 can be configured to synthesize individual words based on phonemic strings corresponding to the words. For example, a phonemic string can be associated with a word in the generated dialogue response. The phonemic string can be stored in metadata associated with the word. Speech synthesis model 740 can be configured to directly process the phonemic string in the metadata to synthesize the word in speech form.

In some examples, instead of (or in addition to) using speech synthesis module 740, speech synthesis can be performed on a remote device (e.g., the server system 108), and the synthesized speech can be sent to the user device for output to the user. For example, this can occur in some implementations where outputs for a digital assistant are generated at a server system. And because server systems generally have more processing power or resources than a user device, it can be possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Processes for Operating a Digital Assistant

FIG. 8 illustrates a flow diagram of a process 800 for operating a digital assistant in accordance with some embodiments. Process 800 is performed, for example, using one or more electronic devices (e.g., devices 104, 108, 200, 400, or 600) implementing a digital assistant. In some examples, the process 800 is performed using a client-server system (e.g., system 100), and the blocks of the process 800 can be divided up in any manner between the server (e.g., DA server 106) and a client device. Thus, while portions of the process 800 are described herein as being performed by particular devices of a client-server system, it will be appreciated that the process 800 is not so limited. In other examples, the process 800 is performed using only a client device (e.g., user device 104). In process 800, some blocks are, optionally, combined, the order of some blocks is, optionally, changed, and some blocks are, optionally, omitted. In some examples, additional steps may be performed in combination with the process 800.

At block 805, a natural-language user input is received by a user device, such as the user device 104 of FIG. 1. The natural-language input is, for example, a speech input or a text input. In some examples, the natural-language input may include a request for the user device, and/or another device, to perform a task. For instance, in the example "Send a car to 1200 Main Street," the natural-language input may include a request for a user device to reserve a car using a ride-booking service. In some examples, the natural-language input may further specify one or more parameters for the requested task. "1200 Main Street", for instance, specifies a pick-up location for the car reservation. In the example, "Order my usual from Domino's," the natural-language input may include a request for a user device to order food from the pizza chain Domino's. "my usual" may further specify, contextually, what food is to be ordered.

At block 810, an intent, and optionally, one or more parameters associated with the intent, are identified. The intent and parameters may be derived from the natural-language user input, for example. As described, intents may correspond to tasks requested by a user. Accordingly, identifying (e.g., determining) an intent may include identifying a task specified in the natural-language user input and/or inferring an intent corresponding to a requested task based on language and/or context of the natural-language user input. Intents may correspond to any type of tasks performed by a user device and, in particular, may correspond to tasks performed by one or more applications of a user device, as described in further detail below.

In some examples, intents are associated with (e.g., included in) one or more domains (e.g., intent categories, set of intents). Each domain may include a particular class of intents, allowing for intents to be intuitively grouped. For example, intents to reserve a car, cancel a car reservation, and/or any other intents directed to tasks commonly associated with ride-booking may be included in a ride-booking domain. In another example, intents to check-in to a flight, cancel a flight, reschedule a flight, retrieve flight information, and/or any other intents directed to tasks commonly associated with air travel may be included in an air travel domain. In another example, intents to provide directions, retrieve traffic information, and/or any other intents directed to tasks commonly associated with navigation may be included in a navigation domain. In yet another example, intents to send payments, receive payments, and/or any other intents directed to tasks commonly associated with financial transactions may be included in a financial transactions domain.

Identifying parameters may include identifying portions of the natural-language input that specify a manner in which a task corresponding to the intent is to be performed. Parameters may, for instance, specify locations (e.g., addresses or places of interest), times, dates, contacts, types, text (e.g., to be inserted into an email or message), quantities (e.g., distance, money) and, in some instances, names of software applications to perform the task. Parameters may further specify other conditions for tasks, examples of which are described herein.

Parameters may be identified, for instance, using one or more detectors. Each of the detectors may be configured to parse the natural-language user input (e.g., a textual representation of the natural-language user input) and identify one or more respective data types. By way of example, a first detector may be configured to identify user contacts and a second detector may be configured to identify addresses. Other detectors may identify data types including, but not limited to, phone numbers, names, persons of interest, places of interest, URLs, times, flight numbers, package tracking numbers, and dates.

In some examples, words of a custom vocabulary may be identified as parameters. For instance, one or more detectors may be configured to identify custom vocabulary of one or more applications, respectively. Custom vocabulary of an application may include a name of the application (e.g., Uber, Lyft, Instagram, Flickr, WeChat, WhatsApp, LINE, Viber) and/or may include other terms uniquely associated with the application (e.g., UberX, DM, Lyftline, ZipCar).

In some examples, one or more applications may register with an application registration service. The service may be hosted by or otherwise accessible to the server 108 and/or the user device 104. Registering in this manner may include specifying one or more custom vocabulary terms associated with the application and, optionally, one or more language models for the custom vocabulary terms. The language models may, for instance, provide one or more pronunciations for each of the custom vocabulary terms. Language models provided in this manner may thereafter be used to help identify use of such custom terms during analysis of natural-language user inputs. In some examples, custom vocabulary may be included in the vocabulary index 744 (FIG. 7B).

In some examples, one or more parameters may be inferred from the natural-language user input. In the example "Get me a ride to the stadium," for instance, it may be inferred that one parameter associated with the intent is a location of the user. In another example, "Pay John back for the meal," it may be inferred that one parameter associated with the intent is an amount of money.

In some examples, an intent is identified based on the natural-language user input, and parameters associated with the intent are thereafter identified. Further, in some examples, parameters not associated with the intent are not identified. By way of example, an intent corresponding to directions (e.g., driving directions) may be associated with parameters specifying one or more locations (e.g., an origin and/or a destination), and/or a mode of transit. Consider, for instance, the example "Get me real-time driving directions to 1200 Main Street." In this instance, the identified intent corresponds to a task for providing directions, "driving" is a parameter specifying a mode of transit, and "1200 Main Street" is a parameter specifying a location. The portion of the user input "real-time" is not a parameter associated with the identified intent. Accordingly, while "real-time" may be a valid parameter for some intents, "real-time" will not be identified as a parameter during operation.

In other examples, one or more parameters first may be identified and the intent may be identified based on the identified one or more parameters. In yet other examples, the intent and parameters associated with the intent may be identified concurrently.

In some examples, intents and parameters of a natural-language user input are identified by the user device, such as the user device 104 of FIG. 1. In other examples, the user device provides the natural-language user input (or a representation thereof) to a server, such as the server 108 of FIG. 1, and the server identifies (e.g., determines) intents and parameters of the natural-language user input, as described. Thereafter the server provides (e.g., transmits) the identified intents and parameters to the user device.

Optionally, once an intent and any parameters have been identified, the user device confirms identified intents and/or parameters with a user of the user device, and in some instances, confirms inferred parameters with the user of the user device. Confirming in this manner may include prompting a user to confirm the identified intent and all identified parameters associated with the intent in response to a natural-language query. By way of example, in response to the user input "Get me a ride to the airport," the user device may provide a natural-language query "Do you want a ride to the airport from your current location?" The natural-language query provided by the user device may be provided to a user as text, using a touch-sensitive display of the user device, and/or may be provided to a user as speech using an audio output component of the user device (e.g., speaker 211 of FIG. 2). The user may respond to the natural-language query, for instance, by providing a natural-language user input to the user device.

Optionally, the user device confirms individual parameters. In some examples, this may include prompting a user to confirm one or more parameters. By way of example, in response to the user input "Get me a ride to the station," the user device may provide a natural language query "Do you mean Penn Station?" As another example, in response to the user input "Pay John $5.00," the user device may provide a natural language query "Do you mean John Smith?" Natural-language queries provided by the user device may be provided to a user as text, using a touch-sensitive display of the user device and/or may be provided to a user as speech using an audio output component of the user device (e.g., speaker 211 of FIG. 2). The user may respond to the natural-language query, for instance, by providing a natural-language user input to the user device.

In some examples, one or more parameters are contextual. Accordingly, the user device may determine (e.g., resolve) one or more parameters based on context information. Context information may be context information of the user device (or any data stored therein) and/or context information of a user of the user device. By way of example, a natural-language user input may recite "Get me a car at my house." Because "my house" is a contextual parameter and does not specify an actual location, the user device may determine a location of the user device and identify the determined location as a parameter (i.e., in lieu of "my house"). As another example, a natural-language user input may recite "Call him back." Because "him" is a contextual parameter and does not specify a specific contact, the user device may determine a contact intended by "him" and pass the contact as a parameter (i.e., in lieu of "him").

In some examples, identified intents and parameters are implemented as an intent object. When implemented as such, each intent object is an object (e.g., data structure, programming object) and corresponds to a respective intent. Each intent object may include one or more fields (e.g., instance variables) corresponding to one or more parameters, respectively. For example, an intent object corresponding to a ride-booking intent may be generated (e.g., instantiated) like the following pseudocode:

```
public final class RideBookingIntent {
public final static String INTENT_TYPE = "RideBookingIntent";
public final parameter<Location> pickupLocation;
public final parameter<Location> dropOffLocation;
public final parameter<dataString> vehicleType;
public final parameter<Integer> partySize;
public final parameter<dateTime> pickupTime;
```

-continued

```
private RideBookingIntent(Location p, Location d, dataString v, Integer p,
dateTime pt) {
    pickupLocation = p;
    dropOffLocation = d;
    vehicleType = v ;
    partySize = p;
    pickupTime = pt; } }
```

As will be appreciated by one of ordinary skill, the pseudocode above is exemplary, and an intent object may be implemented in other manners.

By implementing an intent as an intent object, intents may be language agnostic. As described, intents may be derived from natural-language user inputs. A same intent, therefore, may be derived from natural-language inputs provided in any number of spoken languages. By way of example, the English natural-language user input "Send an Uber to 1200 Park Avenue" and the German natural-language user input "Senden Sie eine Uber auf 1200 Park Avenue" would each result in a same intent being identified (and result in a same intent object).

At block 815, a software application associated with the intent may be identified (e.g., selected). Generally, this may include identifying one or more software applications configured to perform a task corresponding to the intent.

In some examples, identifying software applications may include determining one or more domains corresponding to an intent and identifying applications corresponding to the domain(s). As described, one or more software applications may be registered with an application registration service. Registering in this manner may include specifying which domains (e.g., ride-booking domain, air travel domain, navigation domain) correspond to the software application. An application corresponding to a domain may support each of the intents specified by the domain or may support only some intents specified by the domain. In some examples, applications may be registered with individual intents, and identifying applications may include identifying applications corresponding to the identified intent.

In some examples, applications are identified according to the identified parameters. By way of example, based on a user input "Get me a black car to the airport," an intent to reserve a car using a ride-booking service and a parameter specifying a type of car (i.e. "black car") may be identified. Although several available applications may be configured to reserve a car generally, only those applications configured to reserve a "black car" may be identified. As another example, based on a user input "Send a message to Sam saying 'Hello!'" Although several applications may be configured to send a message, only those applications having contact information for a contact Sam may be identified.

In some examples, only applications installed on and/or accessible to the user device are identified. For instance, although several available applications may be configured to perform a task, only those accessible to the user device are identified. Accessible applications include applications residing and/or installed on the user device and further include applications that may be remotely accessed by the user device, for instance on one or more other devices.

Thus, in at least some embodiments, identified applications are applications configured to perform a task according to identified parameters and accessible to the user device. In some examples, multiple applications may satisfy these criteria, yet the user device may wish to identify fewer applications, or a single application. Accordingly, applications may further be identified based on previous use of the applications by the user device. In some examples, for a given intent, an application most recently used to perform a task corresponding to the intent is identified. Consider the user input "Place a call to Rob" in which an intent (i.e., place a call) and a parameter (i.e. "Rob") may be identified. In this example, the application last used to place a call is identified. In other examples, an application most commonly used to perform tasks corresponding to intent is identified. For the same example, an application most commonly used to place calls is identified. In some examples, applications are further selected in accordance with one or more parameters. For instance, an application recently used to place a call to the contact Rob is identified, or an application most commonly used to place a call to the contact Rob is identified. In some examples, a default application may be specified for one or more particular tasks and/or parameters, for instance, by a user or a digital assistant. A user may specify, for instance, that a first application is to be used when calling a first contact and a second application is to be used when calling a second contact.

As described, in some instances, a natural-language user input may include custom vocabulary that may be identified as one or more parameters. In some examples, such custom vocabulary includes application names, and accordingly an application may be identified based on presence of custom vocabulary in the input. A natural-language user input may, for instance, recite "Call Rob using Skype." In response, the software application Skype may be the identified software application. In another example, a natural-language input may recite "Play The Beatles on Spotify," and in response, the software application Spotify may be the identified software application.

Custom vocabulary may further include terms uniquely associated with an application. Accordingly, such terms may be identified as parameters and used to identify an application. In the example "Get me an UberX," "UberX" is a term of a custom vocabulary for the software application Uber and as a result Uber is identified as the software application. In the example "Tweet I hope the Sharks win the cup," "Tweet" is a term of a custom vocabulary for the software application Twitter, and as a result Twitter is identified as the software application.

In some examples, no application configured to perform the task according to the identified parameters may be accessible to the user device. As a result, the user device may access (e.g., download and/or install) an application configured to perform the task according to the identified parameters. In some examples, the user device may identify a plurality of software applications and provide the user with a list of software applications. The user may select one or more of the applications, and the user device may access the one or more selected applications.

At block 820, the intent and parameters are provided to the identified software application. In some examples, the intent and parameters are provided to the software application as an intent object.

In some examples, the intent and parameters may be selectively provided to the software application based on a state of the user device. As an example, intents and parameters may be selectively provided to the user device based on whether the user device is in a lock state. In some examples, an application may be allowed to receive particular intents and parameters when the device is in a lock state. In other examples, an application may be allowed to receive particular intents and parameters when the user device is not in a lock state. Whether an application can receive a particular intent given a particular state of the user device may be specified by the software application, for instance during a registration process with an application registration service.

At block 825, the user device may receive one or more responses from the software application. In some examples, the user device receives a response for each parameter provided to the software application. Each of the responses may indicate, for instance, whether a parameter is valid or whether additional user input is required. If a response indicates that a parameter is valid, no further action is taken with respect to the parameter.

Figure 10C:
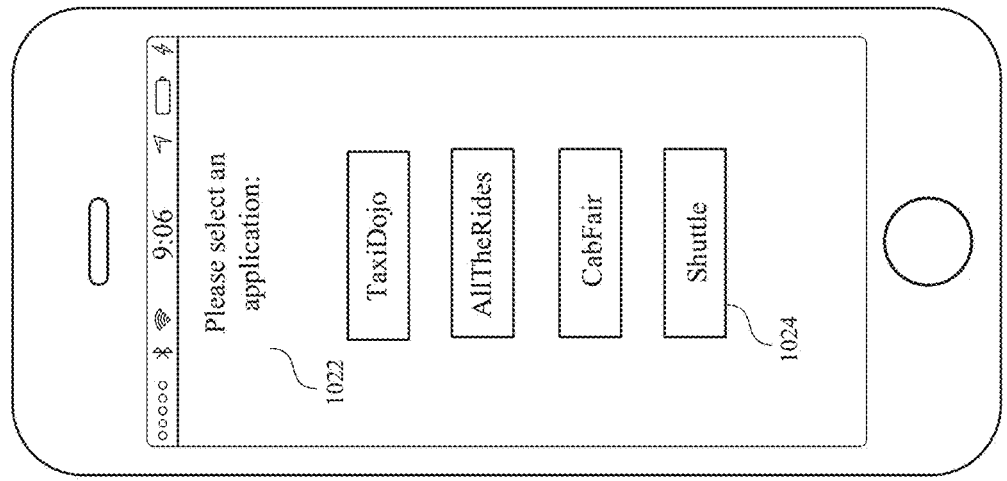
FIGS. 10A-C illustrate exemplary user interfaces of an electronic device in accordance with some embodiments.
Figure 10B:
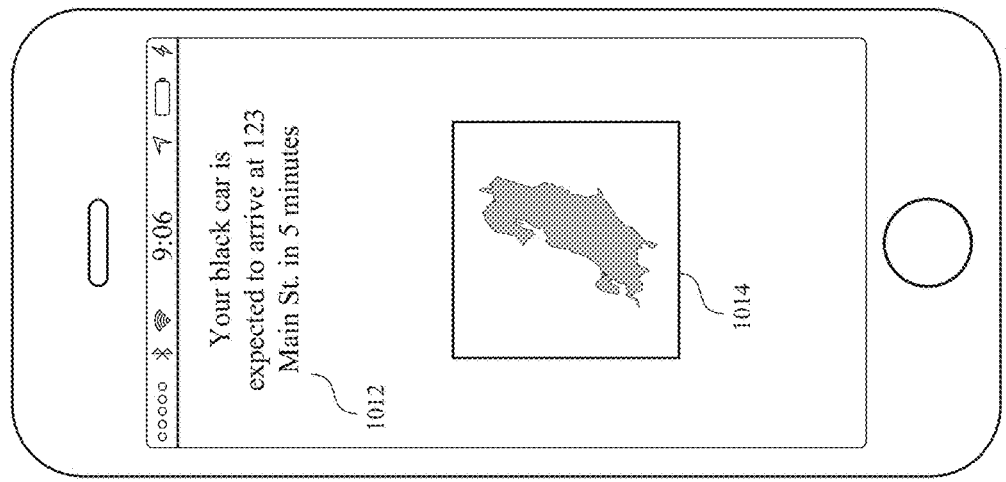
Figure 10A:
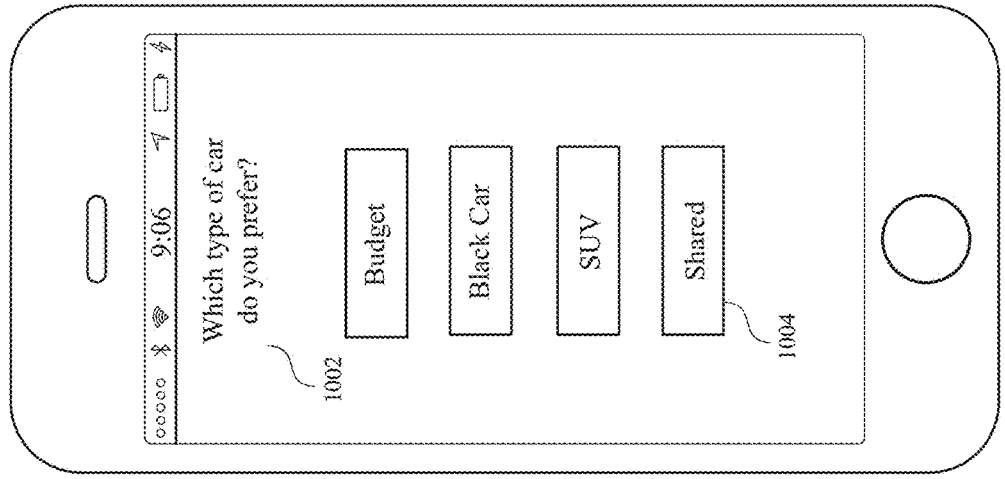

If a response provided by the software application does not indicate that a parameter is valid, the response may indicate that clarification of the parameter is required. For instance, a parameter may be improper (i.e., invalid) and the software application may request additional input from the user. As an example, consider the user input "Send a blue car to 1200 Main Street." Although the user has requested a blue car, the ride-booking application (e.g., Uber, Lyft) may not allow for the selection of a blue car (e.g., blue car may not be a supported parameter or the application may determine that no blue car is currently available). Accordingly, in the event the parameter is improper (e.g., the user has specified an invalid type of car), the application may request that a proper (e.g., valid) value for the parameter (e.g., type of car) be provided. With reference to FIG. 10A, for instance, based on the response from the software application indicating the parameter is improper, the user device may provide a natural-language query 1002 prompting the user to select a valid parameter. In the instant example, the user device provides a natural-language query asking the user to select a valid type of car. The natural-language query 1002 may be provided to a user as text using a touch-sensitive display of the user device and/or may be provided to a user as speech using an audio output component of the user device. As illustrated, in some examples, the user device may provide (e.g., display) one or more candidate parameters 1004 to the user for selection. In the instant example, candidate parameters 1004 include "Budget," "Black Car," "SUV," and "Shared." Candidate parameters 1004 provided in this manner may be provided by the software application in some examples. The user device may select one of the candidate parameters by providing a touch-input and/or by providing a natural-language user input to the user device, and in response, the user device may provide the selected candidate parameter to the software application.

If a response provided by the software application does not indicate that a parameter is valid, the response may indicate that disambiguation of the parameter is required. As a result the user device may request input from the user to disambiguate the parameter. In the example user input "Call Tom," a parameter for a contact Tom may be provided to a software application configured to place calls. If, in determining contact information (e.g., a phone number) for the contact Tom, the software application determines that multiple contacts with the name "Tom" exist, the software application may request that the user specify which "Tom" was intended. As part of the request, the software application includes in the response a disambiguation list including a plurality of candidate parameters. The user device may provide a natural-language query asking the user to select a candidate parameter. Further, candidate parameters of the disambiguation list may be displayed to allow for user selection. The user may select one of the candidate parameters, for instance, by providing a touch-input and/or by providing a natural-language user input, and the user device may provide the selected candidate parameter to the software application.

Performing a task may require that one or more specific types of parameters are specified by a user. Yet in some examples, a natural-language user input may omit one or more required parameters. Accordingly, the software application may optionally provide one or more responses indicating which, if any, required parameters were not specified. Consider the user input "Send a car to 1200 Main Street." Although a car is generally requested by way of the user input, the ride-booking application identified based on the user input may require a selection of a particular type of car. Accordingly, in the event the parameter is missing (e.g., the user has not specified a type of car), the application may request that a recognized value for the parameter (e.g., type of car) be provided. With reference once again to FIG. 10A, the user device may provide a natural-language query 1002 prompting the user to specify a valid parameter. Thereafter the user may select a candidate parameter, for instance from a list of candidate parameters, and the selected parameter may be provided to the software application as described.

Once the software application has indicated that each parameter is valid and no additional information is required, at block 830, the user device may confirm intent with the software application. In particular, the user device may request a notification that, given the intent and the parameters associated with the intent, the software application can successfully perform a task corresponding to the intent.

Once the software application provides a notification indicating that the software application can perform the task, optionally, the user device confirms intent with the user. For example, the user device may provide the natural-language query "I can get an uberX at your location. Shall I request it?" The user may confirm or reject the intent by way of either a touch input or a natural-language input. In some examples, the notification provided by the software application may include information to provide to the user. The information may, for instance, allow the user to make a more informed decision when prompted for confirmation. For instance, the user device may provide the natural-language query "I can get an uberX to your location in 9 minutes. Shall I request it?"

Thereafter, the user device causes (e.g., instructs) the software application to perform the task corresponding to the intent in accordance with the parameters.

At block 835, the user device receives a result response from the software application indicating whether the software application performed the task successfully. A result response indicating failure to perform a task may further indicate one or more reasons for the failure. In some examples, the user device may provide an output, such as a natural-language output, to the user indicating the one or more reasons for the failure.

A result response indicating success in performing a task may include one or more response items. Each response item may be a result determined (e.g., received, generated) by the software application when performing the task. By way of example, response items corresponding to reserving a car with a ride-booking application may include car type, license plate number, driver name, arrival time, current car location, pick-up location, destination, estimated trip time, estimated cost, and estimated trip route, service type (e.g., Uber pool vs. uberX). As another example, response items corresponding to initiating a workout session with a fitness application may include confirmation that the session has been initiated, workout duration, type of activity, and one or more goals.

In some examples, one or more of the response items may be provided to a user. With reference to FIG. 10B, for example, one or more of the response items may be provided to the user as a natural-language output 1012 as a text input and/or an audio output. Response items may be provided visually as well. For example, a map 1014 of an estimated trip route may be provided to the user. It will be appreciated that response items may be provided to users in any desired manner.

In some examples, the software application may specify the manner in which one or more response items are provided to the user. That is, the software application may determine the manner in which response items are displayed and/or spoken to the user and the digital assistant may provide each of the response items accordingly.

In some examples, the software application may specify how response items are provided using a UI extension of the digital assistant. The user device may, for instance, provide the software application with a set of view controller parameters (e.g., fields that can be supplied to a view controller for display), and in response, the software application may provide a set of view controller parameter values. The set of view controller parameter values may indicate which response items are to be displayed in various fields of a view controller and/or the manner in which the response items are displayed in each field.

In other examples, the digital assistant may determine how response items are provided. In yet other examples, the software application is invoked such that a user may interact with the software application directly. Invoking the application in this manner may terminate a session with the digital assistant in some examples.

In some examples, permissions of a software application are verified, for instance, prior to an intent and parameters being provided to the software application. The user device may, for instance, determine whether a software application is permitted to access data associated with a particular intent. The determination may be made based on permissions configured on the user device. In the example "Get me a black car at my location," "location" may be a contextual parameter requiring contextual information (e.g., location data) of the user device. Thus, prior to resolving the location of the user device and providing the location as a parameter to the software application, the user device may first determine whether the software application is permitted to access the information. If the software application is permitted to access the data, operation proceeds as described. If the software application is not permitted to access the data, the intent and parameters are not provided to the software application and the task is not performed.

In some examples, a natural-language input may include a plurality of task requests. Thus, based on the natural-language input, a plurality of intents and/or a plurality of applications may be identified. Parameters associated with each of the intents are optionally identified as well. The natural-language input "Get me a ride to the airport and tell me my flight status," for instance, may include both an intent to reserve a car and an intent to retrieve status of a user's flight. In some examples, tasks corresponding to each of the intents may be performed sequentially or concurrently.

In some examples, a natural-language input may include a plurality of related task requests. For instance, in some examples, a requested task of a natural-language user input may depend on completion of another requested task of the natural-language input. In the example "Email me directions to the airport," two tasks are requested: a first task to provide directions and a second task to email. The parameter "me" specifies a particular contact and is a parameter for the intent to email, and the parameter "airport" is a parameter specifying a destination for the intent to provide directions. Because emailing the directions requires that the directions first be provided, the second task (email) depends on the first task (provide directions). Accordingly, the task to retrieve directions is performed first.

In some examples, intents may be provided between applications. For example, an application may provide an intent object to another application to cause the application to perform a task. In the instant example, both intents (provide directions and email) may be provided to a maps application to provide the requested directions. The second intent, or the intent to email, may be provided to the maps application as a parameter, for instance. In accordance with the first intent, or the intent to provide directions, the maps application may provide the requested directions. Subsequently, the maps application may provide the second intent to the email application, for instance as an intent object including the directions as parameters. In response, the email application may email the directions as requested.

As another example, a user may provide a user input "Get me a ride to the Sharks game" while viewing a sports application (e.g., ESPN application). In response, the sports application, having information pertaining to the game, may pass an intent (e.g., reserve car) and a parameter (e.g., address of game) to a ride-booking application. The intent and parameter may be provided as an intent object in some examples.

As yet another example, a user may provide a user input "Pay my brother $5.00," while using a ride-booking application. In response, the ride-booking application may pass an intent (e.g., pay) and a parameter ($5.00) to a payment application (e.g., PayPal, Venmo, online payment service). As described, the intent and parameter may be provided as an intent object in some examples.

FIG. 9 illustrates a flow diagram of a process for operating a digital assistant in accordance with some embodiments. The process 900 may, for instance, be used to implement at least a portion of process 800 of FIG. 8, including, but not limited to, block 815 and/or block 820 of FIG. 8. Process 900 is performed, for example, using one or more electronic devices (e.g., devices 104, 108, 200, 400, or 600) implementing a digital assistant. In some examples, the process 900 is performed using a client-server system (e.g., system 100), and the blocks of the process 900 can be divided up in any manner between the server (e.g., DA server 106) and a client device. Thus, while portions of the process 900 are described herein as being performed by particular devices of a client-server system, it will be appreciated that the process 900 is not so limited. In other examples, the process 900 is performed using only a client device (e.g., user device 104). In process 900, some blocks are, optionally, combined, the order of some blocks is, optionally, changed, and some blocks are, optionally, omitted. In some examples, additional steps may be performed in combination with the process 900.

At block 905, a natural-language user input is received by a user device, such as the user device 104 of FIG. 1. As described, the natural-language input may include a request for the user device, and/or another device, to perform a task, and may further specify one or more parameters for the requested task.

At block 910, an intent and, optionally, one or more parameters associated with the intent, are identified. The intent and parameters may be derived from the natural-language user input. As previously described, intents may correspond to any type of tasks performed by a user device and, in particular, may correspond to tasks performed by one or more applications of a user device. Parameters associated with the intent may identify portions of the natural-language input that specify a manner in which a task corresponding to the intent is to be performed. In the example, "Get me a ride to the airport," the intent corresponds to a task to reserve a car and "airport" is a parameter specifying a destination. Given that the intent of the user is to reserve a car, the location of the user may be a parameter (e.g., inferred parameter) as well.

At block 915, a determination is made as to whether a task corresponding to the intent can be fulfilled. In some examples, the determination may include determining whether an application configured to perform the task in accordance with the parameters is accessible to the user device. In the instant example, a determination is made as to whether the user device can access an application configured to reserve a car at a location of the user device. As described, accessible applications are those locally stored on the user device as well as those remotely accessible by the user device.

In accordance with a determination that the task corresponding to the intent can be fulfilled, at block 920, the intent and the parameter are provided to a software application. For example, if, at block 915, it is determined that the user device can access a software application configured to perform the requested task according to any identified parameters, the intent and parameters are provided to the application to perform the task. In the instant example, this includes determining that a software application configured to reserve a car at a location of the user device is accessible to the user device. For instance, the ride-booking application Lyft may be installed on the user device and may be used to reserve a car in accordance with examples described herein.

In accordance with a determination that the task corresponding to the intent cannot be fulfilled, at block 925, a list of one or more software applications is provided. The list of one or more software applications may, for instance, include one or more software applications configured to perform the task associated with the intent according to any identified parameters. In some examples, one or more software application of the list may be identified, for instance, based on one or more domains associated with the intent (recall that applications may be registered with one or more domains). With reference to FIG. 10C, once the list of software applications (e.g., ride-booking applications) has been determined, the user device may provide the list to the user. As illustrated, providing the list may include providing a natural-language input 1022 requesting the user select an application from the list of one or more software applications. In some examples, the list is generated by the user device. In other examples, the list of software applications is generated by a server and provided to the user device, which may in turn provide the list to a user, as described.

At block 930, the user device receives a user input indicative of a selection of one or more software applications of the list of one or more software applications. The user input may be a touch input on a touch-sensitive display of the user device and/or may be a natural-language user input.

At block 935, the intent and parameters are provided to the software application selected by the user. In some examples, providing the intent and parameters includes downloading and/or installing the software application such that the user device may access the software application locally. In other examples, this includes remotely accessing the selected application.

As described, in response to the intent and parameters, the software application may provide one or more responses. Once parameters have been validated, the user device may confirm intent with the software application and cause the software application to perform the task. The user device may thereafter receive result responses and, optionally, provide one or more response items of the result response to the user.

Reference is made herein to providing a user of a user device with natural-language outputs and/or natural language queries. In some examples, the manner in which natural-language outputs and queries are provided to a user may depend on a type or state of the user device. If, for instance, the user device is a mobile phone, the user device may provide a query using both text and audio. If, on the other hand, the user device is a speaker, the user device may provide the query using only audio. As another example, if the user device is a mobile phone not paired with headphones, the user device may provide a query using text and/or a relatively short natural-language query. If the user device is paired with headphones, the user device may provide the query using only a relatively long natural-language query.

Figure 10D:
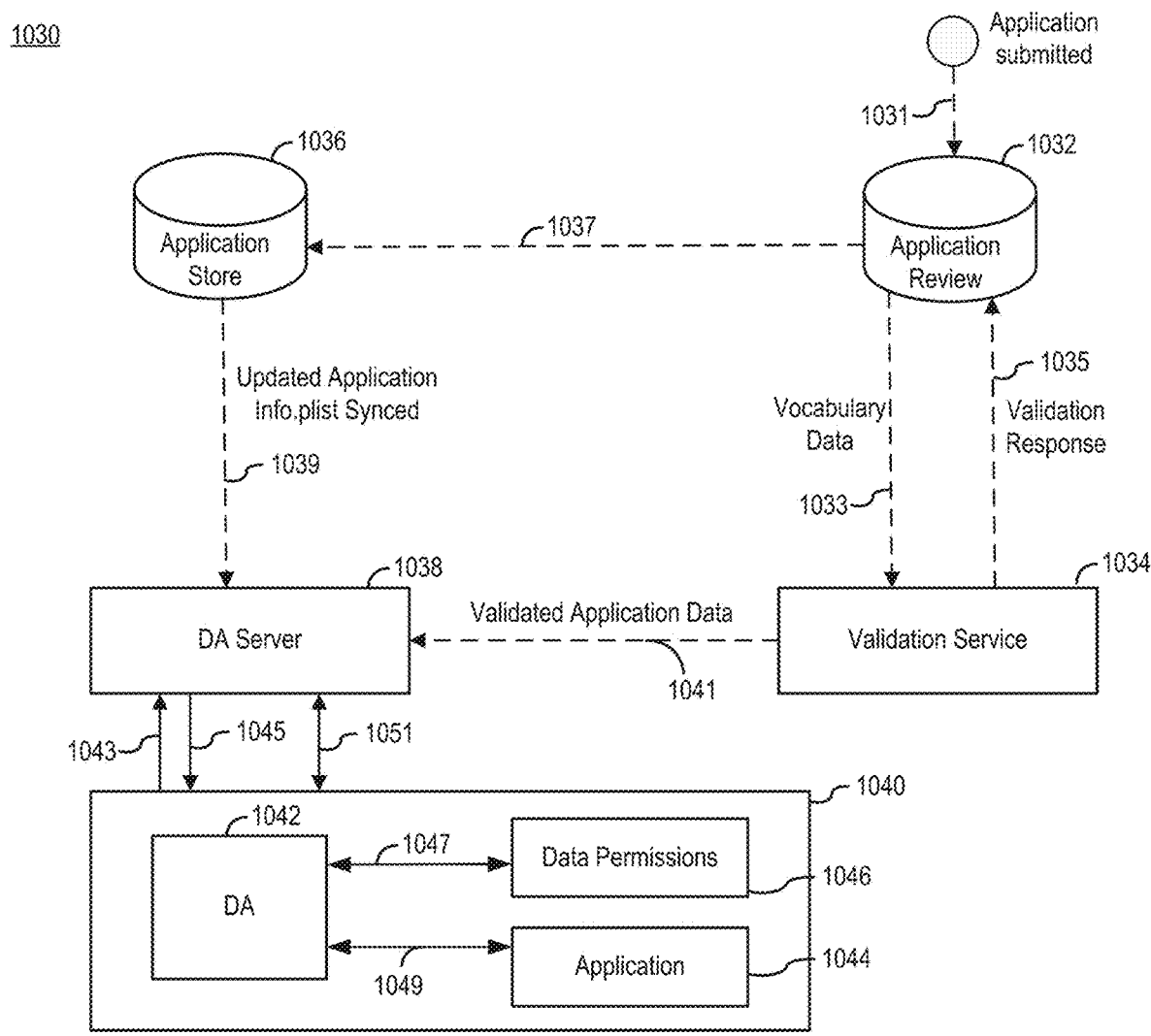
FIGS. 10D-E illustrate exemplary data flows of a digital assistant system in accordance with some embodiments.
Figure 10E:
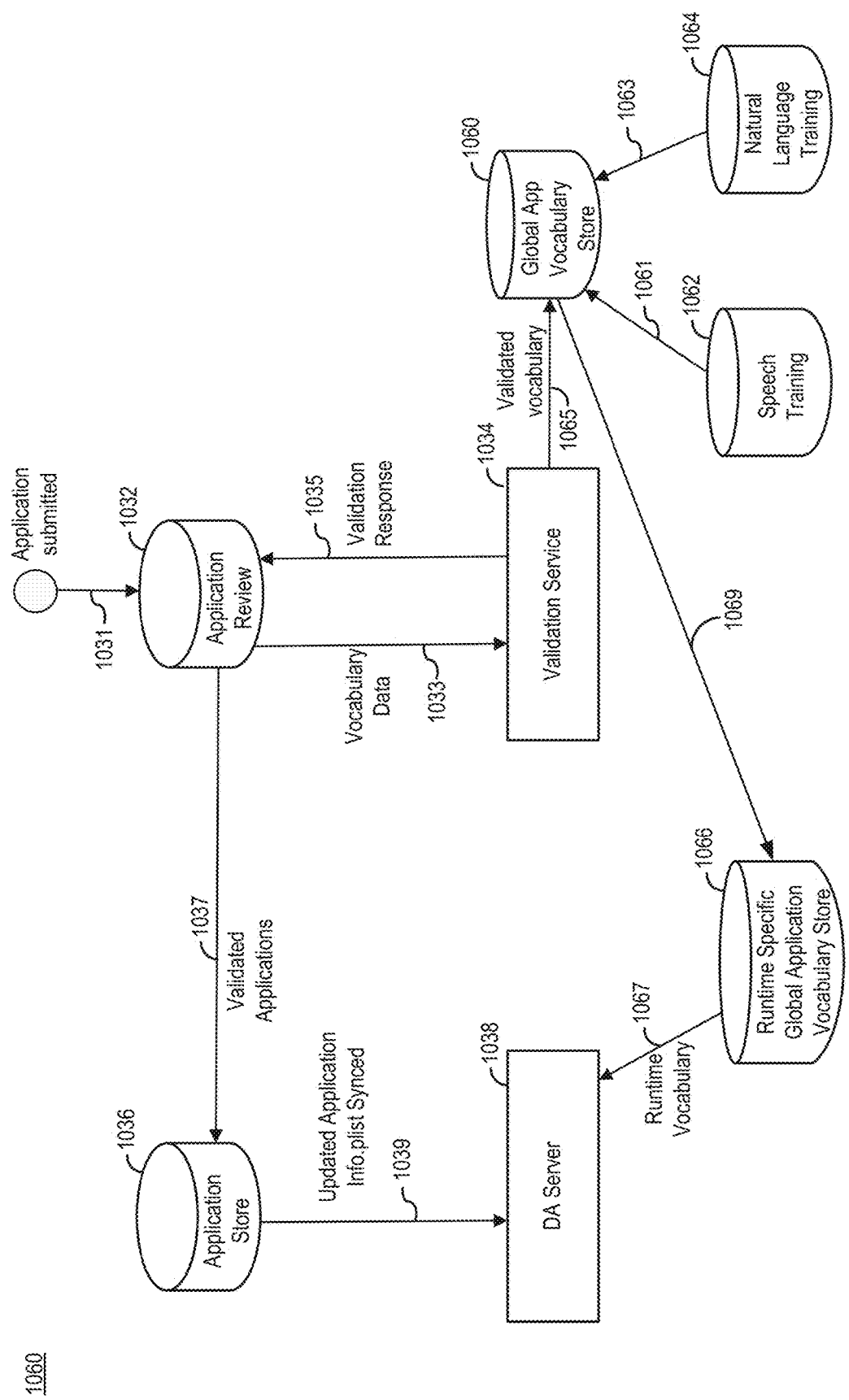

FIGS. 10D-F illustrate exemplary data flows of digital assistant systems in accordance with some embodiments. Data flows of FIGS. 10D-F may be implemented using one or more of processes 800, 900 in some examples. FIG. 10D illustrates an exemplary data flow of a digital assistant system 1030 in accordance with some embodiments. In particular, FIG. 10D illustrates a data flow for an application registration process and a data flow for performance of a task. Data flows 1031-1041 may be associated with the application registration process (illustrated in FIG. 10D as hashed lines) and data flows 1043-1051 may be associated with performance of a task (illustrated in FIG. 10D as solid lines).

Generally, data flows associated with the application registration process are directed to registration of an application with an application registration service (e.g., validation service) by which applications, and custom vocabulary corresponding thereto, can be accessed and/or employed by a digital assistant to perform tasks.

In operation, at data flow 1031, an application is submitted to an application review module 1032. Both a language model corresponding to the application and intents of the application may be submitted as well. The language model may include custom vocabulary for the application. In turn, at data flow 1033, the application review module 1032 may provide the application, custom vocabulary, and/or intents of the application to the validation service 1034. The validation service 1034 may determine whether to validate the application, for instance, based on whether the application is operable with a digital assistant. This may include for instance, ensuring that any intents of the application correspond to one or more domains of the application. For instance, the validation service may reject a messaging application associated with intents to reserve cars because the domain and intents mismatch. The validation service 1034, at data flow 1035, may provide a validation response indicating whether the application is valid.

If the validation service 1034 indicates that the application is valid, the application review module 1032 provides the application (as verified) to the application store 1036. Generally, the application may be downloaded and/or accessed at the application store 1036 by the user device 1040 via the DA server 1038, as indicated by the data flow 1039. The user device 1040 may be the user device 104 of FIG. 1 and the DA server 1038 may be the DA server 106 of FIG. 1 in some examples. This may, for instance, result in an application list (e.g., info.plist) of the user device 1040 being updated and/or synchronized with the DA server 1038. At data flow 1041, the validation service may provide custom vocabulary (e.g., runtime vocabulary) of the application to the DA server 1038 to assist in parsing natural-language inputs, as described.

Generally, data flows associated with performance of a task are directed to providing an intent and, optionally, one or more parameters to an application for performing a task corresponding to the intent.

In operation, at data flow 1043, the user device 1040 may provide a natural-language input to the DA server 1038. The natural-language input may be provided by the digital assistant 1042 of the user device 1040 in some examples. Based on the natural-language input, the DA server 1038 may identify one or more tasks requested in the natural-language input and one or more parameters associated with the intent. Additionally, the DA server 1038 may identify an application for performing a task with the intent. A name (or other form of identifier) of the identified application 1044 may be a parameter of the intent in some examples. At data flow 1045, the DA server 1038 thereafter provides the intent, parameters, and an identification of the identified application 1044 to the user device 1040 (e.g., the digital assistant 1042 of the user device 1040). The intent and parameters may be provided to the user device 1040 as an intent object in some examples.

In response, the digital assistant determines whether the identified application 1044 is permitted to access information associated with the identified parameters. For instance, if a parameter is a location of the user device 1040, the digital assistant queries data permissions 1046 to determine if the application 1044 is permitted to access location data.

In the event that the application is permitted to access data for each of the parameters, the user device (e.g., the digital assistant 1042 of the user device) provides the intent to the application. As illustrated, the application may reside on the user device 1040. In other examples, the application may reside on one or more other devices, and the intent may be transmitted to the application over one or more networks. As described, the application 1044 may thereafter request input from a user of the user device 1040 if the application determines that one or more parameters are missing, improper, and/or ambiguous. In some examples, queries for user input may be provided as natural-language queries generated by the DA server 1038. Accordingly, at data flow 1051, the user device 1040 may request, and thereafter, receive, one or more natural-language queries. Once all parameters have been resolved, the application 1044 may perform a task corresponding to the intent and provide a result response indicating whether the task was successfully performed.

One or more of the data flows of FIG. 10D are implemented (e.g., generated), for example, using one or more electronic devices (e.g., devices 104, 108, 200, 400, or 600) implementing a digital assistant. In particular, data flows provided between DA server 1038 and the digital assistant 1042 of the user device 1040 are illustrated as relying on a client-server architecture. In other examples, the DA server 1038 may be implemented as a process and/or service on the user device 1040. Accordingly, data flows exchanged between the DA server 1038 and the digital assistant 1042 may be exchanged solely on the user device 1040 in some examples.

FIG. 10E illustrates an exemplary data flow of a digital assistant system 1060 in accordance with some embodiments. In particular, FIG. 10E illustrates an exemplary data flow for an application registration process and may be used to implement the application registration process as set forth in FIG. 10D. Further, several elements of FIG. 10E correspond to elements of FIG. 10D, respectively, and have been provided with the same reference numerals. In the interest of brevity, an explanation of their function and operation will not be repeated.

At data flow 1065, validated vocabulary is provided from validation service 1034 to global application vocabulary store 1060. Generally, the global application vocabulary store may store language models and/or vocabulary for any number and/or versions of software applications. At data flows 1061 and 1063, speech training module 1062 and natural-language training module 1064 are trained to recognize and natural language process the application specific vocabulary supplied with the validated application. Based on the data, the global application vocabulary store may generate and/or train one or more language models that allow the digital assistant to recognize and process utterances containing the application specific vocabulary.

During operation of a user device, such as the user device 1040 of FIG. 10D, the runtime-specific global application vocabulary store may receive vocabulary and/or language models for one or more applications of the user device from the global application vocabulary store 1060. The vocabulary may be specific to a user ID of a user of the user device, and/or may be specific to versions of applications and/or operating systems of the user device. Based on the vocabulary, one or more terms of natural-language inputs may be identified, for instance, as parameters.

Figure 11:
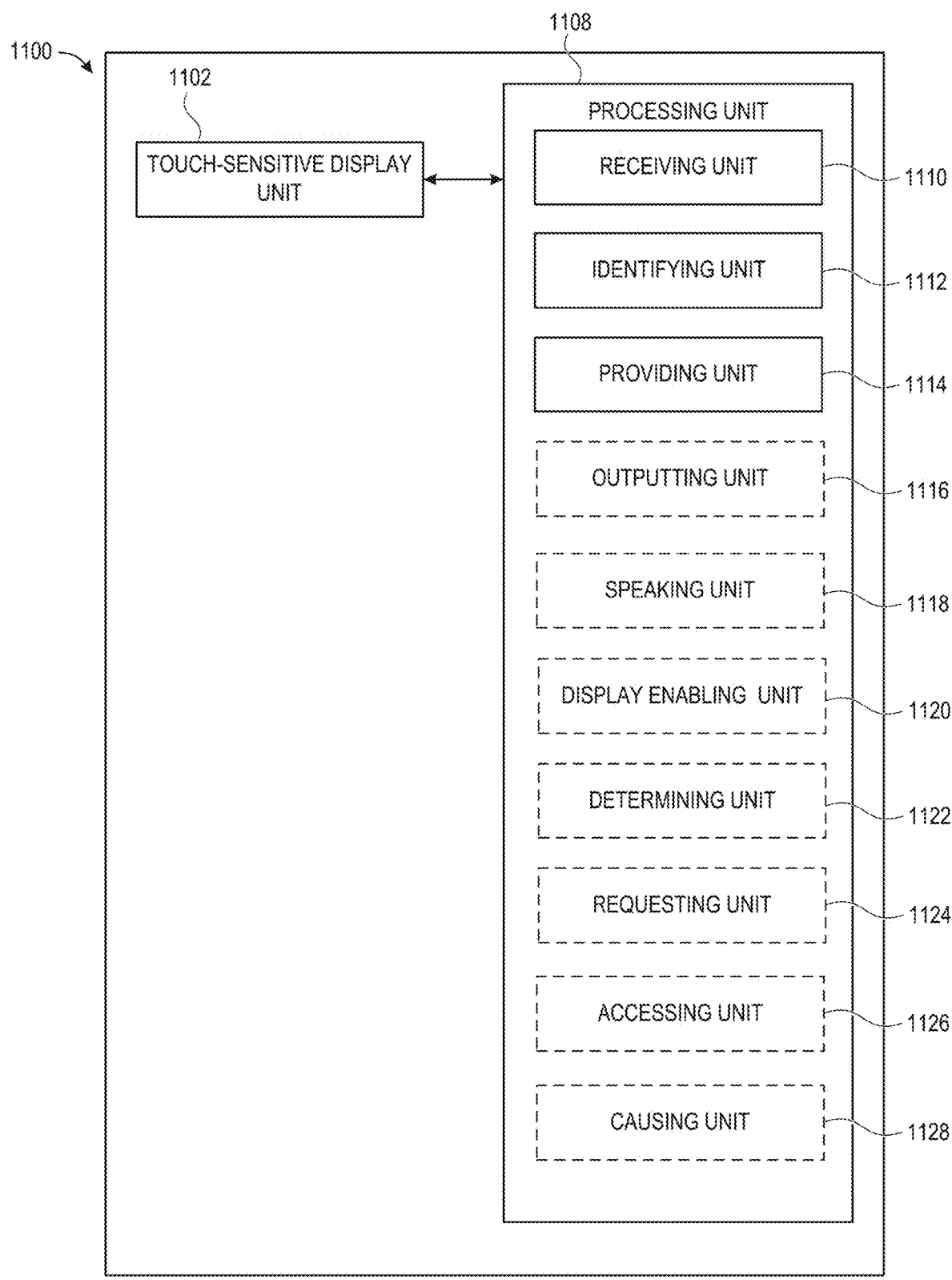
FIGS. 11-14 illustrate functional block diagram of electronic devices in accordance with some embodiments.

In accordance with some embodiments, FIG. 11 shows a functional block diagram of an electronic device 1100 configured in accordance with the principles of the various described embodiments, including those described with reference to FIG. 8. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a touch-sensitive display unit 1102 and a processing unit 1108 optionally coupled to touch-sensitive display unit 1102. In some embodiments, the processing unit 1108 includes a receiving unit 1110, an identifying unit 1112, a providing unit 1114, and optionally, an outputting unit 1116, a speaking unit 1118, a display enabling unit 1120, a determining unit 1122, a requesting unit 1124, an accessing unit 1126, and a causing unit 1128.

In some examples, the processing unit 1108 is configured to receive (e.g., with the receiving unit 1110) a natural-language user input (e.g., block 805 of FIG. 8); identify (e.g., with identifying unit 1112), with the one or more processors, an intent object of a set of intent objects and a parameter associated with the intent object, where the intent object and the parameter are derived from the natural-language user input (e.g., block 810 of FIG. 8); identify (e.g., with identifying unit 1112) a software application associated with the intent object of the set of intent objects (e.g., block 815 of FIG. 8); and provide (e.g., with the providing unit 1114) the intent object and the parameter to the software application (e.g., block 820 of FIG. 8).

In some examples, the processing unit 1108 is further configured to receive (e.g., with the receiving unit 1110) a response from the software application, wherein the response is indicative of whether the parameter is valid (e.g., block 825 of FIG. 8).

In some examples, receiving (e.g., with the receiving unit 1110) a response from the software application comprises receiving (e.g., with the receiving unit 1110), from the software application, a disambiguation list associated with the parameter, where the disambiguation list includes a plurality of candidate parameters.

In some examples, the processing unit 1108 is further configured to output (e.g., with the outputting unit 1116) the disambiguation list; receive (e.g., with the receiving unit 1110) a user input indicative of a selection of a candidate parameter value of the disambiguation list; and provide (e.g., with the providing unit 1114) the selected candidate parameter value of the disambiguation list to the software application.

In some examples, the natural-language user input is a first natural-language input, the parameter is a first parameter, and the processing unit 1108 is further configured to receive (e.g., with the receiving unit 1110), from the software application, a request for a second parameter associated with the intent object; provide (e.g., with the providing unit 1114) a natural-language query based on the request; receive (e.g., with the receiving unit 1110) a second natural-language user input; identify (e.g., with identifying unit 1112) the second parameter, where the second parameter is derived from the second natural-language user input; and provide (e.g., with the providing unit 1114) the second parameter to the software application.

In some examples, the electronic device further comprises an audio output component, and providing the natural-language query comprises speaking (e.g., with the speaking unit 1118), via speech synthesis, the natural-language query through the audio output component.

In some examples, providing the natural-language query comprises providing (e.g., with the providing unit 1114) the natural-language query based on a type of the electronic device, a state of the electronic device, or a combination thereof.

In some examples, the processing unit 1108 is further configured to, after providing the intent object and the parameter to the software application, receive (e.g., with the receiving unit 1110), from the software application, a result response associated with the intent object (e.g., block 835 of FIG. 8).

In some examples, receiving a result response comprises receiving (e.g., with the receiving unit 1110), from the software application, a set of response items associated with the intent object, and outputting (e.g., with the outputting unit 1116) the set of response items.

In some examples, the processing unit 1108 is further configured to provide (e.g., with the providing unit 1114), to the software application, a set of view controller parameters; and receive (e.g., with the receiving unit 1110), from the software application, a set of view controller parameter values corresponding to the set of view controller parameters, where outputting the set of response items comprises enabling display (e.g., with the display enabling unit 1120) of the set of response items in a user interface based on the received view controller parameter values.

In some examples, each intent object of the set of intent objects is associated with the software application.

In some examples, the intent object is a first intent object and wherein the parameter is associated with the first intent object and not associated with a second intent object.

In some examples, the processing unit 1108 is further configured to determine (e.g., with the determining unit 1122) whether the electronic device is in a lock state; and in accordance with a determination that the device is in the lock state, determine (e.g., with the determining unit 1122) whether the intent object is allowed to be provided to the software application while the electronic device is in the lock state, where the intent object and the parameter value are provided to the software application only in accordance with a determination that the intent object is allowed to be provided to the software application while the electronic device is in the lock state.

In some examples, the parameter is derived from the natural-language user input by analyzing the natural-language user input using each of a plurality of detectors.

In some examples, the processing unit 1108 is further configured to determine (e.g., with the determining unit 1122) a user context of the electronic device, where the parameter is based at least in part on the user context.

In some examples, the processing unit 1108 is further configured to request (e.g., with the requesting unit 1124) a confirmation of the parameter; and receive (e.g., with the receiving unit 1110) a user input corresponding to the confirmation of the parameter, where the parameter is provided to the software application in response to receiving the user input.

In some examples, identifying the software application comprises determining (e.g., with the determining unit 1122) whether the software application resides on the electronic device; and in accordance with a determination that the software application does not reside on the electronic device, determining (e.g., with the determining unit 1122) whether the software application resides on an external device that is in communication with the electronic device. In some examples, providing the intent object and the parameter to the software application comprises, in accordance with a determination that the software application resides on an external device that is in communication with the electronic device, providing (e.g., with the providing unit 1114) the intent object and the parameter to the software application by providing the intent object and the parameter to the external device.

In some examples, identifying the software application comprises determining (e.g., with the determining unit 1122) whether the software application resides on the electronic device; in accordance with a determination that the software application does not reside on the electronic device, identifying (e.g., with the identifying unit 1112) a set of software applications associated with the intent object; enabling display (e.g., with the display enabling unit 1120) of, in a user interface, the set of software applications associated with the intent object; receiving (e.g., with the receiving unit 1110) a user input including a selection of one or more software applications of the set of software applications associated with the intent object; and accessing (e.g., with the accessing unit 1126) the selected one or more software applications of the set of software applications associated with the intent object.

In some examples, identifying a software application associated with the intent object of the set of intent objects comprises identifying (e.g., with the identifying unit 1112) the software application based on the parameter.

In some examples, the processing unit 1108 is further configured to identify (e.g., with the identifying unit 1112), based on the natural-language user input, a third intent object from the set of intent objects; identify (e.g., with the identifying unit 1112), based on the identified third intent object, a second software application; provide (e.g., with the providing unit 1114) the third intent object and at least one response item to the second software application; and receive (e.g., with the receiving unit 1110), from the second software application, a second response item associated with the third intent object.

In some examples, the software application is a first software application, and providing the intent object and the parameter to the software application comprises causing (e.g., with the causing unit 1128) a third software application to provide the intent object and the parameter to the first software application In some examples, receiving a natural-language user input comprises receiving (e.g., with the receiving unit 1110) a natural-language user input including an application-specific term; and where identifying a software application associated with the intent object of the set of intent objects comprises identifying (e.g., with the identifying unit 1112) the software application based on the application-specific term.

In some examples, the processing unit 1108 is further configured to receive (e.g., with the receiving unit 1110) a command including an identification of the software application, and in response to the command, determine (e.g., with the determining unit 1122) whether the software application is permitted to access data associated with the intent object.

In some examples, the processing unit 1108 is further configured to cause (e.g., with the causing unit 1128) the software application to perform a task associated with the intent object based on the parameter.

The operation described above with respect to FIG. 8 is, optionally, implemented by components depicted in FIGS. 1, 2A, 4, 6A-B, 7A, and 11. For example, receiving operations 805, 825, and 835; identifying operations 810 and 815, providing operation 820, and confirming operation 830 are optionally implemented by processor(s) 120. It would be clear to a person of ordinary skill in the art how other processes can be implemented based on the components depicted in FIGS. 1, 2A, 4, 6A-B, 7A, and 11.

It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein. For example, processing unit 1108 can have an associated "controller" unit that is operatively coupled with processing unit 1108 to enable operation. This controller unit is not separately illustrated in FIG. 11 but is understood to be within the grasp of one of ordinary skill in the art who is designing a device having a processing unit 1108, such as device 1100. As another example, one or more units, such as the receiving unit 1110, may be hardware units outside of processing unit 1108 in some embodiments. The description herein thus optionally supports combination, separation, and/or further definition of the functional blocks described herein.

Figure 12:
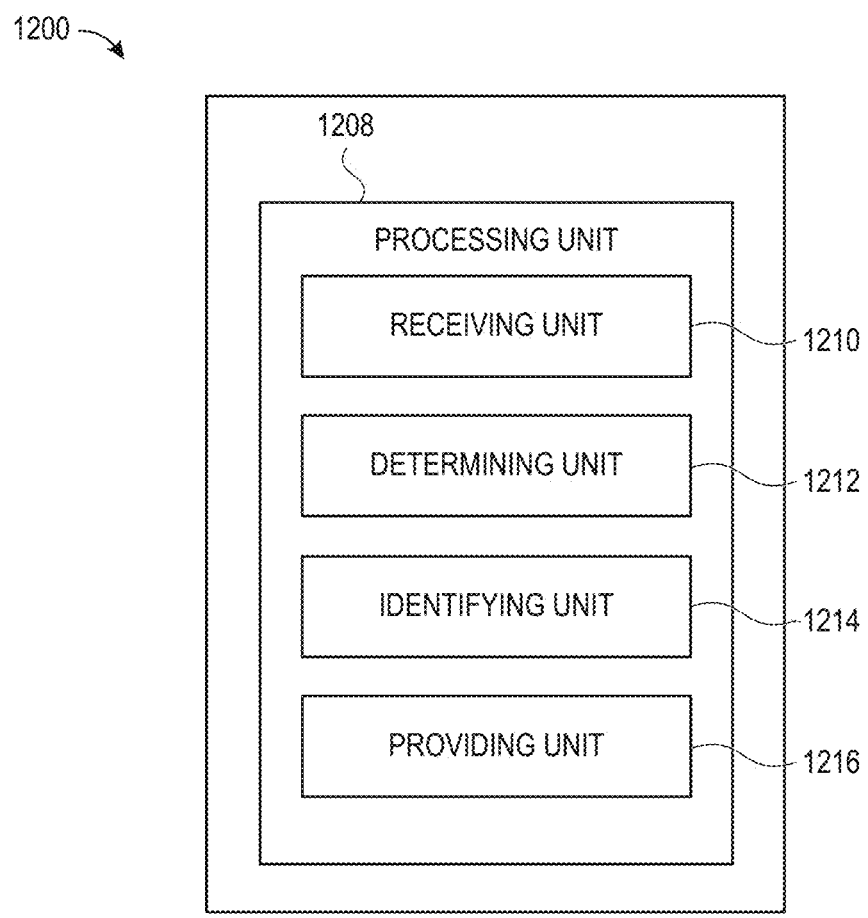

In accordance with some embodiments, FIG. 12 shows a functional block diagram of an electronic device 1200 configured in accordance with the principles of the various described embodiments, including those described with reference to FIG. 8. The functional blocks of the device are, optionally, implemented by hardware, software, or a combination of hardware and software to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, one or more electronic devices 1200 include one or more processing units 1208. In some embodiments, the one or more processing units 1208 include a receiving unit 1210, a determining unit 1212, an identifying unit 1214, and a providing unit 1216.

In some examples, the one or more processing units 1208 is configured to receive (e.g., with the receiving unit 1210) a natural-language user input (e.g., block 805 of FIG. 8); determine (e.g., with the determining unit 1212), based on the natural-language user input, an intent object of a set of intent objects and a parameter associated with the intent object (e.g., block 810 of FIG. 8); identify (e.g., with the identifying unit 1214) a software application based on at least one of the intent object or the parameter (e.g., block 815 of FIG. 8); and provide (e.g., with the providing unit 1216) the intent object and the parameter to the software application (e.g., block 820 of FIG. 8).

In some examples, determining, based on the natural-language user input, an intent object of a set of intent objects and a parameter associated with the intent object comprises determining (e.g., with the determining unit 1212), with a first electronic device of the one or more electronic devices 1200, the intent object of the set of intent objects and the parameter associated with the intent object; and where providing the intent object and the parameter to the software application comprises providing (e.g., with the providing unit 1216), with a second electronic device of the one or more electronic devices 1200, the intent object and the parameter to the software application.

In some examples, the one or more processing units 1208 are configured to provide (e.g., with the providing unit 1216), with the first electronic device of the one or more electronic devices 1200, a command to the second electronic device of the one or more electronic devices 1200; and in response to the command, determine (e.g., with the determining unit 1212), with the second electronic device, whether the software application is permitted to access data associated with the intent object.

In some examples, the one or more processing units 1208 are configured to receive (e.g., with the receiving unit 1210) a response from the software application, where the response is indicative of whether the parameter is valid (e.g., block 825 of FIG. 8).

In some examples, the parameter is indicative of the software application.

In some examples, the one or more processing units 1208 are configured to identify (e.g., with the identifying unit 1214) the software application based on the natural-language user input; and determine (e.g., with the determining unit 1212) whether the intent object of the set of intent objects corresponds to a registered intent object of the software application; where the intent object and the parameter are determined only in accordance with a determination that the intent object corresponds to a registered intent object of the software application.

In some examples, the parameter is a first parameter, and the one or more processing units are configured to determine (e.g., with the determining unit 1212), based on the natural-language user input, a second parameter; and provide (e.g., with the providing unit 1216) the second parameter to the software application.

In some examples, the response is a first response, and the one or more processing units are configured to receive (e.g., with the receiving unit 1210) a second response from the software application, where the second response is indicative of whether the second parameter is valid.

The operation described above with respect to FIG. 8 is, optionally, implemented by components depicted in FIGS. 1, 2A, 4, 6A-B, 7A, and 12. For example, receiving operations 805, 825, and 835; identifying operations 810 and 815, providing operation 820, and confirming operation 830 are optionally implemented by processor(s) 120. It would be clear to a person of ordinary skill in the art how other processes can be implemented based on the components depicted in FIGS. 1, 2A, 4, 6A-B, 7A, and 12.

It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein. For example, the one or more processing units 1208 can have an associated "controller" unit that is operatively coupled with at least one of the one or more processing units 1208 to enable operation. This controller unit is not separately illustrated in FIG. 12 but is understood to be within the grasp of one of ordinary skill in the art who is designing a device having one or more processing units 1208, such as device 1200. As another example, one or more units, such as the receiving unit 1210, may be hardware units outside of the one or more processing units 1208 in some embodiments. The description herein thus optionally supports combination, separation, and/or further definition of the functional blocks described herein.

Figure 13:
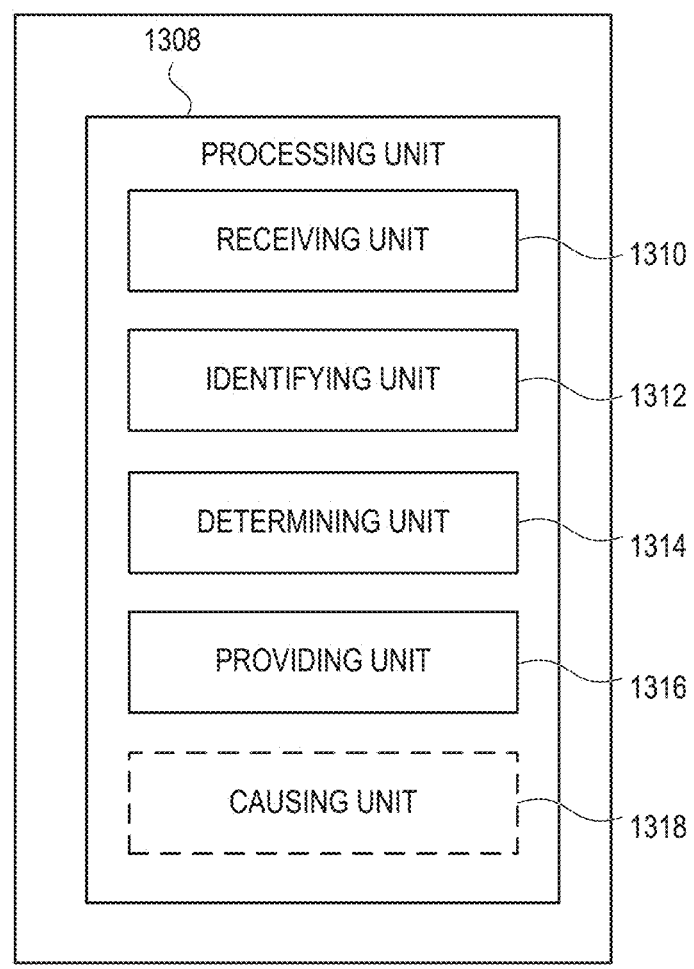

In accordance with some embodiments, FIG. 13 shows a functional block diagram of an electronic device 1300 configured in accordance with the principles of the various described embodiments, including those described with reference to FIG. 9. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, one or more electronic devices 1300 include one or more processing units 1308. In some embodiments, the one or more processing units 1308 include a receiving unit 1310, an identifying unit 1312, a determining unit 1314, a providing unit 1316, and optionally, a causing unit 1318.

In some examples, the one or more processing units 1308 are configured to receive (e.g., with the receiving unit 1310) a natural-language user input (e.g., block 905 of FIG. 9); identify (e.g., with the identifying unit 1312), based on the natural-language user input, an intent object of a set of an intent objects and a parameter associated with the intent object (e.g., block 910 of FIG. 9); determine (e.g., with the determining unit 1314), based on at least one of the intent object or the parameter, whether a task corresponding to the intent object can be fulfilled (e.g., block 915 of FIG. 9); in accordance with a determination that the task corresponding to the intent object can be fulfilled, provide (e.g., with the providing unit 1316) the intent object and the parameter to a software application associated with the intent object (e.g., block 920 of FIG. 9); and in accordance with a determination that the task corresponding to the intent object cannot be fulfilled, provide (e.g., with the providing unit 1316) a list of one or more software applications associated with the intent object (e.g., block 925 of FIG. 9).

In some examples, the one or more processing units 1308 are configured to, after providing a list of one or more software applications associated with the intent object, receive (e.g., with the receiving unit 1310) a user input indicative of a selection of a software application of the list of one or more software applications (e.g., block 930 of FIG. 9); and in response to the user input, provide (e.g., with the providing unit 1316) the intent object of the set of intent objects to the selected software application (e.g., block 935 of FIG. 9).

In some examples, the one or more processing units 1308 are configured to, in response to the user input, provide (e.g., with the providing unit 1316) the parameter to the selected software application.

In some examples, the one or more processing units 1308 are configured to receive (e.g., with the receiving unit 1310) a response from the selected software application, and the response is indicative of whether the parameter is valid.

In some examples, the one or more processing units 1308 are configured to cause (e.g., with the causing unit 1318) the selected software application to perform the task corresponding to the intent object, and after providing the intent object to the selected software application, receive (e.g., with the receiving unit 1310), from the selected software application, a result response associated with the intent object.

The operation described above with respect to FIG. 9 is, optionally, implemented by components depicted in FIGS. 1, 2A, 4, 6A-B, 7A, and 13. For example, determining operation 905, providing operations 910, 915, and 925; and receiving operation 920, are optionally implemented by processor(s) 120. It would be clear to a person of ordinary skill in the art how other processes can be implemented based on the components depicted in FIGS. 1, 2A, 4, 6A-B, 7A, and 13.

It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein. For example, the one or more processing units 1308 can have an associated "controller" unit that is operatively coupled with at least one of the one or more processing units 1308 to enable operation. This controller unit is not separately illustrated in FIG. 13 but is understood to be within the grasp of one of ordinary skill in the art who is designing a device having one or more processing units 1308, such as device 1300. As another example, one or more units, such as the receiving unit 1310, may be hardware units outside of the one or more processing units 1308 in some embodiments. The description herein thus optionally supports combination, separation, and/or further definition of the functional blocks described herein.

Figure 14:
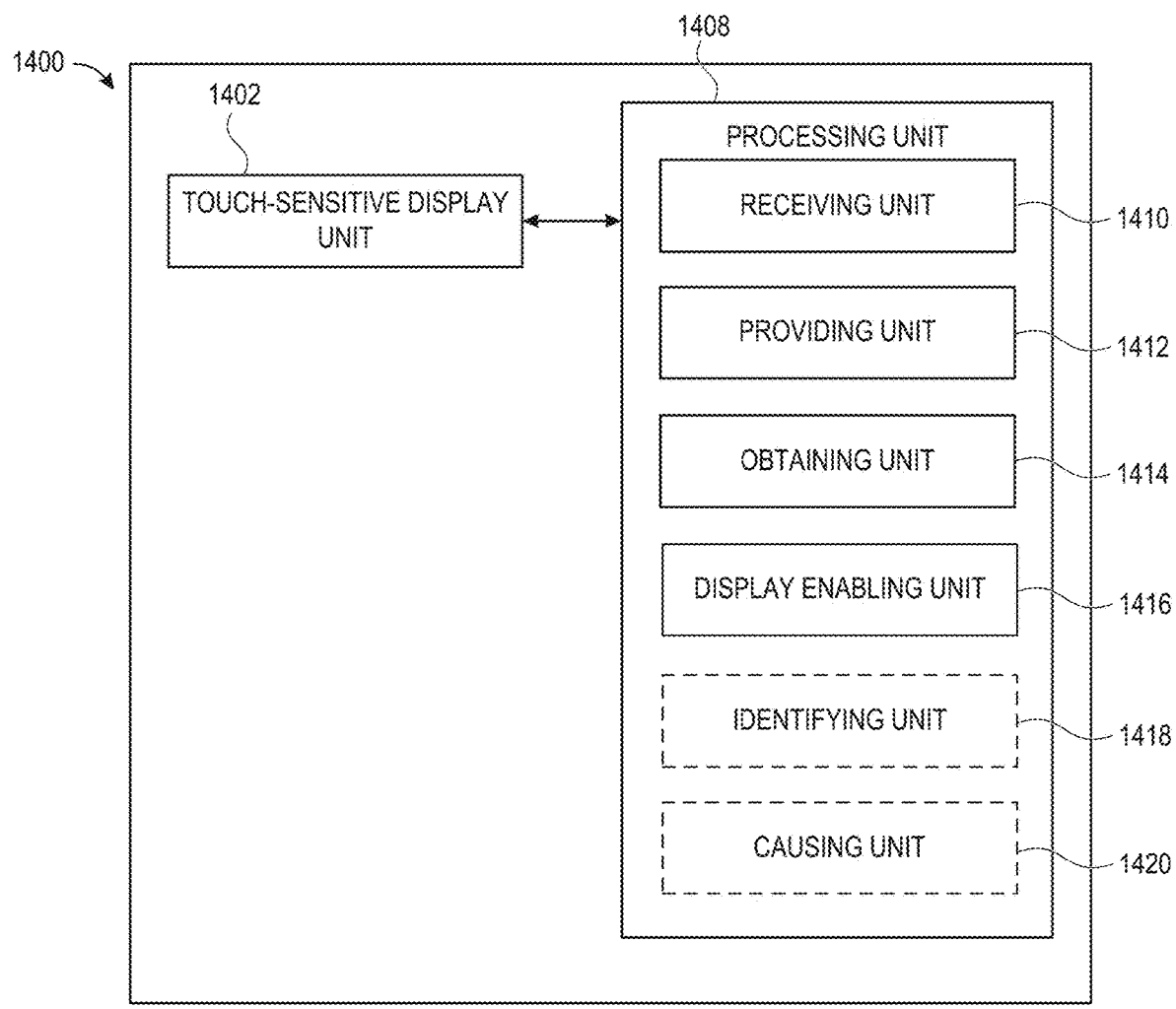

In accordance with some embodiments, FIG. 14 shows a functional block diagram of an electronic device 1400 configured in accordance with the principles of the various described embodiments, including those described with reference to FIG. 9. The functional blocks of the device are, optionally, implemented by hardware, software, or a combination of hardware and software to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, an electronic device 1400 includes a touch-sensitive display unit 1402 and a processing unit 1408 optionally coupled to touch-sensitive display unit 1402. In some embodiments, the processing unit 1402 includes a receiving unit 1410, a providing unit 1412, an obtaining unit 1414, a display enabling unit 1416, and optionally, an identifying unit 1418 and a causing unit 1420.

In some examples, the processing unit 1408 is configured to receive (e.g., with the receiving unit 1410) a natural-language user input, where the natural-language user input is indicative of an intent object of a set of intent objects (e.g., block 905 of FIG. 9); provide (e.g., with the providing unit 1412) the natural-language user input to a second electronic device; receive (e.g., with the receiving unit 1410), from the second electronic device, an indication that a software application associated with the intent object is not located on the first electronic device (e.g., block 925 of FIG. 9); responsive to the notification, obtain (e.g., with the obtaining unit 1414) the list of applications associated with the intent object; enable display (e.g., with the display enabling unit 1416) of, with a touch-sensitive display of the first electronic device, the list of applications associated with the intent object in a user interface; receive (e.g., with the receiving unit 1410) a user input indicative of a selection of an application of the list of applications (e.g., block 930 of FIG. 9); and provide (e.g., with the providing unit 1412) the intent object of the set of intent objects to the application (e.g., block 935 of FIG. 9).

In some examples, the processing unit 1408 is further configured to identify (e.g., with the identifying unit 1418) the intent object of the set of intent objects.

In some examples, the processing unit 1408 is further configured to identify (e.g., with the identifying unit 1418) a parameter associated with the intent object of the set of intent objects; and provide (e.g., with the providing unit 1412) the parameter to the application.

In some examples, the processing unit 1408 is further configured to receive (e.g., with the receiving unit 1410) a response from the application, and the response is indicative of whether the parameter is valid.

In some examples, the processing unit 1408 is further configured to cause (e.g., with the causing unit 1420) the application to perform a task associated with the intent object; and after providing the intent object to the application, receive (e.g., with the receiving unit 1410), from the application, a result response associated with the intent object.

The operation described above with respect to FIG. 9 is, optionally, implemented by components depicted in FIGS. 1, 2A, 4, 6A-B, 7A, and 14. For example, determining operation 905, providing operations 910, 915, and 925; and receiving operation 920 are optionally implemented by processor(s) 120. It would be clear to a person of ordinary skill in the art how other processes can be implemented based on the components depicted in FIGS. 1, 2A, 4, 6A-B, 7A, and 14.

It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein. For example, processing unit 1408 can have an associated "controller" unit that is operatively coupled with processing unit 1408 to enable operation. This controller unit is not separately illustrated in FIG. 14 but is understood to be within the grasp of one of ordinary skill in the art who is designing a device having a processing unit 1408, such as device 1400. As another example, one or more units, such as the receiving unit 1410, may be hardware units outside of processing unit 1408 in some embodiments. The description herein thus optionally supports combination, separation, and/or further definition of the functional blocks described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium storing one or more programs, the one or more programs comprising instructions, which when executed by one or more processors of a first electronic device, cause the first electronic device to:
   receive a natural-language user input, wherein the natural-language user input is indicative of an intent object of a set of intent objects;
   provide the natural-language user input to a second electronic device;
   receive, in response to a determination by the second electronic device that a software application associated with the intent object is not located on the first electronic device, an indication of the determination from the second electronic device;
   responsive to the indication, obtain a list of applications associated with the intent object;
   display, with a touch-sensitive display of the first electronic device, the list of applications associated with the intent object in a user interface;
   receive a user input indicative of a selection of an application of the list of applications; and
   provide the intent object of the set of intent objects to the application, wherein providing the intent object includes downloading and/or installing the application such that the first electronic device may access the software application locally, or wherein providing the intent object includes remotely accessing the application.

2. The non-transitory computer-readable storage medium according to claim 1, wherein the one or more programs further include instructions which when executed by one or more processors of the first electronic device, cause the first electronic device to:
   identify the intent object of the set of intent objects.

3. The non-transitory computer-readable storage medium according to claim 1; wherein the one or more programs further include instructions which when executed by one or more processors of the first electronic device, cause the first electronic device to:
   identify a parameter associated with the intent object of the set of intent objects; and
   provide the parameter to the application.

4. The non-transitory computer-readable storage medium according to claim 3, wherein the one or more programs further include instructions which when executed by one or more processors of the first electronic device, cause the first electronic device to:
   receive a response from the application, wherein the response is indicative of whether the parameter is valid.

5. The non-transitory computer-readable storage medium according to claim 1, wherein the one or more programs further include instructions which when executed by one or more processors of the first electronic device, cause the first electronic device to:
   cause the application to perform a task associated with the intent object; and
   after providing the intent object to the application, receive, from the application, a result response associated with the intent object.

6. A first electronic device, comprising:
   one or more processors;
   a memory; and
   one or more programs, wherein the one or more programs are stored in the memory and configured to be executed by the one or more processors, the one or more programs including instructions for:
      receiving a natural-language user input, wherein the natural-language user input is indicative of an intent object of a set of intent objects;
      providing the natural-language user input to a second electronic device;
      receiving, in response to a determination by the second electronic device that a software application associated with the intent object is not located on the first electronic device, an indication of the determination from the second electronic device;
      responsive to the indication, obtaining a list of applications associated with the intent object;
      displaying, with a touch-sensitive display of the first electronic device, the list of applications associated with the intent object in a user interface;
      receiving a user input indicative of a selection of an application of the list of applications; and
      providing the intent object of the set of intent objects to the application, wherein providing the intent object includes downloading and/or installing the application such that the first electronic device may access the software application locally, or wherein providing the intent object includes remotely accessing the application.

7. The first electronic device according to claim 6, wherein the one or more programs further include instructions for:

identifying the intent object of the set of intent objects.

8. The first electronic device according to claim 6, wherein the one or more programs further include instructions for:

identifying a parameter associated with the intent object of the set of intent objects; and providing the parameter to the application.

9. The first electronic device according to claim 6, wherein the one or more programs further include instructions for:

receiving a response from the application, wherein the response is indicative of whether the parameter is valid.

10. The first electronic device according to claim 6, wherein the one or more programs further include instructions for:

causing the application to perform a task associated with the intent object; and after providing the intent object to the application, receiving, from the application, a result response associated with the intent object.

11. A method, comprising:

at a first electronic device having one or more processors:

receiving a natural-language user input, wherein the natural-language user input is indicative of an intent object of a set of intent objects;

providing the natural-language user input to a second electronic device;

receiving, in response to a determination by the second electronic device that a software application associated with the intent object is not located on the first electronic device, an indication of the determination from the second electronic device;

responsive to the indication, obtaining a list of applications associated with the intent object;

displaying, with a touch-sensitive display of the first electronic device, the list of applications associated with the intent object in a user interface;

receiving a user input indicative of a selection of an application of the list of applications; and providing the intent object of the set of intent objects to the application, wherein providing the intent object includes downloading and/or installing the application such that the first electronic device may access the software application locally, or wherein providing the intent object includes remotely accessing the application.

12. The method of claim 11, further comprising:

identifying the intent object of the set of intent objects.

13. The method of claim 11, further comprising:

identifying a parameter associated with the intent object of the set of intent objects; and providing the parameter to the application.

14. The method of claim 11, further comprising:

receiving a response from the application, wherein the response is indicative of whether the parameter is valid.

15. The method of claim 11, further comprising:

causing the application to perform a task associated with the intent object; and after providing the intent object to the application, receiving, from the application, a result response associated with the intent object.

* * * * *

UNITED STATES PATENT AND TRADEMARK OFFICE
CERTIFICATE OF CORRECTION

PATENT NO. : 10,580,409 B2
APPLICATION NO. : 16/207901
DATED : March 3, 2020
INVENTOR(S) : Robert A. Walker et al.

Page 1 of 1

It is certified that error appears in the above-identified patent and that said Letters Patent is hereby corrected as shown below:

In the Claims

In Claim 3, at Column 64, Line 13, delete "claim 1;" and insert -- claim 1, --, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*